(12) United States Patent
Kang

(10) Patent No.: US 9,829,690 B2
(45) Date of Patent: Nov. 28, 2017

(54) MICROSCOPIC IMAGING DEVICE, MICROSCOPIC IMAGING METHOD, AND MICROSCOPIC IMAGING PROGRAM

(71) Applicant: Keyence Corporation, Osaka (JP)

(72) Inventor: Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 427 days.

(21) Appl. No.: 14/481,936

(22) Filed: Sep. 10, 2014

(65) Prior Publication Data
US 2015/0116476 A1    Apr. 30, 2015

(30) Foreign Application Priority Data

Oct. 25, 2013  (JP) .................................. 2013-222720

(51) Int. Cl.
| | | |
|---|---|---|
| G02B 21/00 | (2006.01) | |
| H04N 7/18 | (2006.01) | |
| G02B 21/06 | (2006.01) | |
| H04N 5/225 | (2006.01) | |
| H04N 5/235 | (2006.01) | |
| G02B 21/12 | (2006.01) | |
| G02B 21/16 | (2006.01) | |

(Continued)

(52) U.S. Cl.
CPC ............. *G02B 21/06* (2013.01); *G02B 21/12* (2013.01); *G02B 21/16* (2013.01); *G02B 21/367* (2013.01); *H04N 5/2256* (2013.01); *H04N 5/2354* (2013.01); *G02B 21/0088* (2013.01); *G02B 21/244* (2013.01)

(58) Field of Classification Search
CPC . G09B 9/00; H04N 7/18; G01B 11/24; G02B 21/00; G02B 21/36; G06T 7/00; G06T 5/50

See application file for complete search history.

(56) References Cited

U.S. PATENT DOCUMENTS

| | | | | |
|---|---|---|---|---|
| 6,376,818 B1* | 4/2002 | Wilson | ................... | G06T 7/0057 |
| | | | | 250/201.3 |
| 2005/0036780 A1* | 2/2005 | Iwane | ...................... | G02B 7/36 |
| | | | | 396/111 |
| 2008/0101657 A1* | 5/2008 | Durkin | ...................... | G01J 3/02 |
| | | | | 382/110 |

FOREIGN PATENT DOCUMENTS

| | | |
|---|---|---|
| EP | 1182486 A1 | 2/2002 |
| JP | 2001-059942 A | 3/2001 |

(Continued)

*Primary Examiner* — Behrooz Senfi
*Assistant Examiner* — Maryam Nasri
(74) *Attorney, Agent, or Firm* — Kilyk & Bowersox, P.L.L.C.

(57) ABSTRACT

To provide a microscopic imaging device in which a measuring object can be easily imaged using measurement light having a desired pattern, in which the pattern of measurement light can be changed and a phase of the pattern can be moved, without arranging a mechanical mechanism. An arbitrary pattern of a plurality of patterns of measurement light is instructed. The measurement light having an instructed pattern is generated by a light modulation element, and is applied on a measuring object. A spatial phase of the generated pattern is sequentially moved on the measuring object by a predetermined amount by the light modulation element. A plurality of pieces of pattern image data generated at a plurality of phases of the pattern is synthesized based on the light receiving signal output from the light receiving section to generate sectioning image data indicating an image of the measuring object.

14 Claims, 28 Drawing Sheets

(51) Int. Cl.
*G02B 21/36* (2006.01)
*G02B 21/24* (2006.01)

(56) References Cited

FOREIGN PATENT DOCUMENTS

| | | |
|---|---|---|
| JP | 2001-117010 A | 4/2001 |
| JP | 2005-508521 A | 3/2005 |
| JP | 2000-506634 A | 5/2005 |
| JP | 2007-033790 A | 2/2007 |
| JP | 2009-092795 A | 4/2009 |
| JP | 2010-078983 A | 4/2010 |
| JP | 2010-145985 A | 7/2010 |
| WO | 9845745 | 10/1998 |

* cited by examiner

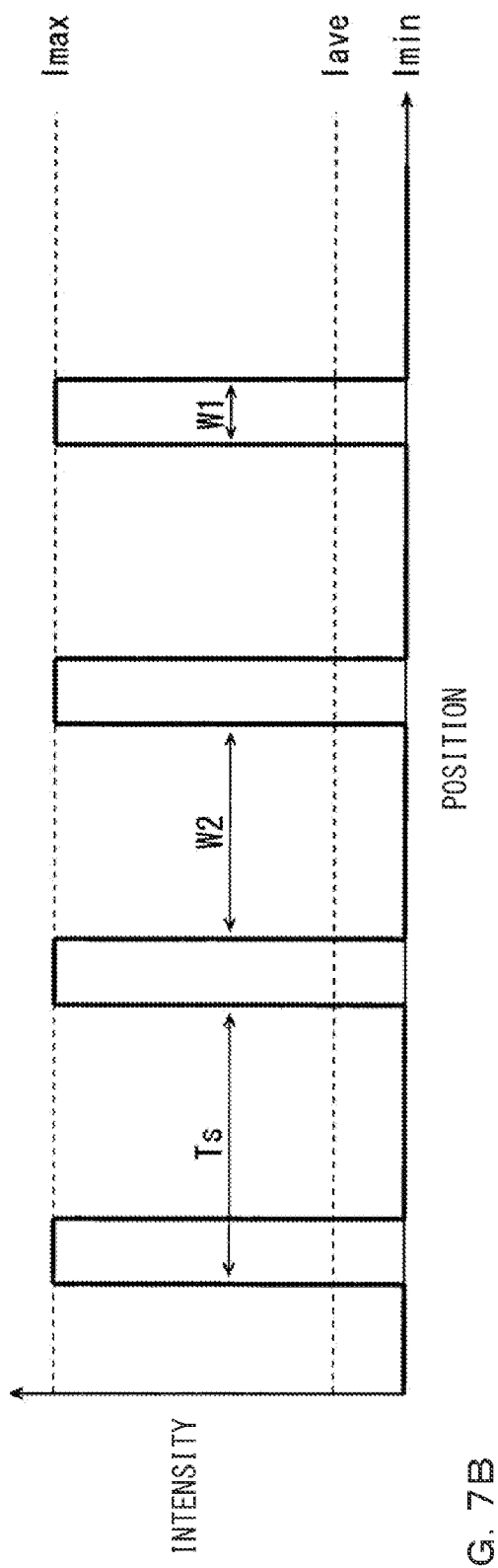
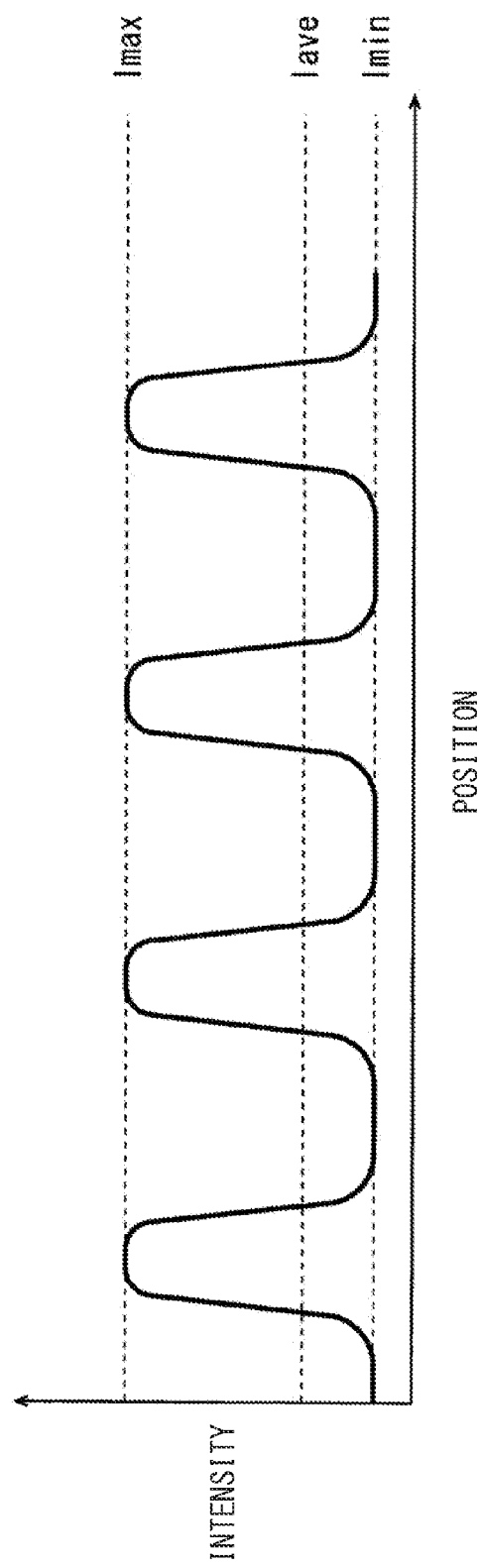

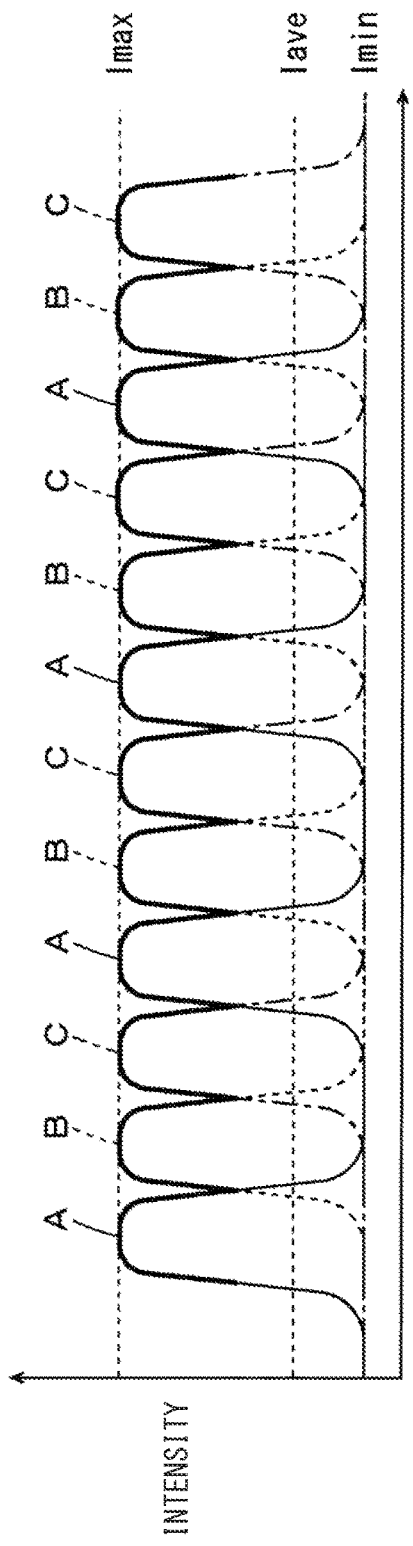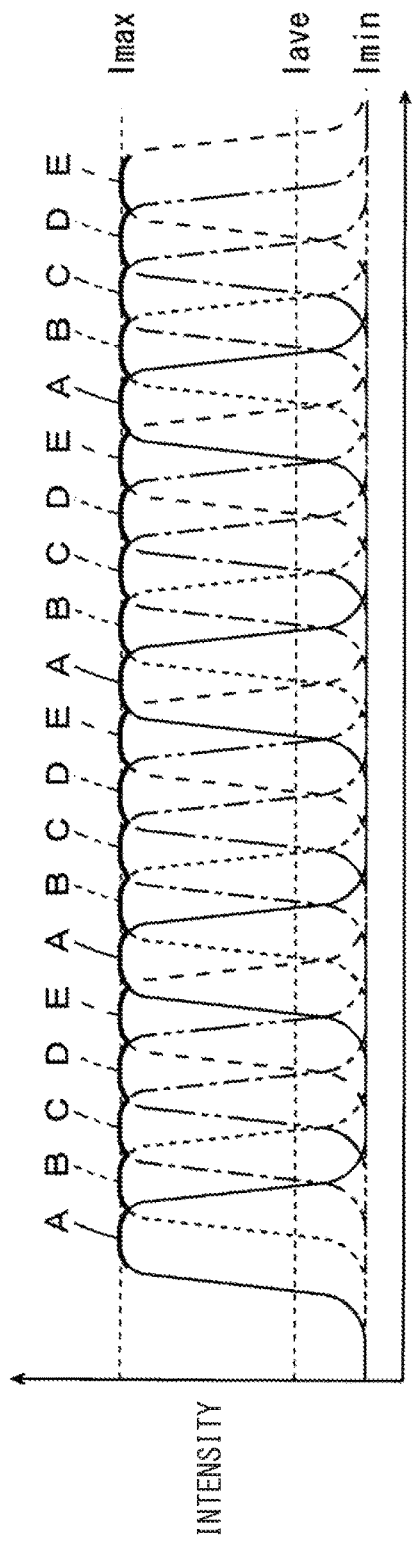

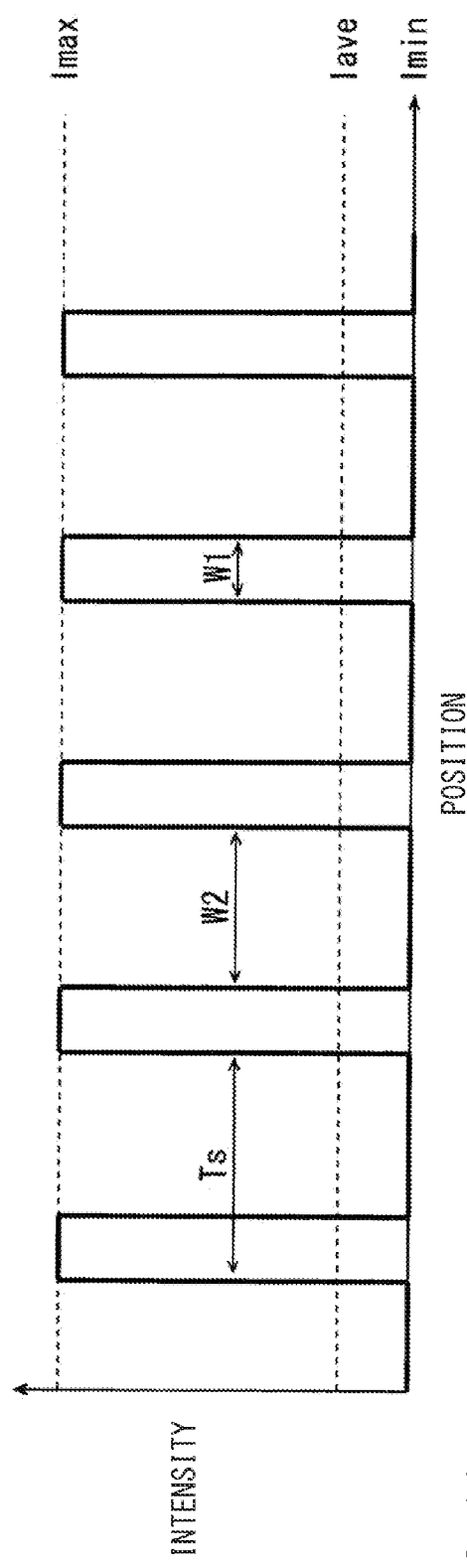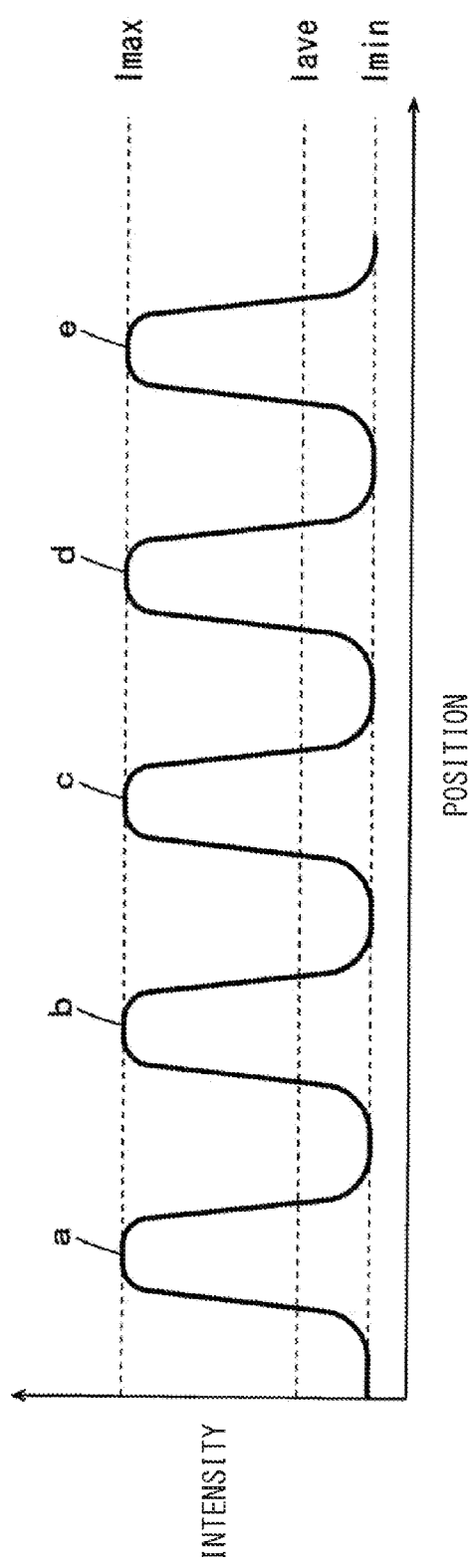

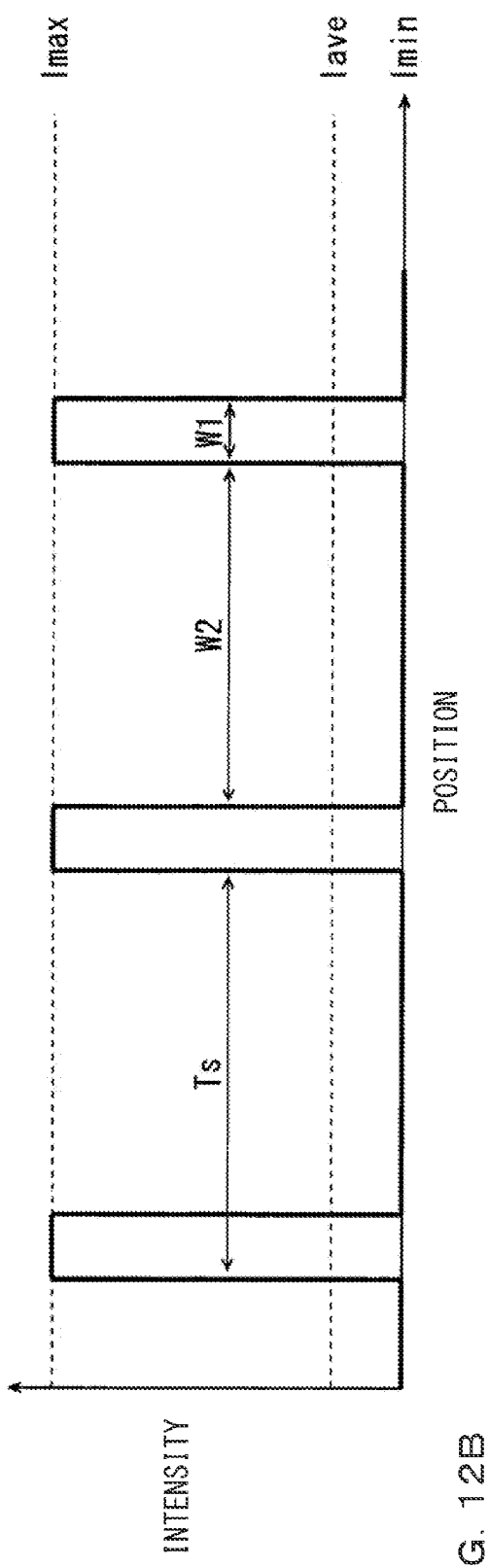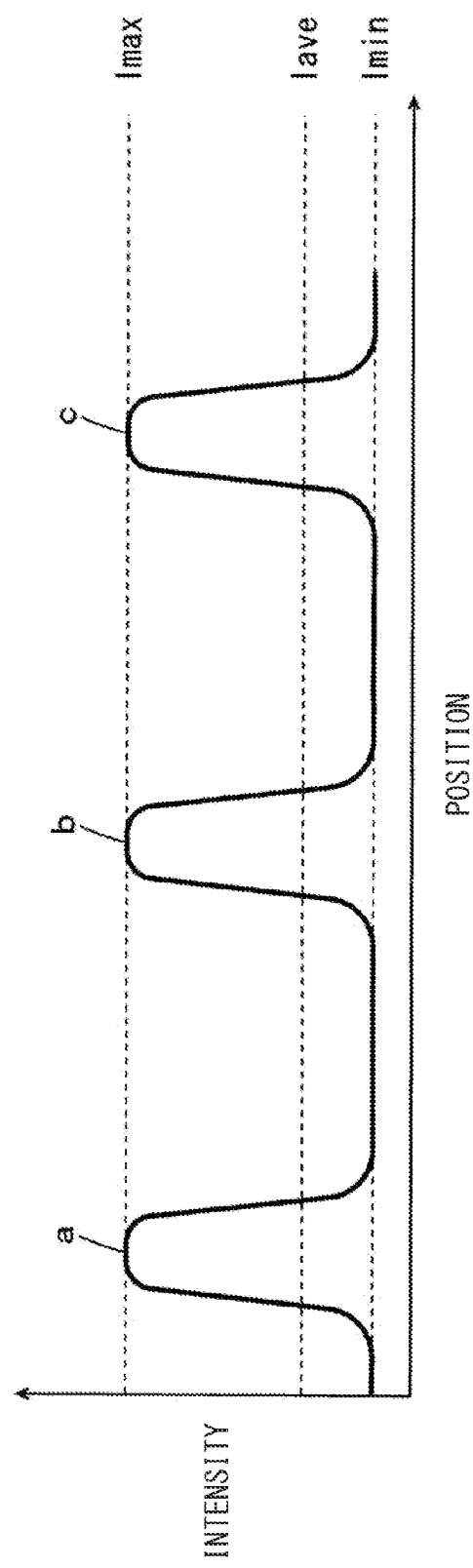

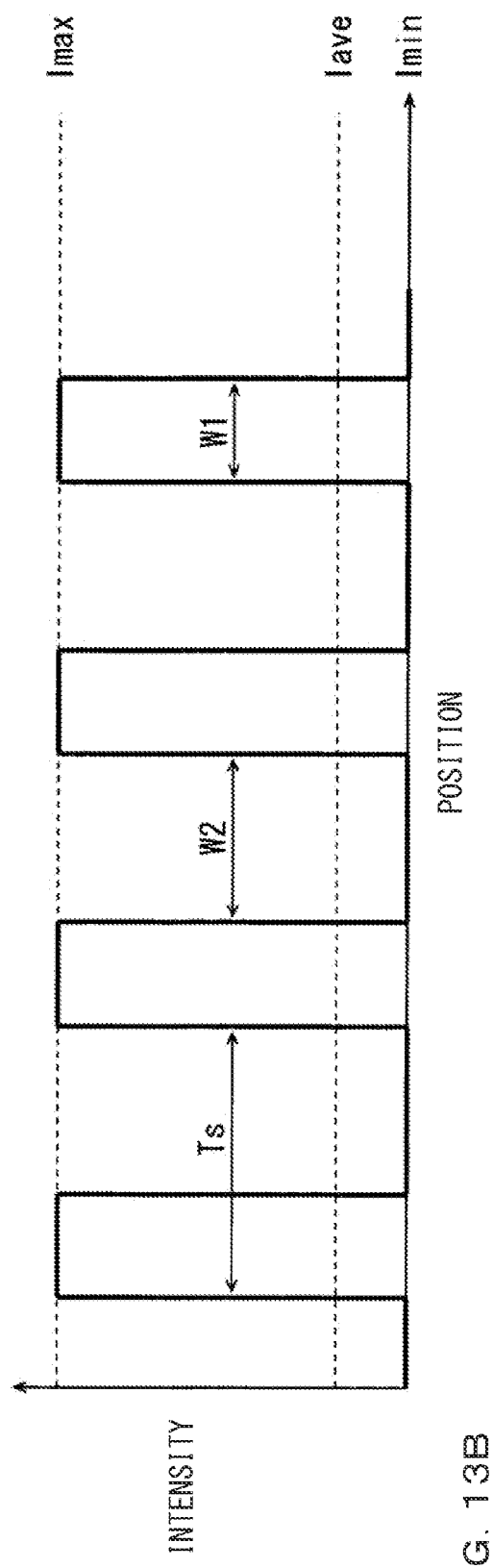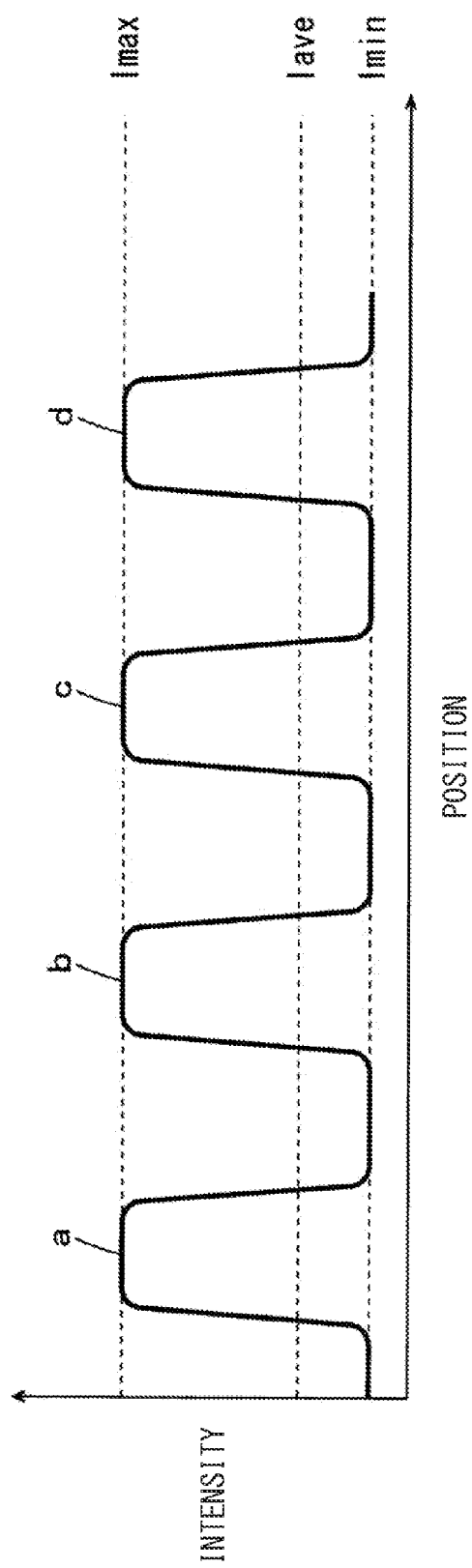

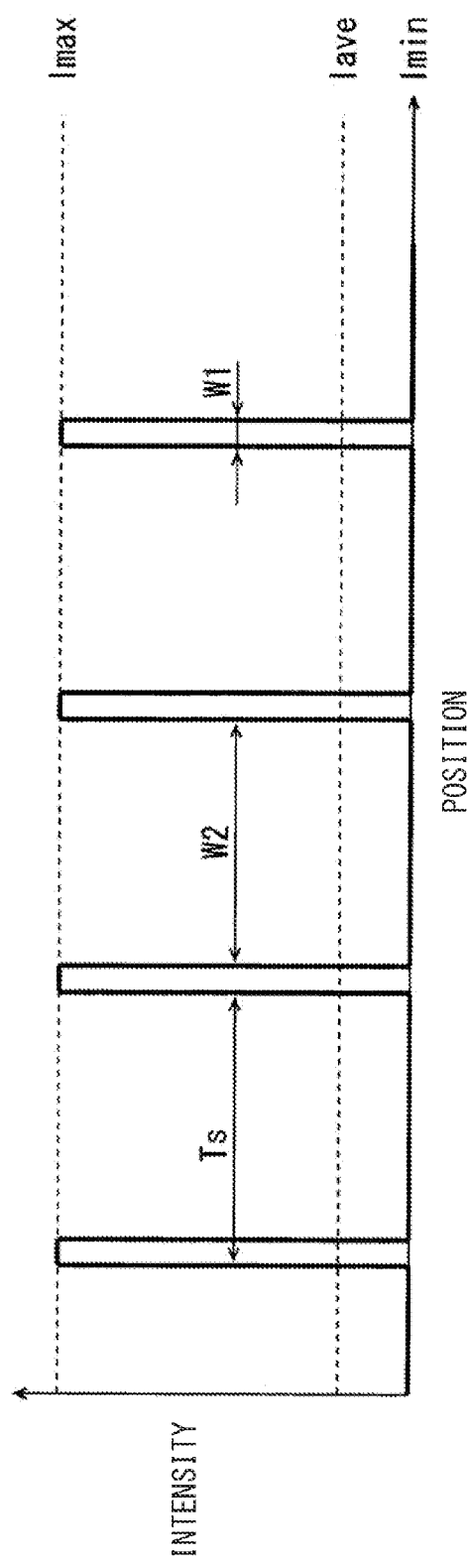
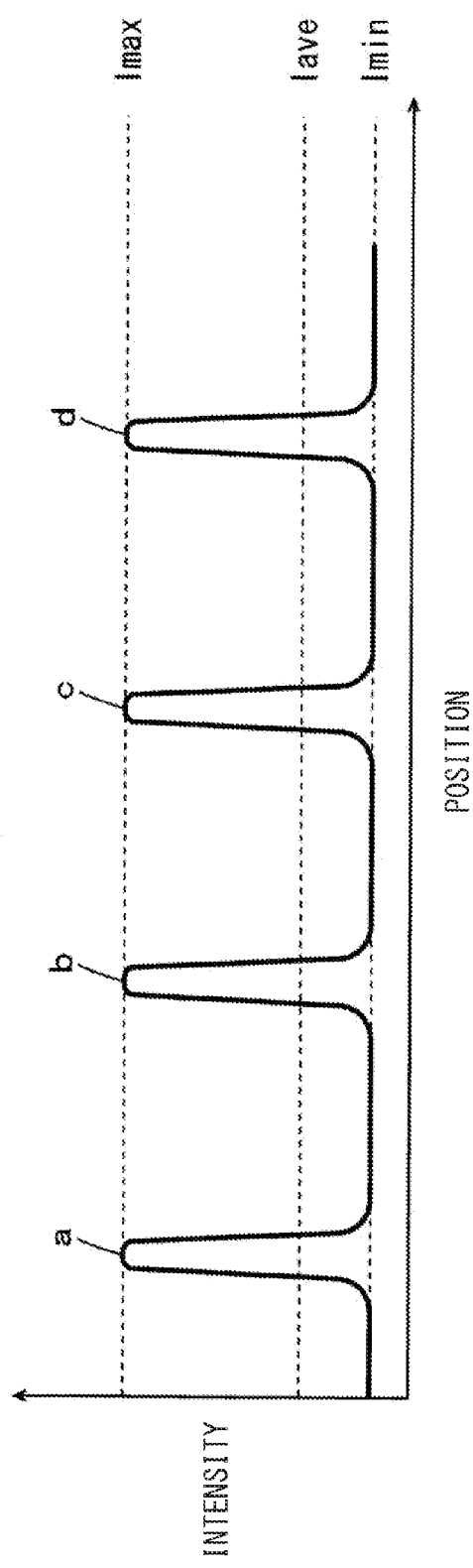
FIG. 14A
FIG. 14B

GFP

Texas Red

DAPI

TRANSMISSION NORMAL OBSERVATION
(PHASE DIFFERENCE OBSERVATION)

GFP + Texas Red

GFP + Texas Red + TRANSMISSION NORMAL OBSERVATION

GFP + Texas Red+DAPI + TRANSMISSION NORMAL OBSERVATION

MICROSCOPIC IMAGING DEVICE, MICROSCOPIC IMAGING METHOD, AND MICROSCOPIC IMAGING PROGRAM

CROSS-REFERENCE TO RELATED APPLICATIONS

The present application claims foreign priority based on Japanese Patent Application No. 2013-222720, filed Oct. 25, 2013, the contents of which is incorporated herein by reference.

BACKGROUND OF THE INVENTION

1. Field of the Invention

The present invention relates to a microscopic imaging device, a microscopic imaging method, and a microscopic imaging program.

2. Description of Related Art

A microscopic imaging device that generates an image usable for creating a three-dimensional image by optical sectioning (cutting) has been proposed (see Japanese Patent Publication No. 2000-506634).

In the microscopic imaging device described in Japanese Patent Publication No. 2000-506634, a mask is arranged in a light source so that an object is illuminated with a spatially periodic pattern. A mask pattern is thereby projected on a sample. The mask is moved to at least 3 positions by a carriage in order to adjust a spatial phase of the mask pattern. The 3 or more images of the object illuminated at least 3 positions of the mask are analyzed to generate a three-dimensional image of the object.

In the microscopic imaging device of Japanese Patent Publication No. 2000-506634, a mechanical mechanism such as the carriage for moving the mask is necessary to adjust the spatial phase of the mask pattern. Furthermore, the mask needs to be replaced when changing the mask pattern. However, cumbersome task and time are required to replace the mask. It is thus not easy to change the mask pattern and obtain a plurality of images of the object.

SUMMARY OF THE INVENTION

It is an object of the present invention to provide a microscopic imaging device, a microscopic imaging method, and a microscopic imaging program in which a measuring object can be easily imaged using measurement light having a desired pattern, in which the pattern of measurement light can be changed and a phase of the pattern can be moved, without arranging a mechanical mechanism, and in which miniaturization can be realized.

(1) According to one embodiment of the invention, a microscopic imaging device includes a first light projecting section that emits light; a light modulation element configured to generate measurement light having an arbitrary pattern from the light emitted by the first light projecting section; an optical system that irradiates a measuring object with the measurement light generated by the light modulation element; a light receiving section that receives light from the measuring object and outputs a light receiving signal indicating a light receiving amount; an image data generating portion that generates image data based on the light receiving signal output from the light receiving section; an instructing section that instructs a measurement condition for generating a pattern of the measurement light to be generated by the light modulation element of a plurality of patterns of the measurement light; a pattern generating portion that generates a pattern to be irradiated on the measuring object while sequentially moving a spatial phase by a predetermined amount based on the measurement condition instructed by the instructing section; and a controller that controls the light modulation element based on the pattern generated by the pattern generating portion, and controls the image data generating portion to generate sectioning image data indicating an image of the measuring object based on a plurality of pieces of image data generated at a plurality of phases of the pattern.

In the microscopic imaging device, the measurement condition for generating the pattern of the measurement light to be generated by the light modulation element of the plurality of patterns of the measurement light is instructed. The pattern to be irradiated on the measuring object is generated while sequentially moving the spatial phase by a predetermined amount based on the instructed measurement condition. The measurement light having the pattern is generated by the light modulation element from the light emitted by the first light projecting section based on the generated pattern.

The measuring object is irradiated with the measurement light generated by the light modulation element by the optical system. The spatial phase of the generated pattern is sequentially moved on the measuring object by a predetermined amount by the light modulation element. The light from the measuring object is received by the light receiving section, and a light receiving signal indicating the light receiving amount is output. The sectioning image data indicating an image of the measuring object is generated based on a plurality of pieces of image data generated at a plurality of phases of the pattern based on the light receiving signal output from the light receiving section.

Thus, the pattern to be irradiated on the measuring object is generated while sequentially moving the spatial phase by a predetermined amount based on the instruction of the measurement condition by the instructing section. The irradiation with the measurement light having the generated pattern, the movement of the phase of the pattern, the generation of the plurality of pieces of image data, and the generation of the sectioning image data are carried out. In this case, the replacing task and the replacing time of the component are unnecessary. Furthermore, the measuring object is selectively irradiated with a plurality of pieces of measurement light having an arbitrary pattern through a single light path. The sectioning observation using the measurement light having the arbitrary pattern thus can be carried out while miniaturizing the microscopic imaging device.

Therefore, the measuring object can be easily imaged using the measurement light having a desired pattern in which the pattern of the measurement light can be changed and the phase of the pattern can be moved without arranging a mechanical switching mechanism, and the microscopic imaging device can be miniaturized.

(2) The measurement condition may include a pattern class. In this case, the pattern class is instructed by the instructing section as the measurement condition. The measurement light having the instructed pattern class is thereby easily generated.

(3) The pattern class may include a first pattern of a one-dimensional form having an intensity distribution that periodically changes in a first direction, and a second pattern of a two-dimensional form having an intensity distribution that periodically changes in the first direction and periodically changes in a second direction intersecting the first direction, and the controller may control the light modulation element to sequentially move a phase of the first pattern in the first direction when the first pattern is instructed by the instructing section, and control the light modulation element to sequentially move a phase of the second pattern in the first direction and the second direction when the second pattern is instructed by the instructing section.

In this case, the pattern class includes the first pattern of the one-dimensional form and the second pattern of the two-dimensional form. When the first pattern of the one-dimensional form is instructed, the phase of the first pattern is moved in the first direction. The sectioning image data is thereby obtained in a relatively short period of time from a relatively few number of image data.

When the second pattern of the two-dimensional form is instructed, the phase of the second pattern is moved in the first and second directions. The sectioning image of high image quality is thereby obtained from a relatively great number of image data. In this case, the imaging in a relatively short period of time and the acquisition of an image of high image quality can be easily switched in accordance with the instruction of the first or second pattern by the instructing section.

(4) The measurement condition may include a movement amount of the phase of the pattern as a measurement parameter, and the pattern generating portion may calculate the movement amount of the phase of the pattern based on the pattern class instructed by the instructing section, and generate a plurality of patterns so that a first portion having an intensity higher than a predetermined intensity of the pattern of the measurement light is applied at least once on an entire irradiation range of the measurement light based on the movement amount of the phase of the pattern.

In this case, the measurement parameter is instructed as the measurement condition by the instructing section, and the measurement parameter includes a movement amount of the phase of the pattern. The pattern to be irradiated on the measuring object thus can be easily generated while sequentially moving the spatial phase by the instructed movement amount. The first portion of the measurement light is applied at least once on the entire irradiation range of the measurement light. Thus, the sectioning image data indicating a bright image of the measuring object can be generated.

(5) The measurement parameter may further include a position and a width of the first portion of the measurement light, and a position and a width of a second portion having an intensity lower than or equal to the predetermined intensity of the pattern of the measurement light.

In this case, the pattern of the measurement light can be specifically and easily instructed. A plurality of pieces of image data is generated at high speed if the width of the first portion is large, and a plurality of pieces of image data in which the image quality at the details of the measuring object is high is generated if the width of the first portion is small. A plurality of pieces of image data in which the broad-based blurring component of the measuring object is reduced is generated if the width of the second portion is large, and a plurality of pieces of image data is generated at high speed if the width of the second portion is small. Therefore, the acquisition of an image of high image quality and the imaging in a relatively short period of time can be easily switched.

(6) The measurement parameter may further include spatial periods of the first and second portions of the measurement light.

In this case, at least one of the width of the first portion and the width of the second portion of the measurement light does not need to be instructed. Thus, the pattern of the measurement light can be more easily instructed.

(7) The pattern generating portion may calculate the movement amount of the phase of the pattern based on the spatial periods of the first and second portions and the widths of the first and second portions of the measurement light instructed by the instructing section.

In this case, the movement amount of the phase of the pattern for applying the first portion of the measurement light at least once on the entire irradiation range of the measurement light can be easily calculated.

(8) The instructing section may be configured to be capable of instructing measurement light that does not have a pattern as the pattern class, and when the measurement light that does not have a pattern is instructed by the instructing section, the controller may control the light modulation element to generate the measurement light that does not have a pattern, and control the image data generating portion to generate image data indicating an image of the measuring object based on the light receiving signal output from the light receiving section.

According to such a configuration, if the measurement light that does not have a pattern is instructed as the pattern class using the instructing section, the normal observation using the measurement light that does not have a pattern can be carried out. In this case, the measuring object is selectively irradiated with a plurality of pieces of measurement light having an arbitrary pattern or measurement light that does not have a pattern through a single light path. Therefore, the normal observation and the sectioning observation using the measurement light having an arbitrary pattern can be carried out without enlarging the microscopic imaging device.

(9) The controller may automatically adjust a brightness parameter for adjusting brightness of an image according to the pattern class and the measurement parameter, and control at least one of the first light projecting section, the light receiving section, and the data generating portion based on the adjusted brightness parameter.

The image based on the image data or the sectioning image data becomes dark depending on the pattern class and the measurement parameter. Even in such a case, the brightness parameter is automatically adjusted according to the pattern class and the measurement parameter, and at least one of the first light projecting section, the light receiving section, and the data generating portion is controlled based on the adjusted brightness parameter. The user thus can observe the bright image without adjusting the first light projecting section, the light receiving section, or the data generating portion.

(10) The first pattern may include a rectangular wave pattern having an intensity distribution that changes in a rectangular wave form and a sine wave pattern having an intensity distribution that changes in a sine wave form, and the instructing section may be configured to selectively instruct the rectangular wave pattern or the sine wave pattern as the first pattern.

If the rectangular wave pattern is instructed, the contrast of the image can be enhanced by the adjustment of a duty ratio of the rectangular wave. If the sinew wave pattern is instructed, the sectioning image data can be obtained in a relatively short period of time by a relatively few number of image data. In this case, the acquisition of an image of high contrast and the imaging in a relatively short period of time can be easily switched in accordance with the instruction of the rectangular wave pattern or the sine wave pattern by the instructing section.

(11) The controller may control the light modulation element so that the intensity distribution of the pattern changes in a period set according to the instructed pattern.

In this case, the period of the pattern is set to a desired value by the user according to the pattern of the measurement light, or the period of the pattern is set to an appropriate value in advance according to the pattern of the measurement light. The number of generated image data differs if the period of the pattern is different. Therefore, the imaging time and the quality of the image can be adjusted by the setting of the period of the pattern.

(12) The optical system may be configured to irradiate the measuring object with the measurement light having a wavelength defined in advance so that fluorescence is emitted from the measuring object.

In this case, the measuring object is irradiated with the measurement light having a wavelength defined in advance, so that the fluorescence is emitted from the measuring object. The sectioning image data for displaying the fluorescence image of the measuring object is thereby generated based on the light receiving signal by the fluorescence output from the light receiving section. The fluorescence observation of the measuring object then can be carried out.

(13) The microscopic imaging device may further include a second light projecting section that emits light for transmissive observation, and the light receiving section may be arranged to receive the light for transmissive observation transmitted through the measuring object.

In this case, the image data for displaying the image of the measuring object is generated based on the light receiving signal by the light for transmissive observation output from the light receiving section. The transmissive observation of the measuring object then can be carried out.

(14) The microscopic imaging device may further include a display unit that displays an image based on image data or sectioning image data generated by the image data generating portion, and the controller may display on the display unit a first image based on the image data or the sectioning image data generated by the image data generating portion in correspondence with the irradiation with the measurement light, and display on the first image, in a superimposed manner, a second image based on image data generated by the image data generating portion in correspondence with the irradiation with the light for transmissive observation.

In this case, the first image based on the image data or the sectioning image data generated by the image data generating portion in correspondence with the irradiation with the measurement light, and the second image based on the image data generated by the image data generating portion in correspondence with the irradiation with the light for transmissive observation are displayed in a superimposed manner on the display unit. The user is thus able to easily compare the first image by the sectioning observation or the normal observation and the second image by the transmissive observation.

(15) The display unit may be configured to selectively or simultaneously execute a normal display of displaying an image based on the already generated image data or sectioning image data, and a preview display of displaying an image based on sectioning image data generated when the measurement condition is changed, the first and second images being displayable in a superimposed manner in the normal display.

In this case, the user can observe the image based on the already generated image data or the sectioning image data in the normal display. Furthermore, the superimposed display of the first and second images can be observed. In the preview display, on the other hand, the user can observe point by point the image based on the sectioning image data generated when the measurement condition is changed. The user is thus able to easily select the appropriate measurement condition while looking at the preview displayed image.

(16) The light modulation element may include a digital micro-mirror device, a reflective liquid crystal element, or a liquid crystal display. In this case, the pattern of the measurement light can be freely set. Furthermore, the phase of the pattern can be freely moved.

(17) According to another embodiment of the invention, a microscopic imaging method includes the steps of emitting light from a light projecting section; accepting a measurement condition for generating a pattern of measurement light to be generated by a light modulation element of a plurality of patterns of the measurement light; generating a pattern to be irradiated on a measuring object while sequentially moving a spatial phase by a predetermined amount based on an instructed measurement condition; generating measurement light having a pattern by the light modulation element from the light emitted from the light projecting section based on the generated pattern; irradiating the measuring object with the measurement light generated by the light modulation element by an optical system; sequentially moving a spatial phase of the generated pattern on the measuring object by a predetermined amount by the light modulation element; receiving light from the measuring object by a light receiving section, and outputting a light receiving signal indicating a light receiving amount; and generating sectioning image data indicating an image of the measuring object based on a plurality of pieces of image data generated at a plurality of phases of the pattern based on the light receiving signal output from the light receiving section.

According to the microscopic imaging method, the measurement condition for generating the pattern of the measurement light to be generated by the light modulation element of the plurality of patterns of the measurement light is instructed. The pattern to be irradiated on the measuring object is generated while sequentially moving the spatial phase by a predetermined amount based on the instructed measurement condition. The measurement light having the pattern is generated by the light modulation element from the light emitted by the first light projecting section based on the generated pattern.

The measuring object is irradiated with the measurement light generated by the light modulation element by the optical system. The spatial phase of the generated pattern is sequentially moved on the measuring object by a predetermined amount by the light modulation element. The light from the measuring object is received by the light receiving section, and a light receiving signal indicating the light receiving amount is output. The sectioning image data indicating an image of the measuring object is generated based on a plurality of pieces of image data generated at a plurality of phases of the pattern based on the light receiving signal output from the light receiving section.

Thus, the pattern to be irradiated on the measuring object is generated while sequentially moving the spatial phase by a predetermined amount based on the instruction of the measurement condition by the instructing section. The irradiation with the measurement light having the generated pattern, the movement of the phase of the pattern, the generation of the plurality of pieces of image data, and the generation of the sectioning image data are carried out. In this case, the replacing task and the replacing time of the component are unnecessary. Furthermore, the measuring object is selectively irradiated with a plurality of pieces of measurement light having an arbitrary pattern through a single light path. The sectioning observation using the measurement light having the arbitrary pattern thus can be carried out while miniaturizing the microscopic imaging device.

Therefore, the measuring object can be easily imaged using the measurement light having a desired pattern in which the pattern of the measurement light can be changed and the phase of the pattern can be moved without arranging a mechanical switching mechanism, and the microscopic imaging device can be miniaturized.

(18) According to still another embodiment of the invention, a microscopic imaging program executable by a processing device causes the processing device to execute the processes of emitting light from a light projecting section; accepting a measurement condition for generating a pattern of measurement light to be generated by a light modulation element of a plurality of patterns of the measurement light; generating a pattern to be irradiated on a measuring object while sequentially moving a spatial phase by a predetermined amount based on an instructed measurement condition; generating measurement light having a pattern by the light modulation element from the light emitted from the light projecting section based on the generated pattern; irradiating the measuring object with the measurement light generated by the light modulation element by an optical system; sequentially moving a spatial phase of the generated pattern on the measuring object by a predetermined amount by the light modulation element; receiving light from the measuring object by a light receiving section, and outputting a light receiving signal indicating a light receiving amount; and generating sectioning image data indicating an image of the measuring object based on a plurality of pieces of image data generated at a plurality of phases of the pattern based on the light receiving signal output from the light receiving section.

According to the microscopic imaging program, the measurement condition for generating the pattern of the measurement light to be generated by the light modulation element of the plurality of patterns of the measurement light is instructed. The pattern to be irradiated on the measuring object is generated while sequentially moving the spatial phase by a predetermined amount based on the instructed measurement condition. The measurement light having the pattern is generated by the light modulation element from the light emitted by the first light projecting section based on the generated pattern.

The measuring object is irradiated with the measurement light generated by the light modulation element by the optical system. The spatial phase of the generated pattern is sequentially moved on the measuring object by a predetermined amount by the light modulation element. The light from the measuring object is received by the light receiving section, and a light receiving signal indicating the light receiving amount is output. The sectioning image data indicating an image of the measuring object is generated based on a plurality of pieces of image data generated at a plurality of phases of the pattern based on the light receiving signal output from the light receiving section.

Thus, the pattern to be irradiated on the measuring object is generated while sequentially moving the spatial phase by a predetermined amount based on the instruction of the measurement condition by the instructing section. The irradiation with the measurement light having the generated pattern, the movement of the phase of the pattern, the generation of the plurality of pieces of image data, and the generation of the sectioning image data are carried out. In this case, the replacing task and the replacing time of the component are unnecessary. Furthermore, the measuring object is selectively irradiated with a plurality of pieces of measurement light having an arbitrary pattern through a single light path. The sectioning observation using the measurement light having the arbitrary pattern thus can be carried out while miniaturizing the microscopic imaging device.

Therefore, the measuring object can be easily imaged using the measurement light having a desired pattern in which the pattern of the measurement light can be changed and the phase of the pattern can be moved without arranging a mechanical switching mechanism, and the microscopic imaging device can be miniaturized.

According to the present invention, the measuring object can be easily imaged using the measurement light having a desired pattern in which the pattern of the measurement light can be changed and the phase of the pattern can be moved without arranging a mechanical mechanism, and the microscopic imaging device can be miniaturized.

BRIEF DESCRIPTION OF THE DRAWINGS

FIGS. 7A and 7B are views showing an intensity distribution of rectangular wave measurement light;

FIGS. 8A and 8B are views describing the movement amount of the phase of the pattern of the rectangular wave measurement light of FIG. 7B;

FIGS. 11A and 11B are views showing the intensity distribution of the rectangular wave measurement light of when the space period is smaller than the space period of FIGS. 7A and 7B;

FIGS. 12A and 12B are views showing the intensity distribution of the rectangular wave measurement light of when the space period is larger than the space period of FIGS. 7A and 7B;

FIGS. 13A and 13B are views showing the intensity distribution of the rectangular wave measurement light of when the width of a bright portion is greater than the width of a bright portion of FIGS. 7A and 7B;

FIGS. 14A and 14B are views showing the intensity distribution of the rectangular wave measurement light of when the width of the bright portion is smaller than the width of the bright portion of FIGS. 7A and 7B;

DETAILED DESCRIPTION OF PREFERRED EMBODIMENT (1) Configuration of Microscopic Imaging Device FIG. 2 is a schematic view showing a configuration of a measurement unit and a measurement light supplying unit 300 of a microscopic imaging device 500 of FIG. 1. FIG. 3 is a schematic view showing a light path in the measurement unit of the microscopic imaging device 500 of FIG. 1.

Hereinafter, the microscopic imaging device 500 according to the present embodiment will be described with reference to FIG. 1 to FIG. 3. As shown in FIG. 1, the microscopic imaging device 500 includes a measurement unit 100, a PC (Personal Computer) 200, the measurement light supplying unit 300, and a display unit 400.

As shown in FIG. 2, the measurement light supplying unit 300 includes a power supply device 310, a light projecting section 320, and a light guiding member 330. In the present example, the light guiding member 330 is a liquid light guide. The light guiding member 330 may be, for example, a glass fiber or a quartz fiber. The power supply device 310 supplies power to the light projecting section 320, and also supplies power to the measurement unit 100 via a power supply cable (not shown).

Figure 1:
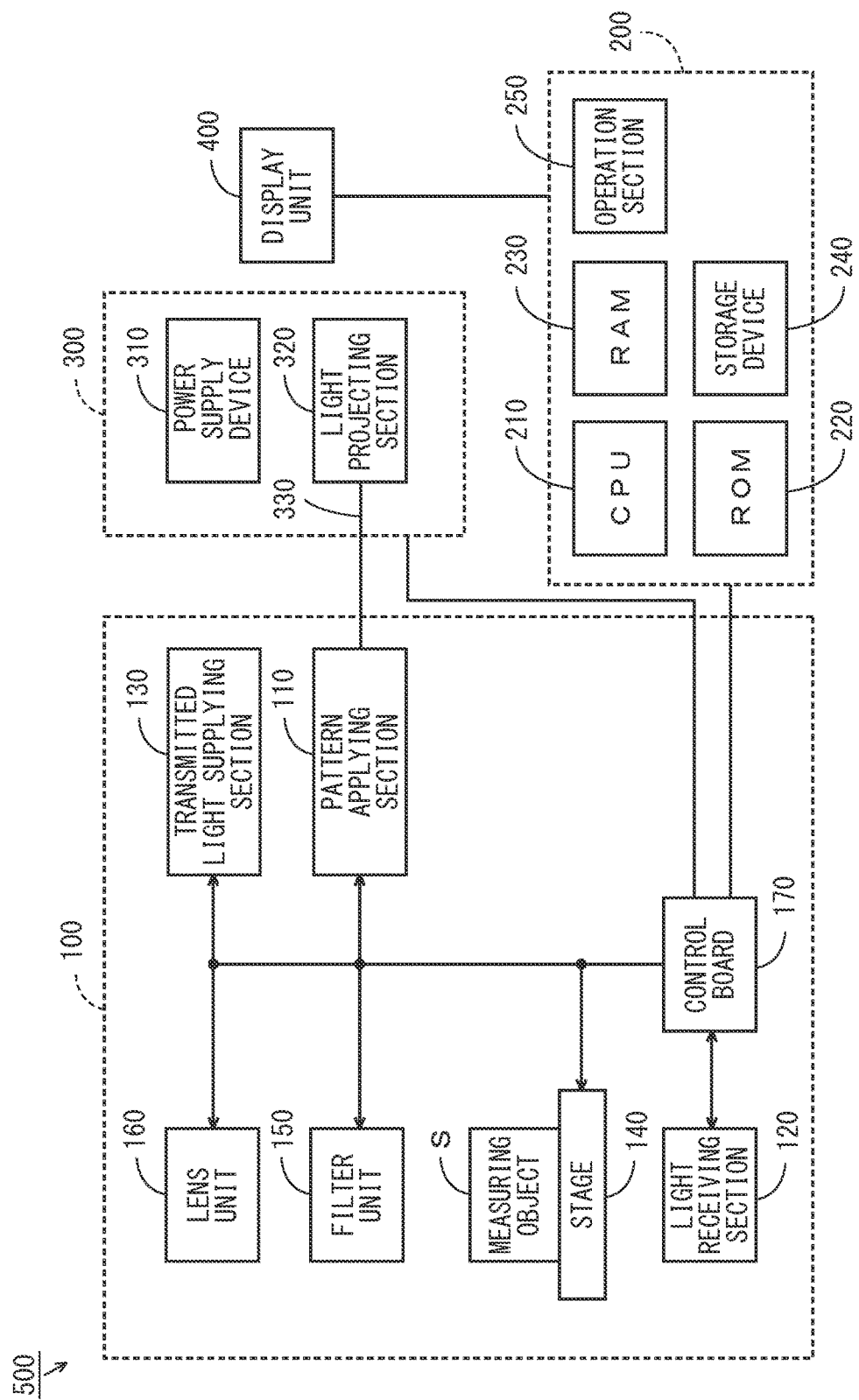
FIG. 1 is a block diagram showing a configuration of a microscopic imaging device according to one embodiment of the present invention.

The light projecting section 320 includes a measurement light source 321, a light extinction mechanism 322, and a light shielding mechanism 323. The measurement light source 321 is, for example, a metal halide lamp. The measurement light source 321 may be other light sources such as a mercury lamp, a white LED (Light Emitting Diode), or the like. The light emitted by the measurement light source 321 will be hereinafter referred to as measurement light.

The light extinction mechanism 322 includes a plurality of ND (Neutral Density) filters having transmissivity different from each other. The light extinction mechanism 322 is arranged so that any one of the plurality of ND filters is positioned on the light path of the measurement light emitted from the measurement light source 321. The ND filter positioned on the light path of the measurement light is selectively switched to adjust the intensity of the measurement light passing through the light extinction mechanism 322. The light extinction mechanism 322 may include, instead of the plurality of ND filters, optical elements such as a light modulator that can adjust the intensity of light, and the like.

The light shielding mechanism 323 is, for example, a mechanical shutter. The light shielding mechanism 323 is arranged on the light path of the measurement light having passed through the light extinction mechanism 322. If the light shielding mechanism 323 is in an opened state, the measurement light passes through the light shielding mechanism 323 and enters the light guiding member 330. If, on the other hand, the light shielding mechanism 323 is in a closed state, the measurement light is shielded and thus cannot enter the light guiding member 330. The light shielding mechanism 323 may include optical elements such as a light modulator that can switch passing and shielding of light, and the like.

The measurement unit 100 is, for example, a fluorescence microscope, and includes a pattern applying section 110, a light receiving section 120, a transmitted light supplying section 130, a stage 140, a filter unit 150, a lens unit 160, and a control board 170. The light receiving section 120, the filter unit 150, the lens unit 160, the stage 140, and the transmitted light supplying section 130 are arranged in such an order from the lower side toward the upper side.

A measuring object S is mounted on the stage 140. In the present example, the measuring object S is a biological specimen containing various types of protein. A fluorescence reagent that fuses to a specific protein is applied on the measuring object S. The fluorescence reagent includes, for example, GFP (Green Fluorescence Protein), Texas Red, and DAPI (diamidino phenyl indole).

The GFP absorbs light having a wavelength around 490 nm, and emits light having a wavelength around 510 nm. The Texas Red absorbs light having a wavelength around 596 nm and emits light having a wavelength around 620 nm. The DAPI absorbs light having a wavelength around 345 nm and emits light having a wavelength around 455 nm.

Two directions orthogonal to each other within a plane (hereinafter referred to as mounting surface) on the stage 140, on which the measuring object S is mounted, are defined as an X direction and a Y direction, and a direction orthogonal to the mounting surface is defined as a Z direction. In the present embodiment, the X direction and the Y direction are horizontal directions, and the Z direction is a vertical direction. Furthermore, in the present embodiment, the stage 140 is an X-Y stage, and is arranged to be movable in the X direction and the Y direction by a stage drive unit (not shown).

In the measurement unit 100 is configured an optical system that guides the measurement light emitted from the measurement light supplying unit 300 to the measuring object S, an optical system that guides the light emitted from the transmitted light supplying section 130 to the measuring object S, and an optical system that guides the light from the measuring object S to the light receiving section 120.

The pattern applying section 110 includes a light output portion 111, a light modulation element 112, and a plurality of (2 in the present example) mirrors 113. The light output portion 111 outputs the measurement light input to the light guiding member 330. The light output from the light output portion 111 is reflected by the plurality of mirrors 113 and enters the light modulation element 112.

The light modulation element 112 is, for example, a DMD (Digital Micro-mirror Device). The DMD is configured by a plurality of micro-mirrors arrayed in a two-dimensional form. The light modulation element 112 may be a LCOS (Liquid Crystal on Silicon: reflective liquid crystal element) or an LCD (Liquid Crystal Display). The light entering the light modulation element 112 is converted to have a pattern set in advance and an intensity (brightness) set in advance by a pattern generating portion 212, to be described later, and emitted to the filter unit 150.

Figure 3:
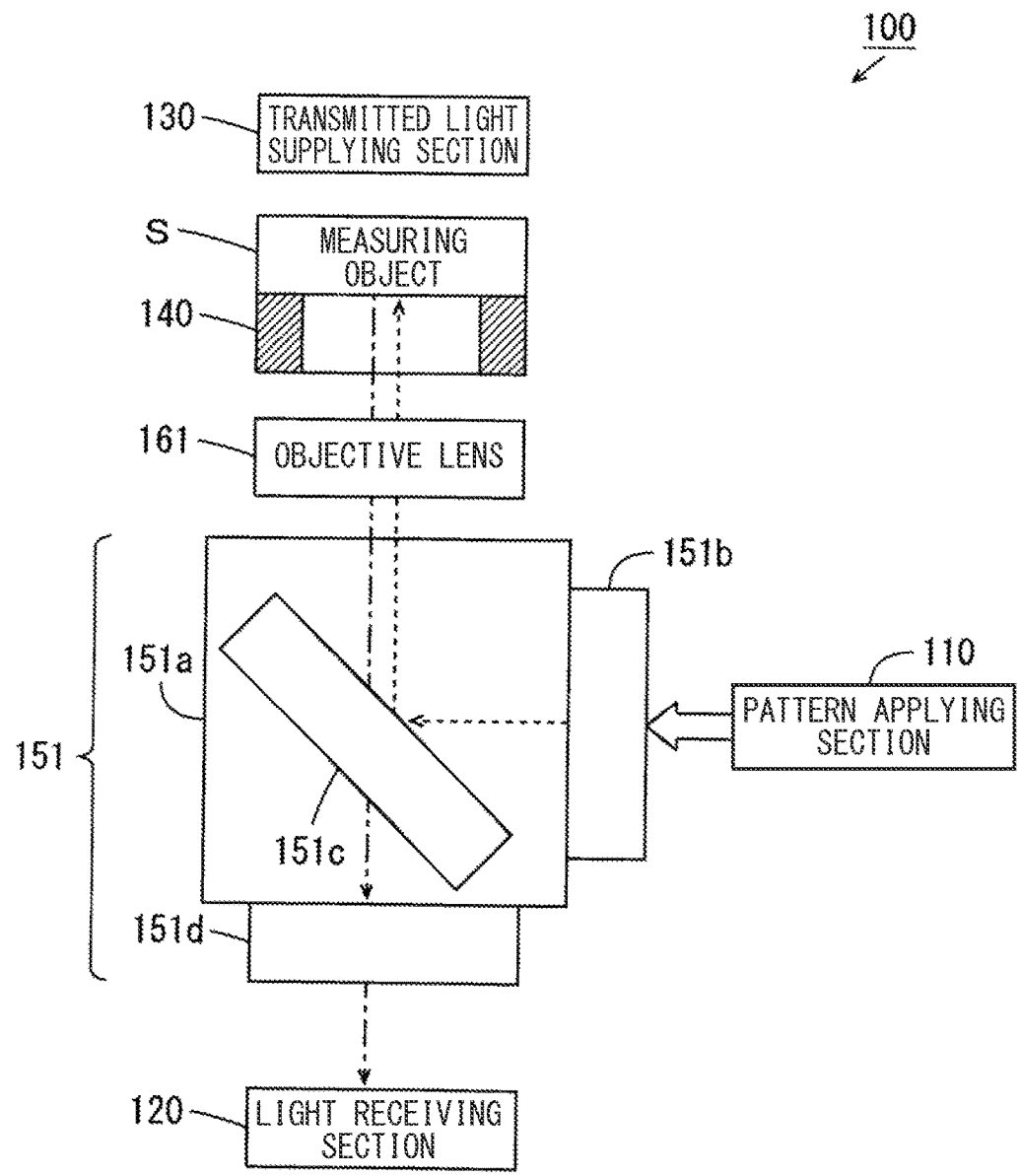
FIG. 3 is a schematic view showing a light path in the measurement unit of the microscopic imaging device of FIG. 1.

The filter unit 150 includes a plurality of (3 in the present example) filter cubes 151 and a filter turret 152. The plurality of filter cubes 151 correspond to a plurality of types of fluorescence reagents applied on the measuring object S. As shown in FIG. 3, each filter cube 151 includes a frame 151a, an excitation filter 151b, a dichroic mirror 151c, and an absorption filter 151d. The frame 151a is a cuboid member that supports the excitation filter 151b, the dichroic mirror 151c, and the absorption filter 151d.

Figure 2:
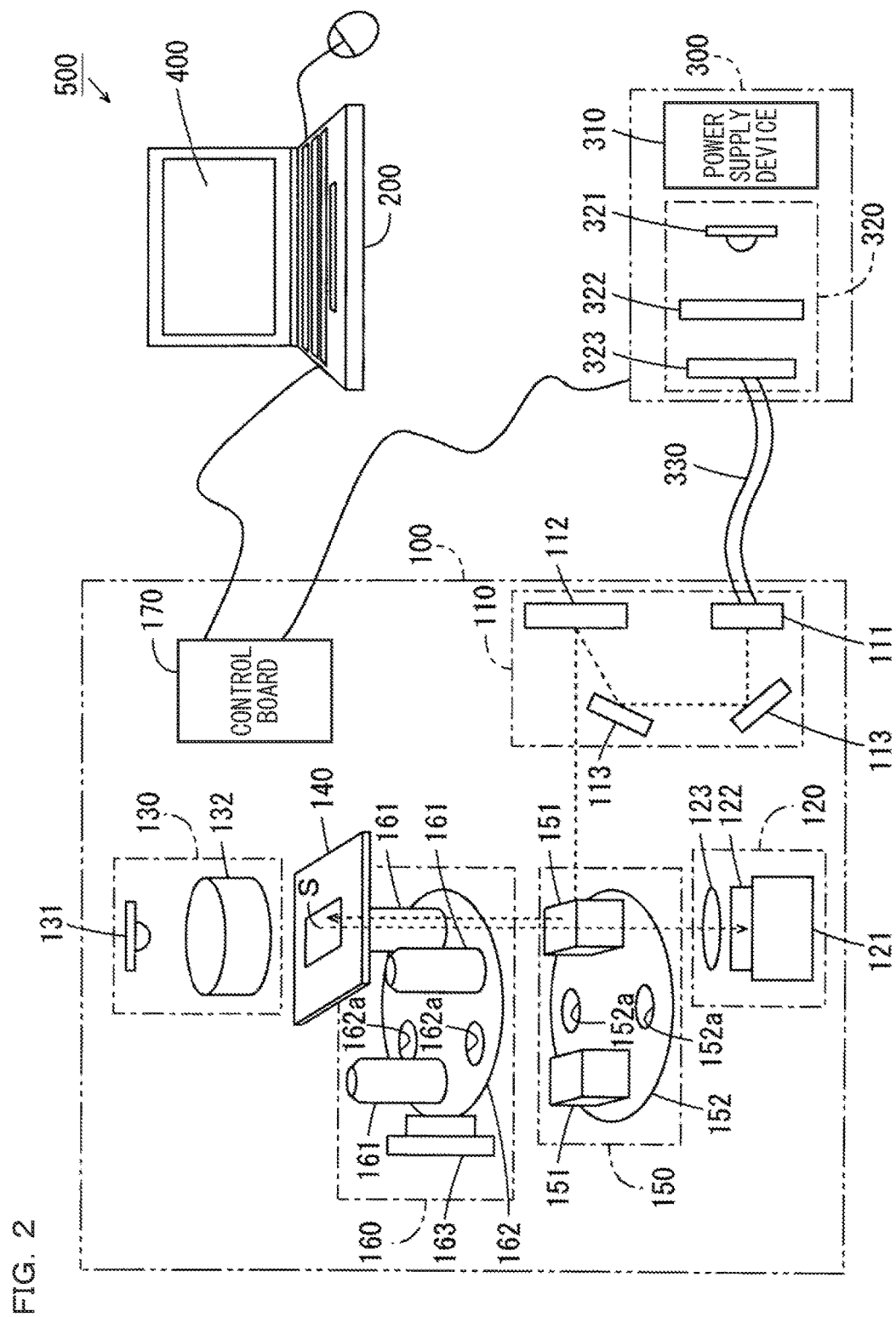
FIG. 2 is a schematic view showing a configuration of a measurement unit and a measurement light supplying unit of the microscopic imaging device of FIG. 1.

The excitation filter 151b of FIG. 2 is a band pass filter that allows light having a first wavelength band to pass therethrough. The absorption filter 151d is a band pass filter that allows light having a second wavelength band different from the first wavelength band to pass therethrough. The dichroic mirror 151c is a mirror that reflects light having a wavelength band including the first wavelength band, and allows light having a wavelength band including the second wavelength band to pass therethrough. The first and second wavelength bands differ from each other for each filter cube 151 according to the absorption wavelength and the emission wavelength of the fluorescence reagent.

The filter turret 152 has a circular plate shape. In the present embodiment, 4 filter cube attachment parts 152a are arranged on the filter turret 152 at an interval of approximately 90°. Each filter cube attachment part 152a is an opening formed so that the filter cube 151 can be attached.

In the present embodiment, 3 filter cubes 151 are attached to the 3 filter cube attachment parts 152a, and the filter cube 151 is not attached to the remaining one filter cube attachment part 152a. Thus, a bright field observation that does not use the filter cube 151 can be carried out by arranging on the light path of the measurement light the filter cube attachment part 152a to which the filter cube 151 is not attached. In the example of FIG. 2, 2 filter cubes 151 are attached to the filter turret 152.

The filter turret 152 is arranged to be rotatable at a predetermined angle interval (90° interval in the present example) about an axis parallel to the Z direction as the center by a filter turret drive unit (not shown). A user operates an operation section 250 of the PC 200, to be described later, to rotate the filter turret 152, thereby selecting the filter cube 151 to use in the measurement of the measuring object S.

The selected filter cube 151 is attached to the filter unit 150 so that the measurement light enters the excitation filter 151b. As shown in FIG. 3, when the measurement light enters the excitation filter 151b, only a component having the first wavelength band in the measurement light passes through the excitation filter 151b. The measurement light having passed through the excitation filter 151b is reflected toward the lens unit 160 (FIG. 2) on the upper side by the dichroic mirror 151c.

The lens unit 160 includes a plurality of (6 in the present example) objective lenses 161, a lens turret 162, and a focus position adjustment mechanism 163. The plurality of objective lenses 161 has a magnification different from each other. The lens turret 162 has a circular plate shape. In the present embodiment, 6 objective lens attachment parts 162a are arranged at an interval of approximately 60° on the lens turret 162. Each objective lens attachment part 162a is an opening formed so that the objective lens 161 can be attached.

In the present embodiment, 6 objective lenses 161 are attached to the 6 objective lens attachment parts 162a. In the example of FIG. 2, 3 objective lenses 161 are attached to the lens unit 160.

The lens turret 162 is arranged to be rotatable at a predetermined angle interval (60° interval in the present example) about an axis parallel to the Z direction as the center by a lens turret drive unit (not shown). The user operates the operation section 250 of the PC 200, to be described later, to rotate the lens turret 162, thereby selecting the objective lens 161 to use in the measurement of the measuring object S. The selected objective lens 161 is overlapped with the selected filter cube 151. Thus, as shown in FIG. 3, the measurement light reflected by the dichroic mirror 151c of the filter cube 151 passes through the selected objective lens 161.

The focus position adjustment mechanism 163 of FIG. 2 is arranged to be able to move the lens turret 162 in the Z direction by a focus position adjustment mechanism drive unit (not shown). The relative distance between the measuring object S on the stage 140 and the selected objective lens 161 is thereby adjusted. The stage 140 has an opening at substantially the central part. The measurement light passing the objective lens 161 passes through the opening of the stage 140 while being collected, and is applied on the measuring object S.

The measuring object S irradiated with the measurement light absorbs the measurement light, and emits a fluorescence having a wavelength band including the second wavelength band. The fluorescence emitted toward the lower side of the measuring object S passes through the selected objective lens 161 as well as the dichroic mirror 151c and the absorption filter 151d of the selected filter cube 151. A component having the second wavelength band in the fluorescence thereby enters the light receiving section 120.

In the present embodiment, the measurement unit 100 is a fluorescence microscope capable of observing the fluorescence from the measuring object S, but is not limited thereto. The measurement unit 100 may be, for example, a reflection microscope. In this case, a half mirror is attached instead of the filter cube 151 to the filter cube attachment part 152a of the filter turret 152.

The transmitted light supplying section 130 is used in the bright field observation, phase difference observation, differential interference observation, dark field observation, deviation observation, or polarization observation of the measuring object S. The transmitted light supplying section 130 includes a transmissive light source 131 and a transmissive optical system 132. The transmissive light source 131 is, for example, a white LED. The transmissive light source 131 may be other light sources such as a halogen lamp, and the like. The light emitted by the transmissive light source 131 is hereinafter referred to as transmitted light.

The transmissive optical system 132 includes optical elements such as an aperture stop, phase difference slit, relay lens, condenser lens, shutter, and the like. The transmitted light emitted by the transmissive light source 131 passes through the transmissive optical system 132 and is applied on the measuring object S on the stage 140.

The transmitted light is transmitted through the measuring object S and passes through the objective lens 161. Thereafter, the transmitted light passes through the filter cube attachment part 152a (hereinafter referred to as opening of the filter turret 152) of the filter turret 152 to which the filter cube 151 is not attached, to enter the light receiving section 120.

The light receiving section 120 includes a camera 121, a color filter 122, and an imaging lens 123. The camera 121 is, for example, a CCD (Charge Coupled Device) camera including an imaging element. The imaging element is, for example, a monochrome CCD. The imaging element may be other imaging elements such as a CMOS (Complementary Metal Oxide Semiconductor) image sensor, and the like.

The color filter 122 includes R (red), G (green), and B (blue) filters that allow light having red, green, and blue wavelengths to pass therethrough, respectively. The fluorescence or the transmitted light entering the light receiving section 120 is collected and imaged by the imaging lens 123, and then passes through the color filter 122 and is received by the camera 121. An image of the measuring object S is thereby obtained. An analog electric signal (hereinafter referred to as light receiving signal) corresponding to the light receiving amount is output from each pixel of the imaging element of the camera 121 to the control board 170.

The monochrome CCD does not need to include pixels for receiving the light having the red wavelength, pixels for receiving the light having the green wavelength, and pixels for receiving the light having the blue wavelength, unlike the color CCD. Thus, the resolution in the measurement of the monochrome CCD becomes higher than the resolution of the color CCD. Furthermore, a color filter does not need to be arranged in each pixel in the monochrome CCD, unlike the color CCD. Thus, the sensitivity of the monochrome CCD becomes higher than the sensitivity of the color CCD. For such reasons, the monochrome CCD is arranged in the camera 121 in the present example.

In the present example, the light having passed through the R filter, the G filter, and the B filter of the color filter 122 is received by the camera 121 in a time division manner. According to such a configuration, the color image of the measuring object S can be obtained by the light receiving section 120 using the monochrome CCD.

If the color CCD has sufficient resolution and sensitivity, the imaging element may be a color CCD. In this case, the camera 121 does not need to receive the light having passed through the R filter, the G filter, and the B filter in a time division manner, and hence the color filter 122 is not arranged in the light receiving section 120. The configuration of the light receiving section 120 thus can be simplified.

An A/D converter (Analog/Digital converter) (not shown) and a FIFO (First In First Out) memory are mounted on the control board 170. The light receiving signal output from the camera 121 is sampled at a constant sampling period and converted to a digital signal by the A/D converter based on a control by the PC 200. The digital signal output from the A/D converter is sequentially accumulated in the FIFO memory. The digital signals accumulated in the FIFO memory are sequentially transferred to the PC 200 as pixel data.

The control board 170 controls the operations of the pattern applying section 110, the light receiving section 120, the transmitted light supplying section 130, the stage 140, the filter unit 150, and the lens unit 160 based on the control by the PC 200. The control board 170 also controls the operation of the light projecting section 320 of the measurement light supplying unit 300 based on the control by the PC 200.

As shown in FIG. 1, the PC 200 includes a CPU (Central Processing Unit) 210, a ROM (Read Only Memory) 220, a RAM (Random Access Memory) 230, a storage device 240, and the operation section 250. The operation section 250 includes a keyboard and a pointing device. A mouse, a joy stick, or the like is used for the pointing device.

The display unit 400 is configured, for example, by an LCD panel or an organic EL (Electro Luminescence) panel. In the example of FIG. 2, the PC 200 and the display unit 400 are realized by one notebook personal computer.

A system program is stored in the ROM 220. The RAM 230 is used for processing of various data. The storage device 240 includes a hard disk, and the like. An image processing program and a microscopic imaging program are stored in the storage device 240. The storage device 240 is used to save various data such as the pixel data provided from the measurement unit 100.

Figure 4:
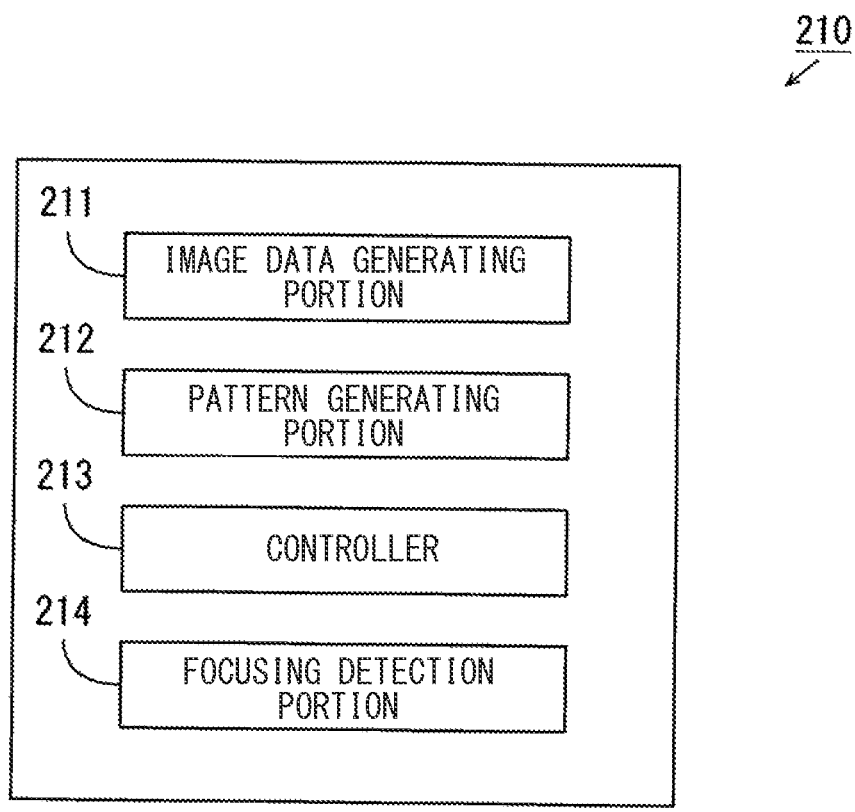
FIG. 4 is a block diagram showing a configuration of a CPU.

FIG. 4 is a block diagram showing a configuration of the CPU 210. As shown in FIG. 4, the CPU 210 includes an image data generating portion 211, a pattern generating portion 212, a controller 213, and a focusing detection portion 214. The image data generating portion 211 generates the image data based on the pixel data provided from the measurement unit 100. The image data is a collection of a plurality of pieces of pixel data.

The pattern generating portion 212 generates a pattern to be irradiated on the measuring object while sequentially moving the spatial phase by a predetermined amount as a pattern of the measurement light emitted by the light modulation element 112 of FIG. 2. The controller 213 controls the light modulation element 112 through the control board 170 of FIG. 2 based on the pattern generated by the pattern generating portion 212 to move the phase of the pattern while irradiating the measuring object S with the measurement light having a predetermined pattern.

The controller 213 controls the operations of the light receiving section 120, the transmitted light supplying section 130, the stage 140, the filter unit 150, the lens unit 160, and the light projecting section 320 through the control board 170. Furthermore, the controller 213 carries out various processing using the RAM 230 on the generated image data and displays the image based on the image data on the display unit 400.

In the measurement unit 100, the position of focus (hereinafter referred to as the focus position of the objective lens 161) of the objective lens 161 with respect to the measuring object S changes when the relative distance between the measuring object S and the objective lens 161 of FIG. 3 is changed. The measuring object S is irradiated with the measurement light while the focus position of the objective lens 161 is changed. The image data of the measuring object S at each focus position is thereby generated. The focusing detection portion 214 detects the focused position based on the plurality of pieces of image data generated by the image data generating portion 211 when the focus position of the objective lens 161 is changed to a plurality of positions by the focus position adjustment mechanism 163.

In the microscopic imaging device 500 according to the present embodiment, an epi-observation of the measuring object S can be carried out using the light projecting section 320 of FIG. 2, and a transmission normal observation (transmissive observation) of the measuring object S can be carried out using the transmitted light supplying section 130.

For the epi-observation, the sectioning observation that uses the patterned measurement light described below and the epi-normal observation that uses the uniform measurement light can be carried out. In the following description, the transmission normal observation and the epi-normal observation will be collectively referred to as the normal observation.

(2) Sectioning Observation and Epi-Normal Observation

In the sectioning observation, the measuring object S is irradiated with the measurement light having a pattern of a one-dimensional form or a two-dimensional form and the phase of the relevant pattern is moved by a constant amount. The measurement light having the pattern of a one-dimensional form has an intensity that periodically changes in one direction (e.g., Y direction) on the XY plane. The measurement light having the pattern of a two-dimensional form has an intensity that periodically changes in two directions (e.g., X direction and Y direction) that intersect each other on the XY plane.

The measurement light having the pattern is hereinafter referred to as pattern measurement light. In particular, the measurement light having the pattern of a one-dimensional form is referred to as one-dimensional pattern measurement light, and the measurement light having the pattern of a two-dimensional form is referred to as two-dimensional pattern measurement light. The measurement light having a uniform intensity is referred to as uniform measurement light.

The pattern of the pattern measurement light is controlled by the light modulation element 112. The pattern of the pattern measurement light will be described below. A portion of the pattern measurement light in which the intensity is greater than or equal to a predetermined value is referred to as a bright portion, and a portion of the pattern measurement light in which the intensity is smaller than the predetermined value is referred to as a dark portion. FIGS. 5A to 5D are views showing examples of the measurement light emitted by the pattern applying section 110.

Figure 5B:
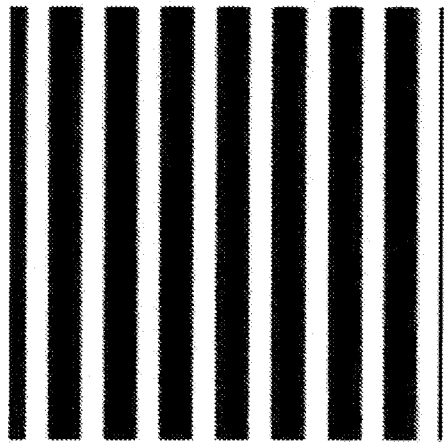
FIGS. 5A to 5D are views showing examples of measurement light emitted by a pattern applying section.
Figure 5D:
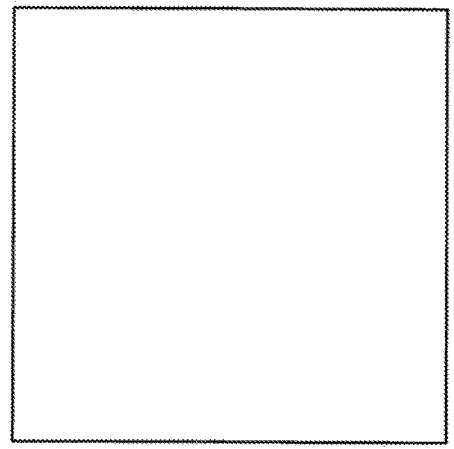
Figure 5A:
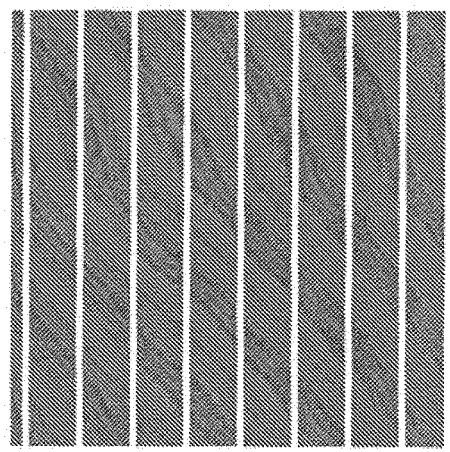

FIG. 5A shows one example of the one-dimensional pattern measurement light. The one-dimensional pattern measurement light of FIG. 5A is referred to as rectangular wave measurement light. The cross-section of the rectangular wave measurement light includes a plurality of linear bright portions parallel in one direction (e.g., X direction) and lined at a substantially equal interval in another direction (e.g., Y direction) orthogonal to the one direction, and includes a plurality of linear dark portions between the plurality of bright portions.

FIG. 5B shows another example of the one-dimensional pattern measurement light. The one-dimensional pattern measurement light of FIG. 5B is referred to as one-dimensional sine wave measurement light. The cross-section of the one-dimensional sine wave measurement light has a pattern parallel to the X direction and in which the intensity changes sinusoidally in the Y direction, for example.

Figure 5C:
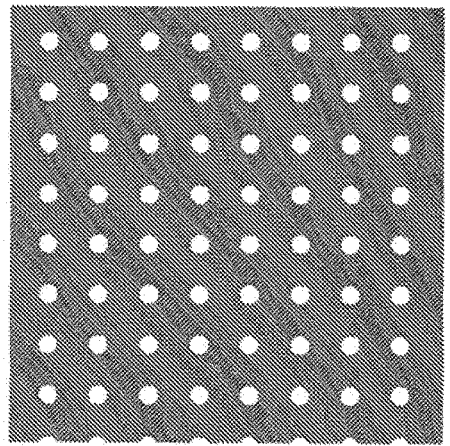

FIG. 5C shows one example of the two-dimensional pattern measurement light. The two-dimensional pattern measurement light of FIG. 5C is referred to as dot measurement light. The cross-section of the dot measurement light includes a plurality of dot-like bright portions lined at a substantially equal interval in the X direction and the Y direction.

According to another example of the two-dimensional pattern measurement light, the pattern measurement light may be two-dimensional sine wave measurement light. The cross-section of the two-dimensional sine wave measurement light has a pattern in which the intensity changes sinusoidally in the X direction and the Y direction. According to another further example of the two-dimensional pattern measurement light, the pattern measurement light may have a lattice-like pattern or a checkered pattern (checker).

In the sectioning observation, the fluorescence emitted by the measuring object S is detected while moving the phase of the pattern of the pattern measurement light by a constant amount so that the bright portion of the pattern measurement light is applied at least once on the entire irradiation range of the measurement light. A plurality of pieces of image data of the measuring object S is thereby generated.

The image data obtained when the measuring object S is irradiated with the pattern measurement light is referred to as pattern image data. An image based on the pattern image data is referred to as a pattern image.

In each pattern image data, the pixel data corresponding to the bright portion of the pattern measurement light has a high value (luminance value), and the pixel data corresponding to the dark portion of the pattern measurement light has a low value (luminance value). Thus, the pixel corresponding to the bright portion of the pattern measurement light is bright and the pixel corresponding to the dark portion of the pattern measurement light is dark in each pattern image.

A component (hereinafter referred to as focusing component) representing the extent of bright and dark difference is calculated using the values of the plurality of pieces of pixel data for every pixel from the plurality of pieces of pattern image data. The image data generated by connecting the pixels having the focusing component is referred to as sectioning image data. An image based on the sectioning image data is referred to as a sectioning image.

In the pattern image data generated using the rectangular wave measurement light or the dot measurement light, the focusing component is, for example, a difference between a maximum value (maximum luminance value) and a minimum value (minimum luminance value) of the pixel data, or a standard deviation of the values of the pixel data. In the pattern image data generated using the one-dimensional sine wave measurement light or the two-dimensional sine wave measurement light, the focusing component is, for example, an amplitude (peak to peak) of the pixel data.

In the simplest method, pixel data having the maximum value is selected from the plurality of pieces of pattern image data for each pixel, and pieces of the selected pixel data are connected for all the pixels to generate the sectioning image data.

Each pattern image is subjected to the influence of stray light. Blurring thus occurs in the pattern of the pattern image. A component caused by the stray light is referred to as blurring component in each pattern image data. The blurring component includes a blurring component caused by the stray light generated at each bright portion itself of the pattern measurement light, and a blurring component caused by the stray light from other bright portions adjacent to each bright portion of the pattern measurement light.

Thus, in order to remove the influence of the stray light, the difference in the pixel data of the pattern image data of when the bright portion and the dark portion of the pattern measurement light are applied is calculated for each pixel. The calculated differences for all the pixels are connected to generate the sectioning image data. The value of the pixel data of the pattern image data of when the dark portion of the pattern measurement light is applied corresponds to the blurring component for each pixel. Therefore, the sectioning image data in which the influence of the stray light is removed can be obtained.

As an example of a method for generating the sectioning image data, in the present embodiment, a difference between the maximum value (maximum luminance value) and the minimum value (minimum luminance value) of a plurality of pieces pixel data of a plurality of pieces of pattern image data is calculated for each pixel. The calculated differences for all the pixels are connected to generate the sectioning image data. The sectioning image may be generated based on the plurality of pieces of pixel data of the plurality of pieces of pattern image data through other methods.

For example, a standard deviation of the values of the plurality of pieces of pixel data of the plurality of pieces of pattern image data is calculated for each pixel. The calculated standard deviations for all the pixels may be connected to generate the sectioning image data.

In the sectioning observation, the phase of the pattern measurement light is moved in the Y direction, for example, when the one-dimensional pattern measurement light is used, and hence the sectioning image data in which the blurring component in the Y direction is removed is generated. The number of imaging is reduced since the phase of the pattern measurement light does not need to be moved in the X direction, for example. Thus, the sectioning image having a relatively high image quality can be obtained at high speed.

In the sectioning observation, the phase of the pattern measurement light is moved in the X direction and the Y direction when the two-dimensional pattern measurement light is used, and hence the sectioning image data in which the blurring component in the X direction and the Y direction is removed is generated. The number of imaging is thus increased compared to when the one-dimensional pattern measurement light is used, but the sectioning image having a very high image quality can be obtained.

In particular, if the measurement unit 100 is the fluorescence microscope, the fluorescence reagent of the measuring object S may lose color when the measuring object S is irradiated with the pattern measurement light over a great number of times. Thus, it is important to reduce the number of imaging depending on the measuring object S.

In the present embodiment, the one-dimensional pattern measurement light and the two-dimensional pattern measurement light can be switched easily at high speed by controlling the light modulation element 112. Therefore, the user can select the pattern measurement light to use in the sectioning observation in view of the time (number of imaging) required for the generation of the sectioning image data and the image quality of the obtained sectioning image.

FIG. 5D shows one example of the uniform measurement light. The uniform measurement light has a uniform intensity distribution. In other words, the uniform measurement light is measurement light including only the bright portion. In the epi-normal observation, all the portions of the measuring object S are irradiated with the uniform measurement light of FIG. 5D, and the fluorescence emitted by the measuring object S is detected. The image data of the measuring object S is thereby generated. The image data obtained in the epi-normal observation is referred to as epi-normal image data, and an image based on the epi-normal image data is referred to as an epi-normal image.

If the measuring object S has a three-dimensional structure, the objective lens 161 may be brought to focus on one portion of the measuring object S but the objective lens 161 may not be brought to focus on other portions of the measuring object S. Therefore, the pixel data of some portions of the sectioning image data or the epi-normal image data at a certain focus position is obtained while focused on the portion of the measuring object S, and the pixel data of other portions is obtained while not focused on the portion of the measuring object S. The pixel data obtained when brought to focus on some portions of the measuring object S is hereinafter referred to as focused point pixel data.

The focused point pixel data of the plurality of pieces of sectioning image data or epi-normal image data obtained at a plurality of focus positions are synthesized, so that the image data obtained while focused on the entire measuring object S is generated. The image data obtained while focused on the entire measuring object S is hereinafter referred to as omnifocus image data. An image based on the omnifocus image data is referred to as an omnifocus image.

Figure 6:
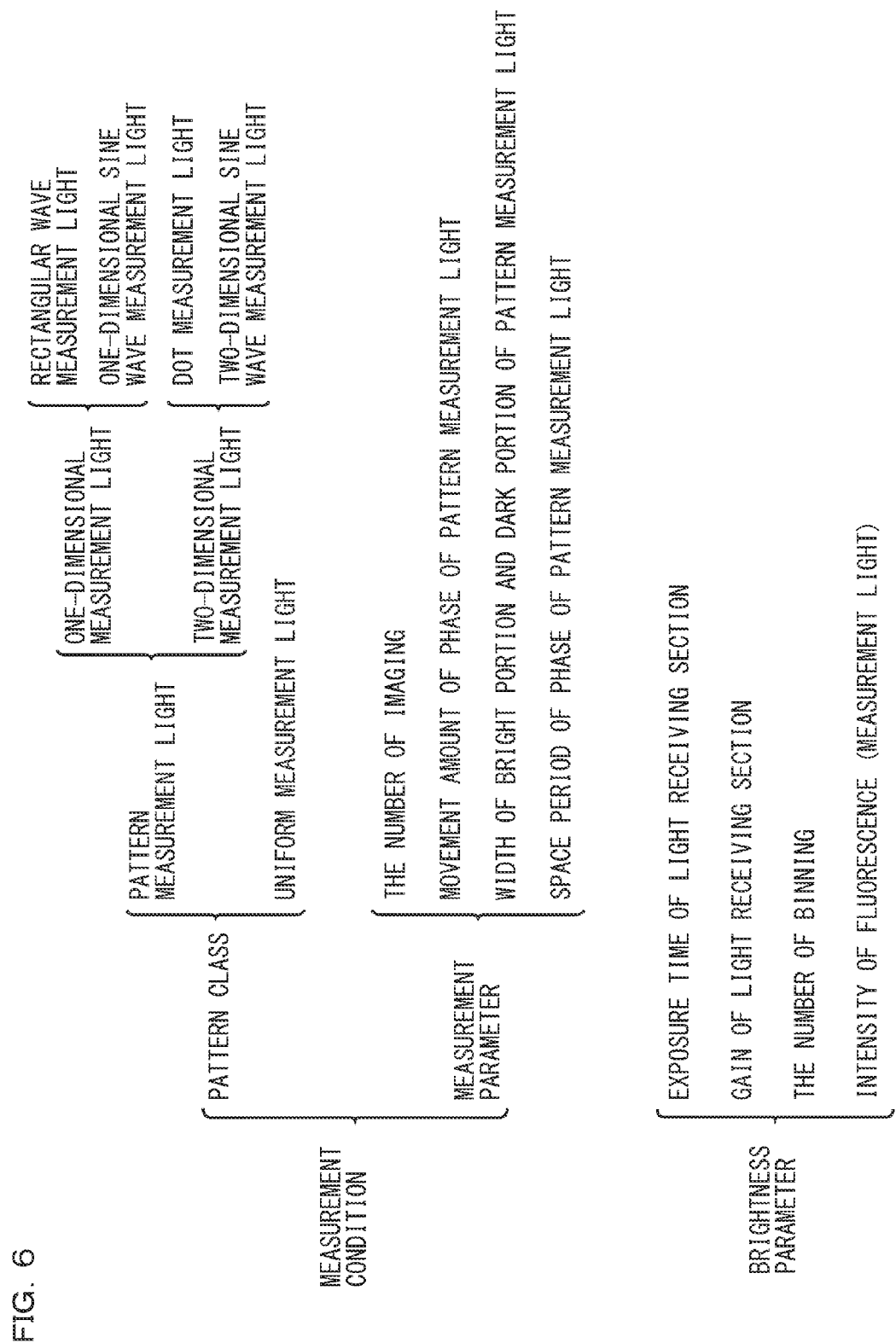
FIG. 6 is a view showing types of measurement condition and brightness parameter.

(3) Setting of Measurement Condition (a) Measurement Condition and Brightness Parameter The measurement conditions in the sectioning observation, as well as the brightness parameters in the sectioning observation and the epi-normal observation will now be described. FIG. 6 is a view showing types of measurement condition and brightness parameter.

As shown in FIG. 6, the measurement conditions in the sectioning observation include a pattern class and a measurement parameter. The pattern class includes the pattern measurement light and the uniform measurement light. The pattern measurement light includes the one-dimensional pattern measurement light and the two-dimensional pattern measurement light. The one-dimensional pattern measurement light includes the rectangular wave measurement light and the one-dimensional sine wave measurement light. The two-dimensional pattern measurement light includes the dot measurement light and the two-dimensional sine wave measurement light.

The measurement parameters in the sectioning observation include the number of imaging, the movement amount of the phase of the pattern measurement light, the widths of the bright portion and the dark portion of the pattern measurement light, as well as the space period of the phase of the pattern measurement light. The number of imaging is the number of generations of the pattern image data.

The brightness parameter includes the exposure time of the light receiving section 120, the gain of the light receiving section 120, the number of binning in the pattern image data or the epi-normal image data and the intensity of the fluorescence (measurement light). The number of binning refers to the number of pieces of pixel data coupled in the binning process of pseudo coupling the plurality of pieces of pixel data to be handled as one piece of pixel data.

The appropriate measurement parameter in the sectioning observation differs according to the pattern class. The brightness parameter is appropriately set automatically in cooperation with the measurement condition. The setting of the measurement parameter corresponding to the pattern class will now be described below.

(b) Rectangular Wave Measurement Light

FIGS. 7A and 7B are views showing an intensity distribution of the rectangular wave measurement light. The horizontal axis in FIGS. 7A and 7B indicates the position (e.g., position in the Y direction) of the rectangular wave measurement light, and the vertical axis indicates the intensity of the rectangular wave measurement light. FIG. 7A shows the intensity distribution of the ideal rectangular wave measurement light. In the ideal rectangular wave measurement light, each bright portion has a substantially rectangular intensity distribution.

A maximum intensity (intensity of each bright portion) of the rectangular wave measurement light is Imax. A minimum intensity (intensity of each dark portion) of the rectangular wave measurement light is Imin. The image quality of the pattern image can be enhanced as the difference increases between the maximum intensity Imax and the minimum intensity Imin of the rectangular wave measurement light.

An average intensity of the rectangular wave measurement light is Iave. The pattern image becomes brighter as the average intensity Iave of the rectangular wave measurement light increases. Since the average intensity Iave of the rectangular wave measurement light is relatively small, the pattern image is relatively dark. Therefore, if the rectangular measurement light is selected, a relatively large brightness parameter is automatically set. The pattern image thus can be brightened.

The width of each bright portion of the rectangular wave measurement light is W1, and the width of each dark portion of the rectangular wave measurement light is W2. The pattern is repeated at a constant space period Ts. The space period Ts is the sum of the width W1 of the bright portion and the width W2 of the dark portion.

When the light modulation element 112 is the DMD, the dimension of each micro-mirror is assumed as 1 unit. The width W1 of each bright portion of the rectangular wave measurement light is, for example, 4 units, and the width W2 of each dark portion of the rectangular wave measurement light is, for example, 12 units. In this case, the space period Ts is 16 units. The units of the bright portion and the dark portion differ according to the configuration of the light modulation element 112. For example, when the light modulation element 112 is the LCD, 1 unit is the dimension of 1 pixel.

When the space period Ts is small, a portion of the measuring object S, to which one bright portion of the rectangular wave measurement light is to be applied, might be irradiated with the stray light from other bright portions. In this case, the blurring that occurs in the pattern image increases. Thus, the blurring that occurs in the pattern image can be reduced by setting the space period Ts large.

If the width W1 of each bright portion of the rectangular wave measurement light is large, the image quality of the pattern image at the details of the measuring object S lowers when the measuring object S is irradiated with the stray light in each bright portion. The image quality of the pattern image at the details of the measuring object S thus can be enhanced by setting the width W1 of the rectangular wave bright portion small.

FIG. 7B shows the intensity distribution of the realistic rectangular wave measurement light. In the realistic rectangular wave measurement light, the intensity distribution of each bright portion takes a substantially trapezoidal shape. The maximum intensity Imax of the realistic rectangular wave measurement light is smaller than the maximum intensity Imax of the ideal rectangular wave measurement light of FIG. 7A. The minimum intensity Imin of the realistic rectangular wave measurement light is greater than the minimum intensity Imin of the ideal rectangular wave measurement light of FIG. 7A.

The movement amount of the phase of the pattern of the rectangular wave measurement light is set such that the bright portion of the rectangular wave measurement light of FIG. 7B is applied at least once on the entire irradiation range of the measurement light. FIGS. 8A and 8B are views describing the movement amount of the phase of the pattern of the rectangular wave measurement light of FIG. 7B. The horizontal axis of FIGS. 8A and 8B indicates the position (e.g., position in the Y direction) of the rectangular wave measurement light, and the vertical axis indicates the intensity of the rectangular wave measurement light.

In the example of FIG. 8A, the measuring object S is irradiated with the rectangular wave measurement light so that the bright portion is positioned at the portion A of the measuring object S at a first time point. The fluorescence emitted from the portion A of the measuring object S is thereby received by the light receiving section 120. The 1st pattern image data of the measuring object S is thereby generated based on the light receiving amount of the fluorescence.

Thereafter, the phase of the pattern of the rectangular wave measurement light is moved in the Y direction by approximately ⅓ of the space period Ts. Then, at a 2nd time point after the 1st time point, the measuring object S is irradiated with the rectangular wave measurement light so that the bright portion is positioned at the portion B of the measuring object S. The fluorescence emitted from the portion B of the measuring object S is thereby received by the light receiving section 120. The 2nd pattern image data of the measuring object S is thereby generated based on the light receiving amount of the fluorescence.

Thereafter, the phase of the pattern of the rectangular wave measurement light is further moved in the Y direction by approximately ⅓ of the space period Ts. Then, at a 3rd time point after the 2nd time point, the measuring object S is irradiated with the rectangular wave measurement light so that the bright portion is positioned at the portion C of the measuring object S. The fluorescence emitted from the portion C of the measuring object S is thereby received by the light receiving section 120. The 3rd pattern image data of the measuring object S is thereby generated based on the light receiving amount of the fluorescence.

Thus, all the portions of the measuring object S are irradiated with the bright portion by irradiating the measuring object S with the rectangular wave measurement light 3 times while moving the phase of the pattern. The sectioning image data is generated based on the generated 1st to 3rd pattern image data. The sectioning image data is equivalent to the pattern image data generated when all the portions of the measuring object S are irradiated with the measurement light having the intensity distribution shown with a thick curve of FIG. 8A.

However, in the example of FIG. 8A, the intensity of the bright portion applied on the vicinity of the boundary of the portions A, B, the vicinity of the boundary of the portions B, C, and the vicinity of the boundary of the portions C, A is smaller than the intensity of the bright portion applied on the vicinity of the middle of the portions A to C. In this case, the pixel of the sectioning image data corresponding to the vicinity of the boundary of the portions A, B, the vicinity of the boundary of the portions B, C, and the vicinity of the boundary of the portions C, A either becomes dark or lacks. The accurate sectioning image data thus cannot be generated.

In the example of FIG. 8B, the measuring object S is irradiated with the rectangular wave measurement light so that the bright portion is positioned at the portion A of the measuring object S at the 1st time point, whereby the 1st pattern image data of the measuring object S is generated. Thereafter, the phase of the pattern of the rectangular wave measurement light is moved in the Y direction by approximately 1/5 of the space period Ts.

Similar emitting of the rectangular wave measurement light and movement of the phase of the pattern are repeated in such a manner. Thus, the measuring object S is irradiated with the rectangular wave measurement light so that the bright portion is positioned at the portions B to E of the measuring object S at the 2nd to 5th time points, respectively, whereby the 2nd to 5th pattern image data is generated.

Thus, all the portions of the measuring object S are irradiated with the bright portion by irradiating the measuring object S with the rectangular wave measurement light 5 times while moving the phase of the pattern. The sectioning image data is generated based on the generated 1st to 5th pattern image data. The sectioning image data is equivalent to the pattern image data generated when all the portions of the measuring object S are irradiated with the measurement light having the intensity distribution shown with a thick curve of FIG. 8B.

In the example of FIG. 8B, the intensity of the bright portion applied on all the portions of the measuring object S is substantially uniform. Thus, the accurate sectioning image data of the measuring object S can be generated.

(c) One-Dimensional Sine Wave Measurement Light

Figure 9A:
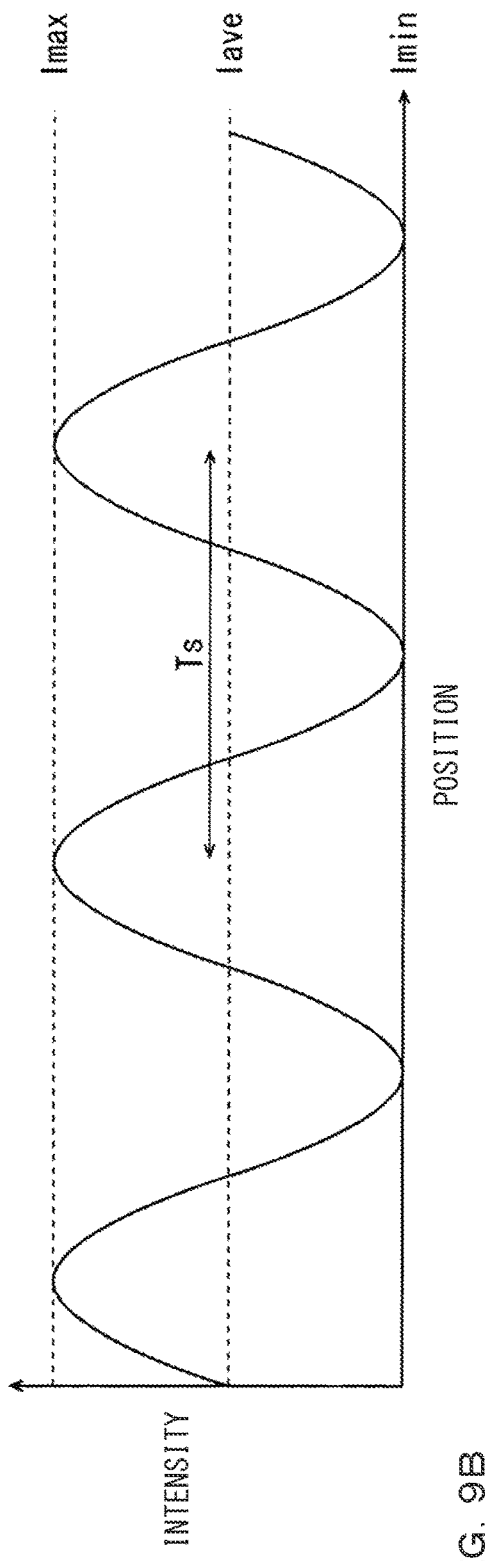
FIGS. 9A and 9B are views showing an intensity distribution of the one dimensional sine wave measurement light.
Figure 9B:
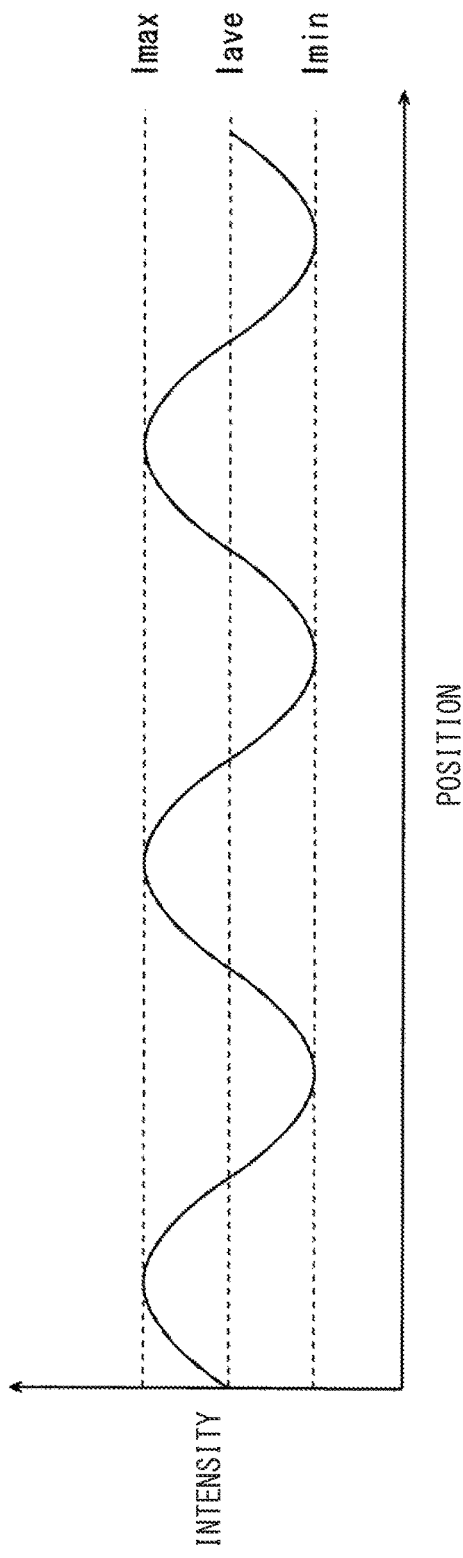

FIGS. 9A and 9B are views showing an intensity distribution of the one-dimensional sine wave measurement light. The horizontal axis in FIGS. 9A and 9B indicates the position (e.g., position in the Y direction) of the one-dimensional sine wave measurement light, and the vertical axis indicates the intensity of the one-dimensional sine wave measurement light.

FIG. 9A shows the intensity distribution of the ideal one-dimensional sine wave measurement light. A maximum intensity of the one-dimensional sine wave measurement light is Imax. A minimum intensity of the one-dimensional sine wave measurement light is Imin. An average intensity of the one-dimensional sine wave measurement light is Iave. The average intensity Iave of the one-dimensional sine wave measurement light is greater than the average intensity Iave of the rectangular wave measurement light. The pattern image using the one-dimensional sine wave measurement light is thus brighter than the pattern image using the rectangular wave measurement light. When the one-dimensional sine wave measurement light is selected, therefore, a relatively small brightness parameter is automatically set.

The pattern is repeated at a constant space period Ts. If the space period Ts is large, the broad-based blurring component generated in the sectioning image can be reduced but the image quality of the sectioning image at the details of the measuring object S lowers. Thus, the space period Ts is appropriately set by the trade-off of the broad-based blurring that occurs in the sectioning image and the image quality of the sectioning image at the details of the measuring object S.

FIG. 9B shows the intensity distribution of the realistic one-dimensional sine wave measurement light. The maximum intensity Imax of the realistic sine wave measurement light is smaller than the maximum intensity Imax of the ideal one-dimensional sine wave measurement light of FIG. 9A. The minimum intensity Imin of the realistic one-dimensional sine wave measurement light is larger than the minimum intensity Imin of the ideal one-dimensional sine wave measurement light of FIG. 9A.

Figure 10:
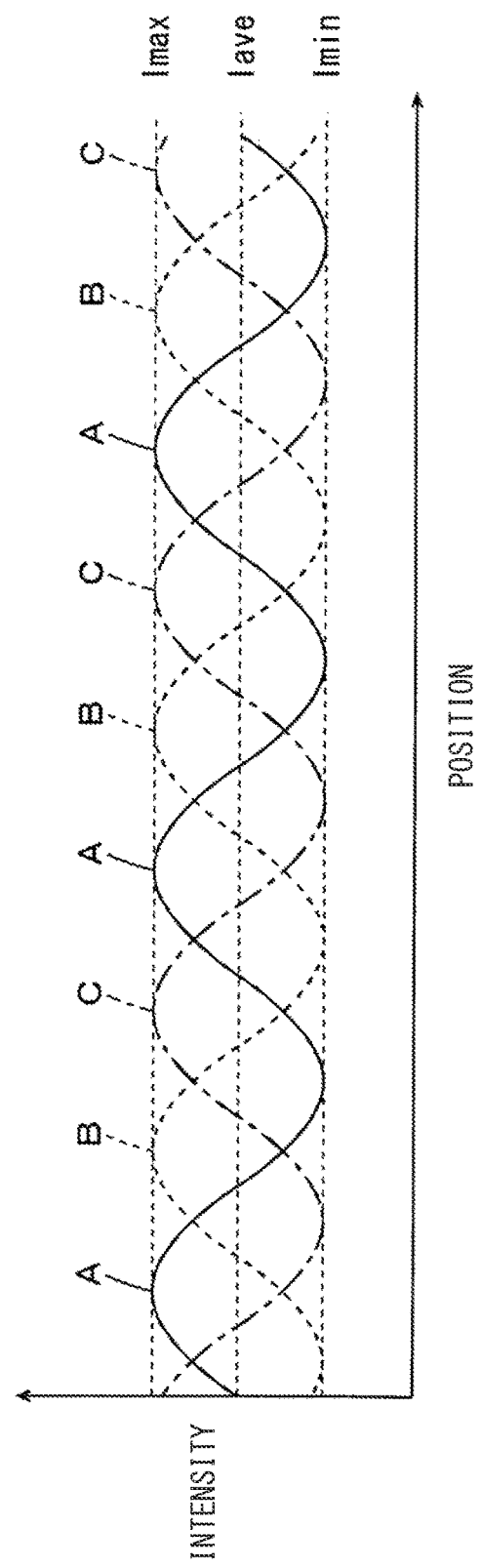
FIG. 10 is a view describing the movement amount of the phase of the pattern of the one dimensional sine wave measurement light of FIG. 9B.

The movement amount of the phase of the pattern of the one-dimensional sine wave measurement light is set so that the bright portion of the one-dimensional sine wave measurement light of FIG. 9B is applied at least once on the entire irradiation range of the measurement light. FIG. 10 is a view describing the movement amount of the phase of the pattern of the one-dimensional sine wave measurement light of FIG. 9B. The horizontal axis of FIG. 10 indicates the position (e.g., position in the Y direction) of the one-dimensional sine wave measurement light, and the vertical axis indicates the intensity of the one-dimensional sine wave measurement light.

In the example of FIG. 10, the measuring object S is irradiated with the one-dimensional sine wave measurement light so that the bright portion is positioned at the portion A of the measuring object S at a 1st time point, and the 1st pattern image data of the measuring object S is generated. Thereafter, the phase of the pattern of the one-dimensional sine wave measurement light is moved in the Y direction by approximately 1/3 of the space period Ts.

Similar emitting of the one-dimensional sine wave measurement light and movement of the phase of the pattern are repeated in such a manner. Thus, the measuring object S is irradiated with the one-dimensional sine wave measurement light so that the bright portion is positioned at the portions B, C of the measuring object S at 2nd and 3rd time points, respectively, and the 2nd and 3rd pattern image data is generated.

Thus, all the portions of the measuring object S are irradiated with the bright portion by irradiating the measuring object S with the one-dimensional sine wave measurement light 3 times while moving the phase of the pattern. The sectioning image data is generated based on the generated 1st to 3rd pattern image data.

Specifically, assuming the values of arbitrary pixel data in the 1st to 3rd pattern image data are $L_A$, $L_B$, and $L_C$, respectively, the value L of the pixel data is calculated with the following equation (1). The sectioning image data using the one-dimensional sine wave measurement light can be generated by connecting the calculated pixel data for all the pixels.

[Equation 1]

$$L=\sqrt{(L_A-L_B)^2+(L_B-L_C)^2+(L_C-L_A)^2} \quad (1)$$

(d) Dot Measurement Light

The setting of the measurement parameter using the dot measurement light is similar to the setting of the measurement parameter using the rectangular wave measurement light except for the following aspects.

The pattern of the dot measurement light is repeated at a constant space period Ts not only in the Y direction, but also in the X direction, for example. Thus, when using the dot measurement light, the phase of the pattern is moved in the Y direction by the set number of times (5 times in the present example), and then the phase of the pattern is moved in the X direction by the set number of times (5 times in the present example).

The fluorescence emitted from the measuring object S is received by the light receiving section 120 with the phase of the pattern moved. The 1st to 25th pattern image data of the measuring object S is thereby generated based on the light receiving amount of the fluorescence.

Thus, all the portions of the measuring object S are irradiated with the bright portion by irradiating the measuring object S with the dot measurement light 25 times while moving the phase of the pattern. The sectioning image data is generated based on the generated 1st to 25th pattern image data.

(e) Two-Dimensional Sine Wave Measurement Light

The setting of the measurement parameter using the two-dimensional sine wave measurement light is similar to the setting of the measurement parameter using the one-dimensional sine wave measurement light except for the following aspects.

The pattern of the two-dimensional sine wave measurement light is repeated at a constant space period Ts not only in the Y direction, but also in the X direction, for example. Thus, when using the two-dimensional sine wave measurement light, the phase of the pattern is moved in the Y direction by the set number of times (3 times in the present example). Such movement of the phase of the pattern in the Y direction is repeated while moving the phase of the pattern in the X direction by the set number of times (3 times in the present example).

The fluorescence emitted from the measuring object S is received by the light receiving section 120 with the phase of the pattern moved. The 1st to 9th pattern image data is thereby generated based on the light receiving amount of the fluorescence.

Thus, all the portions of the measuring object S are irradiated with the bright portion by irradiating the measuring object S with the two-dimensional sine wave measurement light 9 times while moving the phase of the pattern. The sectioning image data is generated based on the generated 1st to 9th pattern image data. Specifically, the value L of the pixel data similar to equation (1) is calculated for all the pixels, and pieces of the calculated pixel data are connected to generate the sectioning image data using the two-dimensional sine wave measurement light.

(f) Uniform Measurement Light

When the sectioning observation is not carried out, the epi-normal image data can be generated using the uniform measurement light by the epi-normal observation. When using the uniform measurement light, all the portions of the measuring object S are irradiated with the bright portion, and hence the phase of the uniform measurement light does not need to be moved. The setting of the space period Ts is thus not carried out. Since the intensity of the uniform measurement light is sufficiently large, the image of the measuring object S using the uniform measurement light is sufficiently bright. Therefore, when the uniform measurement light is selected, a sufficiently small brightness parameter is automatically set. The measuring object S is irradiated with the uniform measurement light once, and one piece of epi-normal image data is generated.

Thus, the sectioning observation and the epi-normal observation can be used according to the purpose. In the sectioning observation, the pattern class is set. The sectioning image data having the property corresponding to the pattern class thus can be generated. The measurement parameter is set according to the set pattern class.

As one example of the measurement parameter, the number of imaging is set from 5 to 10 times in the rectangular wave measurement light, and is set from 3 or 4 times in the one-dimensional sine wave measurement light. Furthermore, the number of imaging is set from 25 to 100 times in the dot measurement light, and is set from 9 to 16 times in the two-dimensional sine wave measurement light. The number of imaging is 1 in the uniform measurement light.

In the present example, the number of imaging is automatically set by setting the pattern class, the movement amount of the phase of the pattern, and the space period Ts. For example, the number of imaging is given by the ratio of the space period Ts with respect to the movement amount of the phase of the pattern when using the one-dimensional measurement light, and the number of imaging is given by the square of the ratio of the space period Ts with respect to the movement amount of the phase of the pattern when using the two-dimensional measurement light.

The brightness parameter is appropriately set automatically in cooperation with the ratio of the bright portion with respect to the dark portion of the pattern measurement light that changes according to the measurement condition. In a first example of the brightness parameter, the exposure time of the light receiving section 120 is set relatively long in the rectangular wave measurement light and the dot measurement light. The exposure time of the light receiving section 120 is set relatively short in the one-dimensional sine wave measurement light and the two-dimensional sine wave measurement light. The exposure time of the light receiving section 120 is set sufficiently short in the uniform measurement light.

In a second example of the brightness parameter, the intensity of the fluorescence, that is, the intensity of the measurement light may be set relatively large in the rectangular wave measurement light and the dot measurement light. The intensity of the measurement light may be set relatively small in the one-dimensional sine wave measurement light and the two-dimensional sine wave measurement light. The intensity of the measurement light may be set sufficiently small in the uniform measurement light.

In a third example of the brightness parameter, the number of binning in the pattern image data may be set relatively large in the rectangular wave measurement light and the dot measurement light. The number of binning in the pattern image data may be set relatively small in the one-dimensional sine wave measurement light and the two-dimensional sine wave measurement light. The number of binning in the epi-normal image data may be set sufficiently small in the uniform measurement light.

In a fourth example of the brightness parameter, the gain of the light receiving section 120 may be set relatively large in the rectangular wave measurement light and the dot measurement light. The gain of the light receiving section 120 may be set relatively small in the one-dimensional sine wave measurement light and the two-dimensional sine wave measurement light. The gain of the light receiving section 120 may be set sufficiently small in the uniform measurement light.

In the pattern measurement light, the space period Ts is set according to the allowable extent of blurring that occurs in the pattern image. The width W1 of the bright portion is set in the rectangular wave measurement light and the dot measurement light.

FIGS. 11A and 11B are views showing the intensity distribution of the rectangular wave measurement light of when the space period Ts is smaller than the space period Ts of FIGS. 7A and 7B. FIG. 11A shows the intensity distribution of the ideal rectangular wave measurement light, and FIG. 11B shows the intensity distribution of the realistic rectangular wave measurement light.

If the space period Ts is small, a portion of the measuring object S to be irradiated with one bright portion of the rectangular wave measurement light might be irradiated with the stray light from other bright portions. In the example of FIG. 11B, for example, a portion of the measuring object S to be irradiated with the bright portion b might be irradiated with the stray light from the bright portion a or the bright portion c. In this case, the broad-based blurring component that occurs in the sectioning image increases.

If the space period Ts is small, however, the interval of the bright portions a to e is small, and hence the irradiation with the bright portions a to e on the entire irradiation range of the measurement light is carried out in a short period of time. The number of imaging is thus reduced, and the sectioning image data can be generated in a short period of time.

FIGS. 12A and 12B are views showing the intensity distribution of the rectangular wave measurement light of when the space period Ts is larger than the space period Ts of FIGS. 7A and 7B. FIG. 12A shows the intensity distribution of the ideal rectangular wave measurement light, and FIG. 12B shows the intensity distribution of the realistic rectangular wave measurement light.

If the space period Ts is large, the interval of the bright portions a to e is large, and hence a long period of time is required until the completion of the irradiation with the bright portions a to e on the entire irradiation range of the measurement light. In this case, the number of imaging is increased, and a long period of time is required until the generation of the sectioning image data.

If the space period Ts is large, however, the portion of the measuring object S to be irradiated with one bright portion of the rectangular wave measurement light is rarely irradiated with the stray light from other bright portions. Thus, the broad-based blurring component of the sectioning image can be reduced.

FIGS. 13A and 13B are views showing the intensity distribution of the rectangular wave measurement light of when the width W1 of the bright portion is greater than the width W1 of the bright portion of FIGS. 7A and 7B. FIG. 13A shows the intensity distribution of the ideal rectangular wave measurement light, and FIG. 13B shows the intensity distribution of the realistic rectangular wave measurement light.

If the width W1 of the bright portion is large, however, the corresponding portion of the measuring object S might be irradiated with the stray light generated in each bright portion itself of the rectangular wave measurement light. In the example of FIG. 13B, the corresponding portion of the measuring object S might be irradiated with the stray light generated in each of the bright portions a to e. In this case, the image quality of the sectioning image at the details of the measuring object S lowers.

If the width W1 of the bright portion is large, the width W2 of the dark portion is small, and thus the irradiation with the bright portions a to d on the entire irradiation range of the measurement light is carried out in a short period of time. The number of imaging thus can be reduced, and the sectioning image data can be generated in a short period of time.

FIGS. 14A and 14B are views showing the intensity distribution of the rectangular wave measurement light of when the width W1 of the bright portion is smaller than the width W1 of the bright portion of FIGS. 7A and 7B. FIG. 14A shows the intensity distribution of the ideal rectangular wave measurement light, and FIG. 14B shows the intensity distribution of the realistic rectangular wave measurement light.

If the width W1 of the bright portion is small, the width W2 of the dark portion is large, and hence a long period of time is required until the completion of the irradiation with the bright portions a to d on the entire irradiation range of the measurement light. In this case, the number of imaging is increased, and a long period of time is required until the generation of the sectioning image data.

If the width W1 of the bright portion is small, however, the corresponding portion of the measuring object S is rarely irradiated with the stray light generated in each bright portion itself of the rectangular wave measurement light. The image quality of the sectioning image at the details of the measuring object S thus can be enhanced.

The user can arbitrarily set the movement amount of the phase of the pattern. Since the entire irradiation range of the measurement light is irradiated with the bright portion of the rectangular wave measurement light at least once, the movement amount of the phase of the pattern is preferably set to be slightly smaller than the width W1 of the bright portion. The ratio of the space period Ts with respect to the set movement amount of the phase of the pattern corresponds to the number of imaging.

In the present embodiment, the measurement parameter set in correspondence with the pattern class is automatically switched by switching the pattern class. The measurement parameter may be a fixed value in correspondence with the pattern class, or may be selected from a plurality of values defined in advance. If a part of the plurality of measurement parameters is selected by the user, other parts of the measurement parameter may be automatically determined.

Other setting items other than the measurement condition and the brightness parameter may be added. For example, in the present embodiment, the user can set an ROI (Region Of Interest) using the operation section 250 of FIG. 1. In this case, the light modulation element 112 may be controlled so that only a portion of the measuring object S corresponding to the ROI is irradiated with the measurement light, and other portions are not irradiated with the measurement light. A plurality of pieces of pattern image data or epi-normal image data thus can be generated at high speed.

The level of the light receiving signal at each pixel output from the light receiving section 120 may not be uniform even if the light receiving section 120 receives the light having uniform intensity. This is due to reasons such as the intensity of the light is originally non-uniform, the reflectivity of the mirror is not uniform in the entire reflection surface, the transmissivity of the lens is not uniform in the entire lens, and the like. The shading phenomenon in which the center part of the image becomes bright and the peripheral edge part of the image becomes dark thus occurs.

In order to uniformly correct (hereinafter referred to as shading correction) the non-uniform level of the light receiving signal, the light modulation element 112 may be controlled to emit the measurement light having the intensity multiplied with the shading correction coefficient. A plurality of pieces of pattern image data or epi-normal image data thus can be accurately generated.

Figure 15:
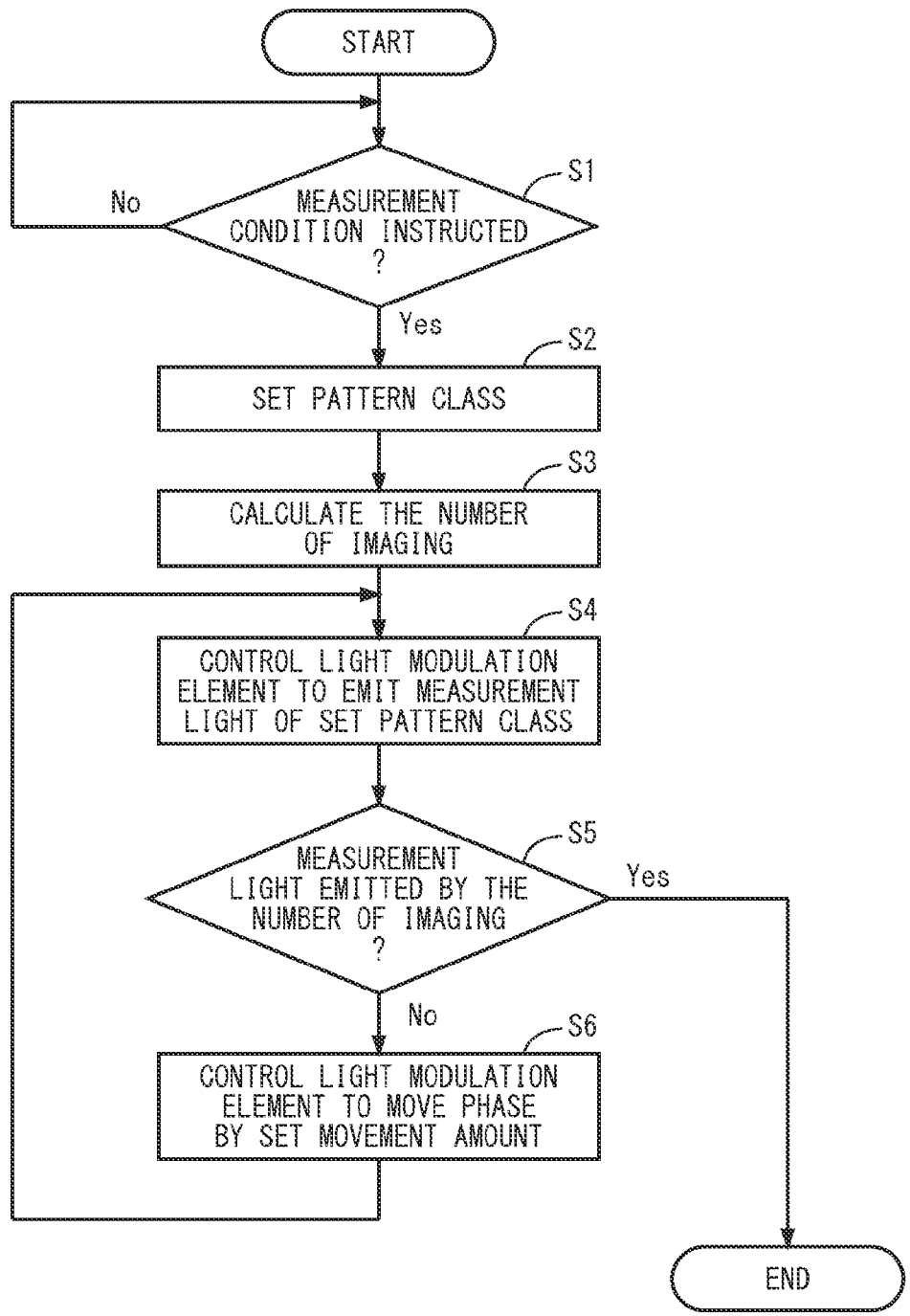
FIG. 15 is a flowchart showing the control process of the light modulation element by the CPU.

FIG. 15 is a flowchart showing the control process of the light modulation element 112 by the CPU 210. The CPU 210 waits until the measurement condition is instructed by the user (step S1). When the measurement condition is instructed by the user in step S1, the CPU 210 sets the pattern class based on the pattern class of the instructed measurement condition (step S2).

The CPU 210 calculates the number of imaging based on the space period Ts of the measurement parameter and the movement amount of the phase of the pattern of the instructed measurement condition (step S3). Either process of steps S2, S3 may be executed first. The CPU 210 then controls the light modulation element 112 to emit the measurement light of the set pattern class (step S4). Thereafter, the CPU 210 determines whether or not the light modulation element 112 has emitted the measurement light by the calculated number of imaging (step S5).

If the light modulation element 112 has not emit the measurement light by the calculated number of imaging in step S5, the CPU 210 controls the light modulation element 112 to move the phase of the pattern by the set movement amount (step S6). Thereafter, the CPU 210 returns to the process of step S4. The processes of steps S4 to S6 are repeated until the light modulation element 112 emits the measurement light by the calculated number of imaging. If the light modulation element 112 has emitted the measurement light by the calculated number of imaging in step S5, the CPU 210 terminates the control process of the light modulation element 112.

(4) Light Receiving Amount Level Adjustment

The fluorescence is emitted from the measuring object S when the measuring object S is irradiated with the measurement light. The intensity of the fluorescence emitted from the measuring object S is proportional to the intensity of the measurement light applied on the measuring object S. Therefore, when the measuring object S is irradiated with the pattern measurement light, the measuring object S emits the fluorescence having substantially the same pattern as the pattern of the pattern measurement light. The intensity of the fluorescence is about $10^{-6}$ times the intensity of the measurement light.

The fluorescence emitted from the measuring object S is received by the light receiving section 120. The light receiving signal indicating the light receiving amount is output from the light receiving section 120. The pattern image data of the measuring object S is generated based on the light receiving signal output from the light receiving section 120. The level of the light receiving signal is proportional to the intensity of the fluorescence emitted from the measuring object S, the exposure time of the light receiving section 120, and the gain of the light receiving section 120. The intensity of the fluorescence emitted from the measuring object S is proportional to the intensity of the measurement light.

Therefore, the level of the light receiving signal can be adjusted by adjusting at least one of the intensity of the measurement light, the exposure time of the light receiving section 120, and the gain of the light receiving section 120. The adjustment of the level of the light receiving signal by the adjustment of at least one of the intensity of the measurement light, the exposure time of the light receiving section 120, and the gain of the light receiving section 120 is hereinafter referred to as a light receiving level adjustment. The light receiving signal output from the light receiving section 120 saturates if the intensity of the measurement light, the exposure time of the light receiving section 120, or the gain of the light receiving section 120 is set too high.

In the sectioning observation, the measuring object S is irradiated with the pattern measurement light a plurality of number of times while moving the phase of the pattern, as described above. The fluorescence emitted from the measuring object S is thus received by the light receiving section 120 a plurality of number of times.

Each of the plurality of pieces of pattern image data is generated based on the level of the light receiving signal for each pixel during the plurality of times of irradiation. In the present embodiment, the difference between the maximum value of the pixel data corresponding to the maximum light receiving level and the minimum value of the pixel data corresponding to the minimum light receiving level is calculated for each pixel based on the generated plurality of pieces of pattern image data. The calculated differences are connected for all the pixels to generate the sectioning image. The influence of stray light is thus removed from the generated sectioning image data.

Thus, the difference between the maximum value of the pixel data and the minimum value of the pixel data is calculated for each pixel to remove the influence of the stray light from the sectioning image data. Thus, the sectioning image in which the influence of the stray light is removed becomes darker than the sectioning image in which the influence of the stray light is not removed.

In the present embodiment, a constant contrast correction amount greater than one is multiplied to the value of each pixel data of the sectioning image data to correct the contrast of the sectioning image data. The contrast correction amount is, for example, a ratio of the upper limit value of an output range of the light receiving section 120 with respect to the maximum value of a plurality of values of the sectioning image data.

The contrast correction amount may not be the ratio of the upper limit value of the output range of the light receiving section 120 with respect to the maximum value of the sectioning image data, and, for example, may be the ratio of the upper limit value of the output range of the light receiving section 120 with respect to an average value of a plurality of values of the sectioning image data including the maximum value and values of the top few %.

According to the correction of the contrast described above, the sectioning image can be brightened. If the contrast is corrected, the brightness of a plurality of sectioning images cannot be quantitatively compared. Thus, in the present embodiment, the sectioning image data before the contrast is corrected and the metadata indicating the contrast correction amount are independently saved when saving the generated sectioning image data in the storage device 240 of FIG. 1.

In this case, the brightness of the plurality of sectioning images can be quantitatively compared based on the sectioning image data before the contrast is corrected. The sectioning image after the contrast is corrected can be displayed based on the sectioning image data before the contrast is corrected and the metadata. The saving format of the sectioning image data may be a general saving format or maybe other unique saving formats.

The general saving format includes TIFF (Tagged Image File) format, JPEG (Joint Photographic Experts Group) format, BMP (Windows (registered trademark) bitmap) format or PNG (Portable Network Graphics) format. When saving the sectioning image data in the general saving format, the sectioning image after the contrast is corrected can be displayed if the software for displaying the image is compliant with the reading of the metadata.

If the software for displaying the image is not compliant with the reading of the metadata, the sectioning image after the contrast is corrected cannot be displayed. In this case, the sectioning image data after the contrast is corrected may be separately saved as thumbnail data in addition to the sectioning image data before the contrast is corrected and the metadata.

The visibility of the sectioning image on the browser can be enhanced by displaying the thumbnail of the sectioning image on the browser based on the thumbnail data. As a result, the searching property of the sectioning image data can be enhanced.

Figure 16A:
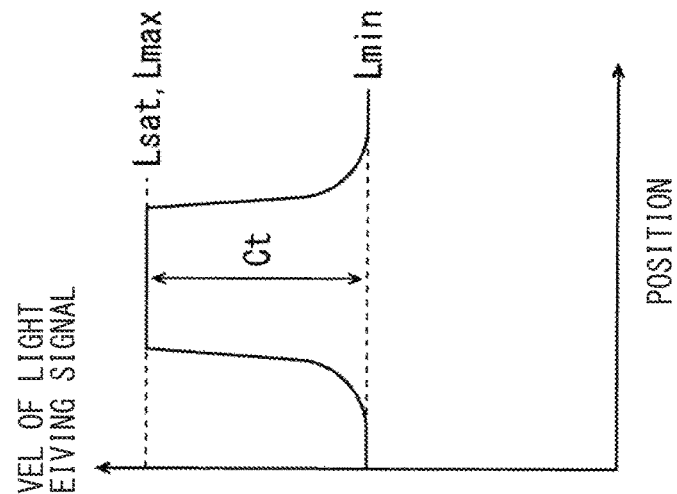
FIGS. 16A to 16C are views showing the light receiving signal output from a light receiving section.
Figure 16B:
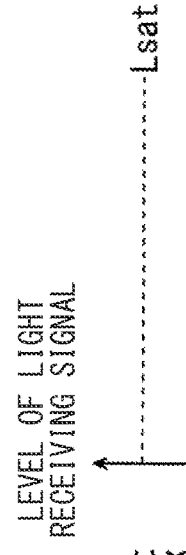
Figure 16C:
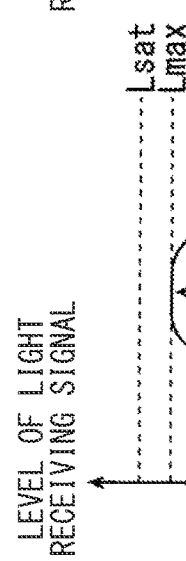

The image quality of the sectioning image can be enhanced as the contrast of the sectioning image data before the correction increases. Thus, the level of the light receiving signal output from the light receiving section 120 is preferably appropriately set. FIGS. 16A to 16C are views showing the light receiving signal output from the light receiving section 120. The horizontal axis of FIGS. 16A to 16C indicates the position in the horizontal direction (e.g., position in the Y direction) of the measuring object S, and the vertical axis indicates the level of the light receiving signal. The maximum light receiving level is Lmax, the minimum light receiving level is Lmin, and the upper limit value of the output range of the light receiving section 120 is Lsat.

FIG. 16A shows an example of when the level of the light receiving signal is appropriate. In the example of FIG. 16A, the maximum light receiving level Lmax is slightly lower than the upper limit value Lsat of the output range, and the minimum light receiving level Lmin is slightly higher than the lower limit value of the output range. The contrast Ct thus becomes greater.

FIG. 16B shows an example of when the level of the light receiving signal is too low. When the level of the light receiving signal is lowered from the state of FIG. 16A, the minimum light receiving level Lmin becomes constant after lowering to the lower limit value of the output range of the light receiving section 120. When the level of the light receiving signal is lowered from the state of FIG. 16A, the maximum light receiving level Lmax may lower even after the minimum light receiving level Lmin becomes constant at the lower limit value of the output range of the light receiving section 120. Thus, as shown in FIG. 16B the contrast Ct lowers when the level of the light receiving signal is too low. In this case, the sectioning image becomes dark.

Since the portion of the measuring object S corresponding to the bright portion of the measurement light and the portion of the measuring object S corresponding to the dark portion of the measurement light cannot be distinguished, the sectioning image cannot be accurately generated. Furthermore, the contrast correction amount becomes large when the contrast is corrected since the sectioning image is dark. The noise component of the sectioning image thus also becomes large.

FIG. 16C shows an example of when the level of the light receiving signal is too high. When the level of the light receiving signal is raised from the state of FIG. 16A, the maximum light receiving level Lmax becomes constant after rising to the upper limit value Lsat of the output range of the light receiving section 120. When the level of the light receiving signal is raised from the state of FIG. 16A, the minimum light receiving level Lmin may rise even after the maximum light receiving level Lmax becomes constant at the upper limit value Lsat of the output range of the light receiving section 120. Thus, as shown in FIG. 16C, the contrast Ct lowers when the level of the light receiving signal is too high. In this case, the sectioning image becomes dark although the level of the light receiving signal is raised.

When the minimum light receiving level Lmin is also raised to the upper limit value Lsat of the output range of the light receiving section 120 by further raising the level of the light receiving signal from the state of FIG. 16C, the contrast Ct becomes 0. Further, the pattern of the fluorescence at the vicinity of the maximum light receiving level Lmax deforms, and hence the sectioning image cannot be accurately generated.

(5) Display Unit (a) Image Display Region

Figure 17:
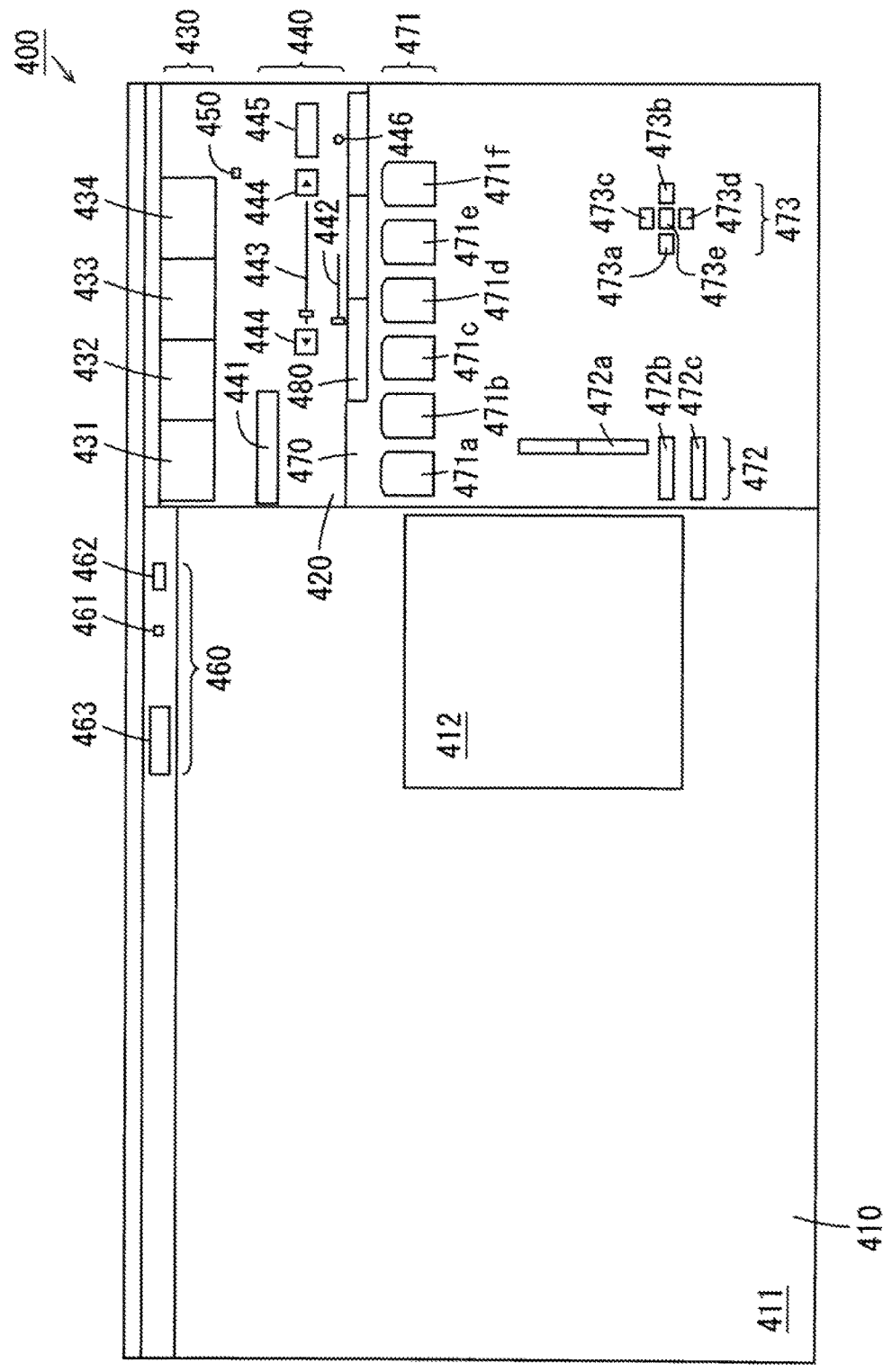
FIG. 17 is a view showing a display example of a display unit.
Figure 18:
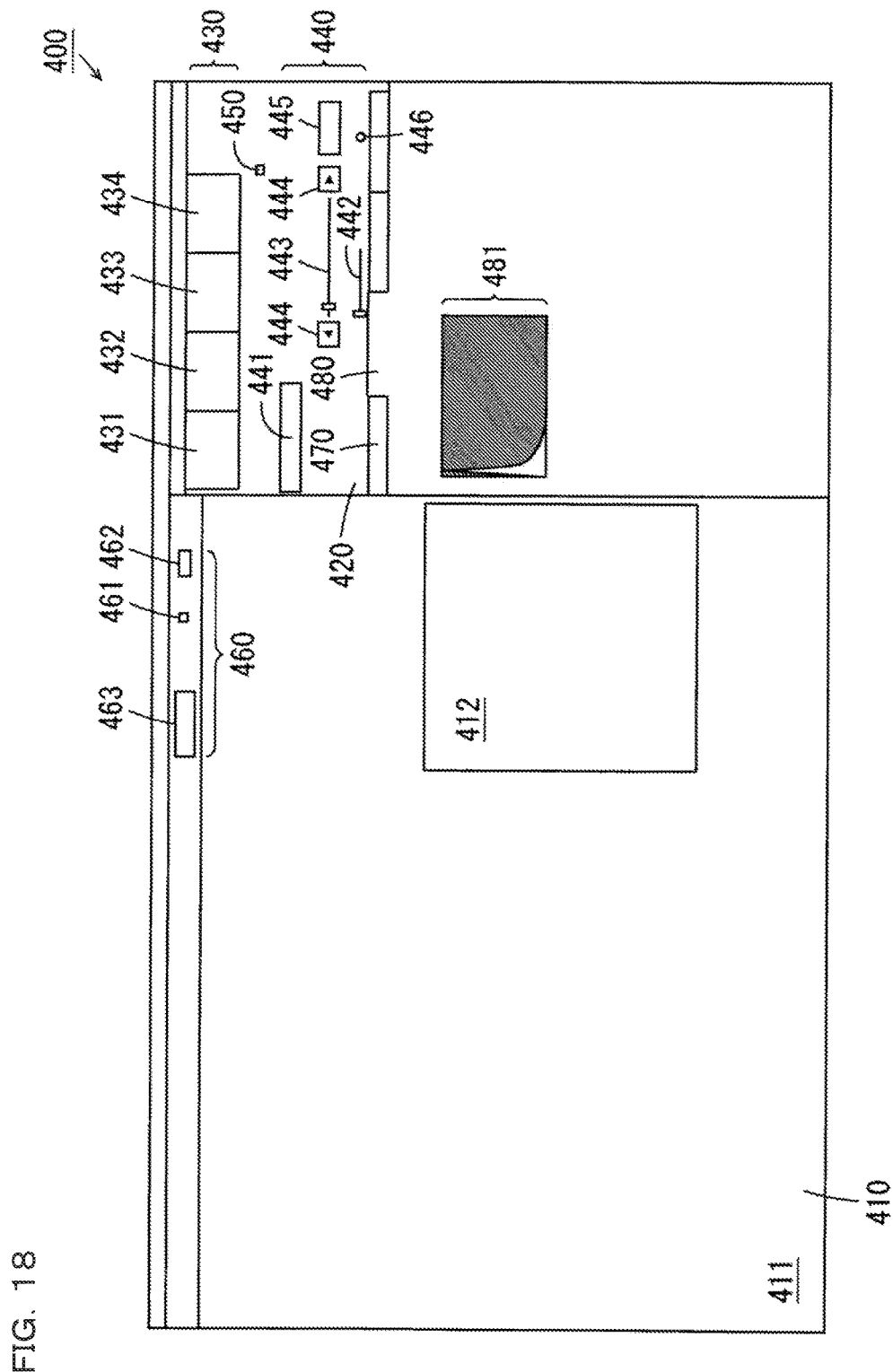
FIG. 18 is a view showing a display example of the display unit.

FIG. 17 and FIG. 18 are views showing a display example of the display unit 400. As shown in FIG. 17 and FIG. 18, the display unit 400 includes an image display region 410 and a setting display region 420 so as to be next to each other. The setting display region 420 will be described later. A main window 411 and a sub-window 412 are displayed in the image display region 410. The display and non-display of the sub-window 412 can be switched.

When the transmitted light emitted from the transmitted light supplying section 130 of FIG. 2 is transmitted through the measuring object S and received by the light receiving section 120, the image data of the measuring object S is generated. Hereinafter, the image data of the measuring object S generated using the transmitted light is referred to as transmission normal image data, and an image based on the transmission normal image data is referred to as a transmission normal image. The transmission normal image data and the epi-normal image data are collectively referred to as normal image data, and the transmission normal image and the epi-normal image are collectively referred to as a normal image. In the main window 411, various images such as the pattern image, the sectioning image, the normal image, or the omnifocus image are displayed.

Specifically, the main window 411 is configured so that the normal display and the preview display are selectively or simultaneously executable. The normal display is a method of displaying the pattern image, the sectioning image, the normal image, the omnifocus image, or the like based on the already generated image data. The preview display is a method of displaying the pattern image or the sectioning image based on the image data generated when the measurement condition is changed. In the normal display, a plurality of images can be displayed in a superimposed manner in the main window 411 based on the already generated image data.

In the preview display, the measuring object S is again irradiated with the measurement light only when the measurement condition, the brightness parameter, or the visual field is changed. For example, when the pattern class, the movement amount of the phase of the pattern measurement light, the width W1 of the bright portion or the space period Ts of the phase, the exposure time of the light receiving section 120, the number of binning, or the like is changed, the measuring object S is again irradiated with the measurement light. Alternatively, when the stage 140 is moved in the X direction or the Y direction, or when the focus position adjustment mechanism 163 is controlled, the measuring object S is again irradiated with the measurement light.

The pattern image or the sectioning image data is thereby generated based on the received fluorescence, and the brightness image data is generated. As a result, the pattern image or the sectioning image displayed in the main window 411 is updated.

If the measurement condition is not changed, the measuring object S does not need to be irradiated with the measurement light again, and hence the CPU 210 controls the light modulation element 112 to shield the irradiation with the measurement light on the measuring object S. Thus, the unnecessary loss of color of the fluorescence reagent that occurs when the measuring object S is continuously irradiated with the measurement light can be reduced.

In the present embodiment, the irradiation and the shielding of the irradiation with the measurement light on the measuring object S can be switched at high speed by the light modulation element 112. Therefore, a plurality of pieces of pattern image data can be generated at high speed. The sectioning image data generated by the plurality of pieces of pattern image data thus can be generated at high speed. As a result, the sectioning image of when the measurement condition is changed can be preview displayed with high responsiveness.

In the preview display, the setting may be made to generate the pattern image data with a large number of binning, for example. In this case, the pattern image data and the sectioning image data can be generated at higher speed. Thus, in the preview display, the pattern image or the sectioning image can be displayed at higher speed. The user can select the appropriate measurement condition easily and in a short period of time while looking at the preview displayed pattern image or sectioning image.

Figure 19A:
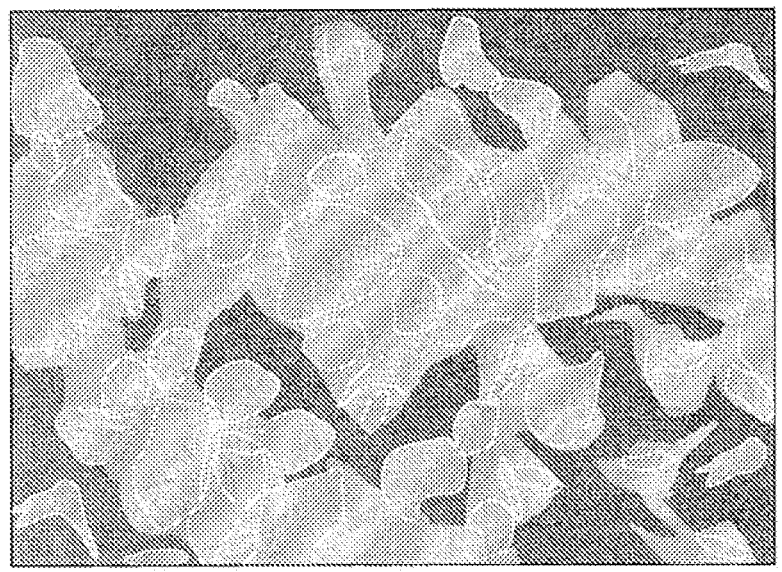
FIGS. 19A and 19B are views showing one example of an image displayed in a main window in a normal display.
Figure 19B:
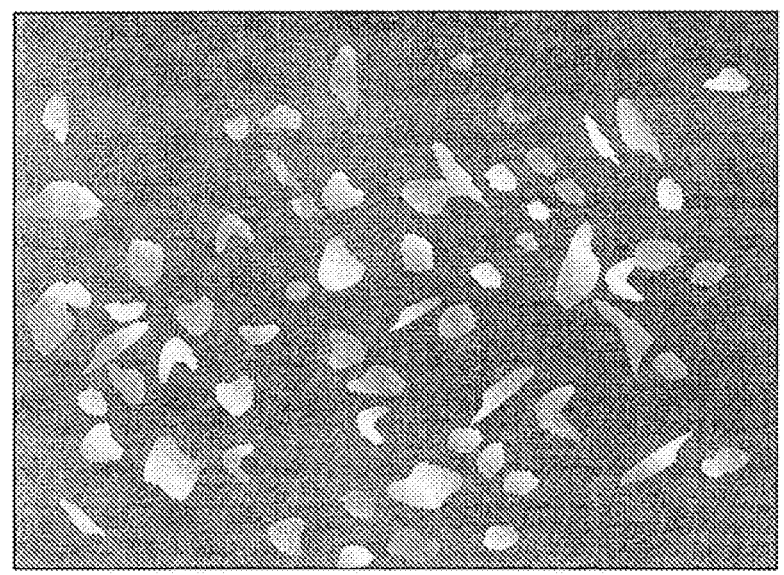

FIGS. 19A and 19B are views showing one example of an image displayed in the main window 411 in the normal display. FIG. 19A shows the sectioning image of when the measuring object S is irradiated with the measurement light having an absorption wavelength of GFP. FIG. 19B shows the sectioning image of when the measuring object S is irradiated with the measurement light having an absorption wavelength of Texas Red.

Figure 20A:
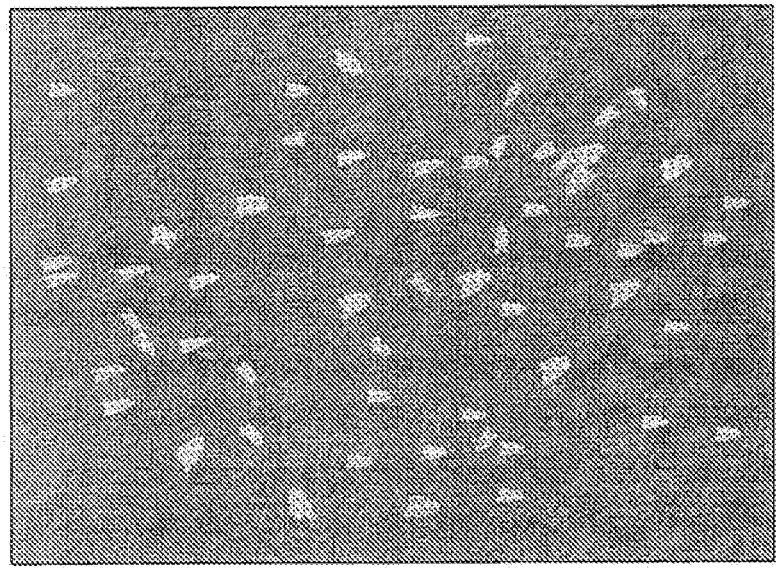
FIGS. 20A and 20B are views showing another example of the image displayed in the main window in the normal display.
Figure 20B:
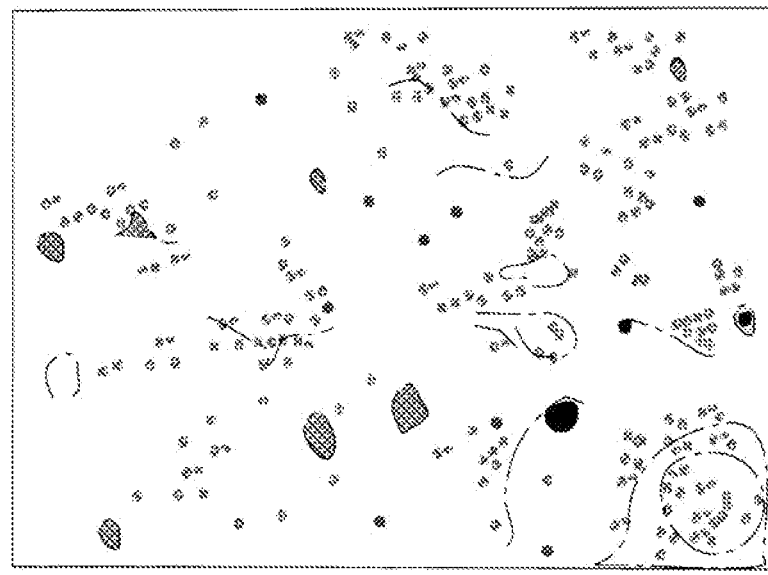

FIGS. 20A and 20B are views showing another example of the image displayed in the main window 411 in the normal display. FIG. 20A shows the sectioning image of when the measuring object S is irradiated with the measurement light having the absorption wavelength of DAPI. FIG. 20B shows the transmission normal image of when the measuring object S is irradiated with the transmitted light for phase difference observation.

Figure 21A:
FIGS. 21A and 21B are views showing one example of an image displayed in a superimposed manner in the main window in the normal display.
Figure 21B:
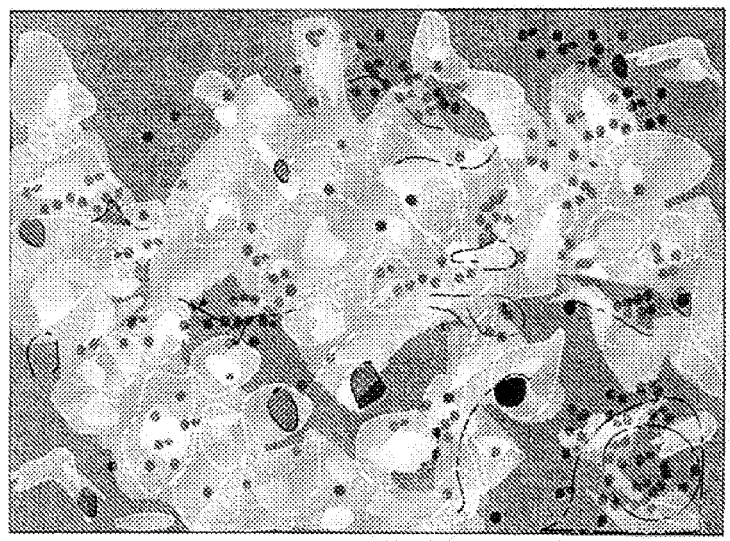

FIGS. 21A and 21B are views showing one example of an image displayed in a superimposed manner in the main window 411 in the normal display. FIG. 21A shows an image in which 2 images are displayed in a superimposed manner. The image of FIG. 21A includes the sectioning image of FIG. 19A and the sectioning image of FIG. 19B. FIG. 21B shows an image in which 3 images are displayed in a superimposed manner. The image of FIG. 21B includes the sectioning image of FIG. 19A, the sectioning image of FIG. 19B, and the transmission normal image of FIG. 20B.

Figure 22:
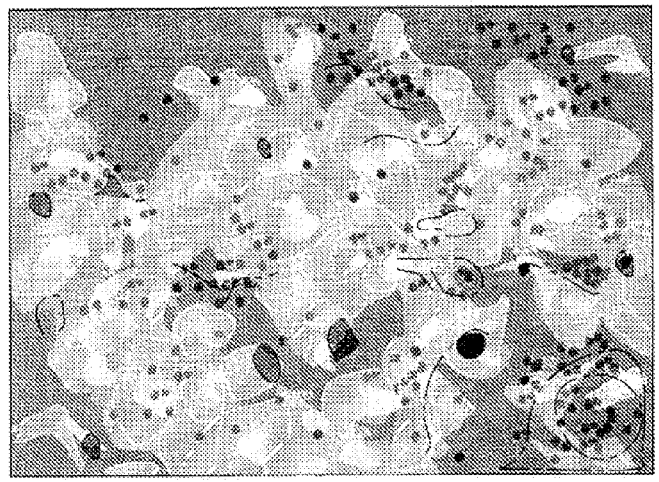
FIG. 22 is a view showing another example of the image displayed in a superimposed manner in the main window in the normal display.

FIG. 22 is a view showing another example of an image displayed in a superimposed manner in the main window 411 in the normal display. FIG. 22 shows an image in which 4 images are displayed in a superimposed manner. The image of FIG. 22 includes the sectioning image of FIG. 19A, the sectioning image of FIG. 19B, the sectioning image of FIG. 20A, and the transmission normal image of FIG. 20B.

In particular, if the measuring object S is a biological specimen, it is effective to display the sectioning image and the transmission normal image (e.g., phase difference-observed image) in a superimposed manner when observing the shape of the cells of the measuring object S. The user is thus able to easily recognize the portion of the measuring object S where the fluorescence is generated only when irradiated with light having a specific wavelength due to the composition of protein. As a result, the nucleus in the cell, the cell membrane, the DNA (Deoxyribo Nucleic Acid), or the like can be easily identified.

If the binning process is carried out when generating the sectioning image data or the normal image data, the size of the sectioning image based on the sectioning image data or the normal image based on the normal image data is changed. Therefore, the size of such a sectioning image or normal image differs from the size of the sectioning image or the normal image based on other piece of image data in which the binning process is not carried out.

Thus, if the images are displayed in a superimposed manner, the images are enlarged or reduced so that all the images to be displayed have the same size. Alternatively, the brightness parameter associated with the size of the image such as the binning process may be commonly set when generating all the image data. In this case, the size of the image based on the generated image data is unified, so that the images can be easily displayed in a superimposed manner.

The user specifies a sub-window display checkbox 450 of the setting display region 420 of FIG. 18 using the operation section 250 of the PC 200 of FIG. 1 to display the sub-window 412 in the image display region 410. An image before the contrast is corrected is displayed in the sub-window 412. Hereinafter, the image before the contrast is corrected is referred to as a brightness image, and the image data for displaying the brightness image is referred to as brightness image data.

Figure 23:
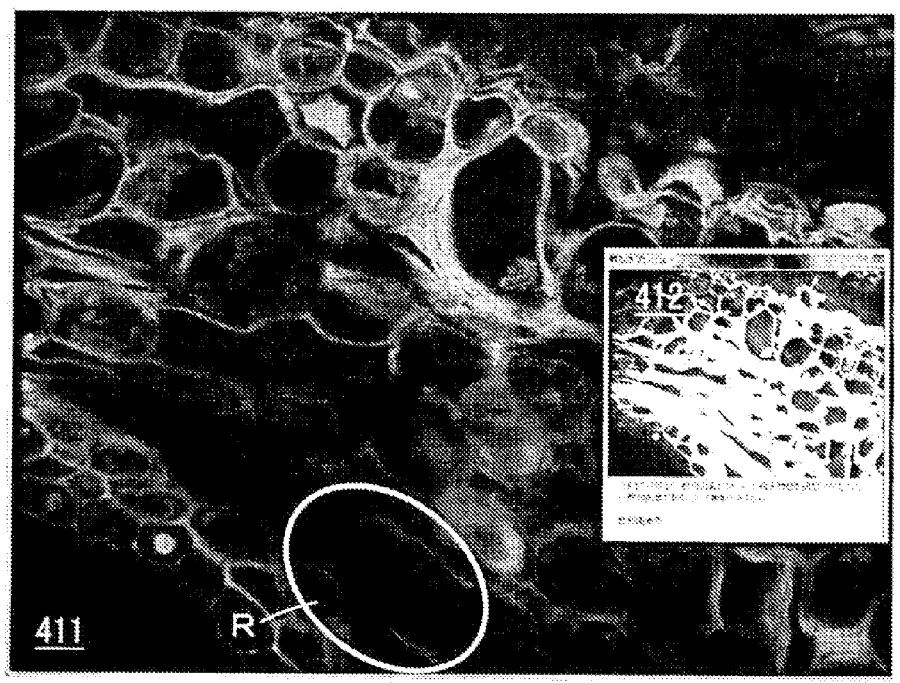
FIG. 23 is a view showing a sectioning image of the measuring object displayed in the main window in a preview display.
Figure 24:
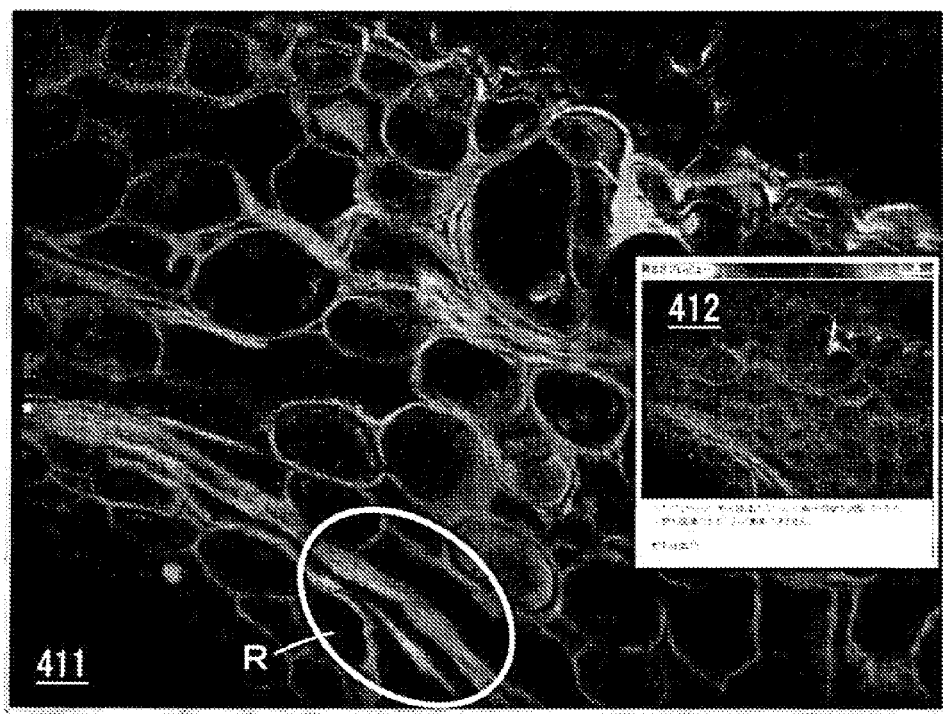
FIG. 24 is a view showing a sectioning image of the measuring object displayed in the main window in the preview display.

FIG. 23 and FIG. 24 are views showing the sectioning image of the measuring object S displayed in the main window 411 in the preview display. The pattern image of the measuring object S may be displayed in the main window 411.

The exposure time of the light receiving section 120 at the time of acquisition of the sectioning image of FIG. 23 is longer than the exposure time of the light receiving section 120 at the time of acquisition of the sectioning image of FIG. 24. In other words, the level of the light receiving signal of the light receiving section 120 in the example of FIG. 23 is higher than the level of the light receiving signal of the light receiving section 120 in the example of FIG. 24. Therefore, the light receiving signal of the light receiving section 120 in the example of FIG. 23 tends to easily saturate than the light receiving signal of the light receiving section 120 in the example of FIG. 24.

In the example of FIG. 23, the light receiving signal corresponding to the pixel in the region R circled a white circle, for example, in the sectioning image is saturated. In the example of FIG. 24, on the other hand, the light receiving signal corresponding to the pixel in the relevant region R in the sectioning image is not saturated. However, since the correction of the contrast is performed, the pixel in the region R in the example of FIG. 23 is displayed darker than the pixel in the region R in the example of FIG. 24.

According to the intuition of the user, the sectioning image becomes brighter as the level of the light receiving signal becomes higher. When raising the level of the light receiving signal from the low state, the sectioning image becomes bright until the level of the light receiving signal reaches a predetermined value. However, when the level of the light receiving signal exceeds the predetermined value, the light receiving signal in the pixel corresponding to the portion of the measuring object S irradiated with the bright portion of the pattern saturates. On the other hand, the level of the light receiving signal in the pixel corresponding to the portion of the measuring object S irradiated with the dark portion of the pattern rises. Thus, the sectioning image based on the sectioning image data generated by the difference in the values of the pixel data gradually becomes darker.

Thus, the user cannot recognize that the level of the light receiving signal of the light receiving section 120 of when obtaining the sectioning image of FIG. 23 is higher than the level of the light receiving signal of the light receiving section 120 of when obtaining the sectioning image of FIG. 24. Furthermore, the user cannot recognize that the light receiving signal is saturated even by looking at the sectioning image of the main window 411 of FIG. 23.

Thus, in the examples of FIG. 23 and FIG. 24, the maximum light receiving level at each pixel is extracted based on a plurality of pieces of pattern image data configuring the sectioning image displayed in the main window 411. The brightness image data is generated based on the extracted maximum light receiving level for each pixel. The brightness image is displayed in the sub-window 412 based on the generated brightness image data. Whether or not the light receiving signal, output by the light receiving section 120, is saturated is determined based on the brightness image data.

The brightness image indicates a distribution state of the brightness of a plurality of pattern images configuring the sectioning image displayed in the main window 411. Thus, the brightness image of the sub-window 412 of FIG. 23 is displayed brighter than the brightness image of the sub-window 412 of FIG. 24. If a pixel in which the light receiving signal is saturated exists, the relevant pixel in the brightness image is displayed in the sub-window 412 in an identifiable manner (with a different color in the present example), so that the user is notified of the pixel in which the light receiving signal is saturated.

The user can recognize that the level of the light receiving signal of the light receiving section 120 of when obtaining the sectioning image of FIG. 23 is greater than the level of the light receiving signal of the light receiving section 120 of when obtaining the sectioning image of FIG. 24 by looking at the brightness image. The user can also recognize that the light receiving signal is saturated by looking at the brightness image.

The user can change the brightness parameter such as the intensity, and the like of the measurement light by recognizing that the light receiving signal is saturated. In the preview display, the measuring object S is again irradiated with the measurement light only when the measurement condition is changed. Thus, the pattern image or the sectioning image data is generated based on the received fluorescence, and the brightness image data is generated. As a result, the pattern image or the sectioning image displayed in the main window 411 is updated, and the brightness image displayed in the sub-window 412 is updated.

The measurement light on the measuring object S is shielded at high speed by controlling the light modulation element 112, but this is not the sole case. The measurement light on the measuring object S may be shielded by controlling the light shielding mechanism 323 of the light projecting section 320 of FIG. 2.

When displaying the pattern image in the main window 411, the CPU 210 controls the light modulation element 112 so that the measuring object S is irradiated with the measurement light in which the phase of the pattern is moved by a constant amount each time the measurement condition is changed. In this case, the measurement light is prevented from being applied on only the specific portion of the measuring object S. Thus, a case in which only the fluorescence reagent at the specific portion of the measuring object S loses color is prevented.

In the present embodiment, the brightness image data is generated based on the maximum light receiving level at each pixel of the plurality of pieces of pattern image data, but is not limited thereto. The brightness image data may be generated based on an average value of the light receiving signal at each pixel of the plurality of pieces of pattern image data.

Alternatively, the brightness image data may be any one or more pieces of image data of the plurality of pieces of pattern image data. If the brightness image data is any 2 or more of the plurality of pieces of pattern image data, the 2 or more pattern images may be alternately displayed in the sub-window 412 as the brightness image.

In the present embodiment, the contrast correction amount is determined uniformly for all the pixels of the sectioning image, but this is not the sole case. The contrast correction amount may be determined so that when the pixel in which the light receiving signal is saturated exists, the relevant pixel in the sectioning image is brightly displayed.

In this case, in the sectioning image, the pixel corresponding to the portion in which the light receiving signal is saturated is displayed brighter than the pixel corresponding to the portion in which the light receiving signal is not saturated. The user thus can easily recognize that the light receiving signal is saturated by looking at the sectioning image.

In the present embodiment, if the pixel in which the light receiving signal is saturated exists, the relevant pixel in the brightness image is identifiably displayed to notify the user of the pixel in which the light receiving signal is saturated, but this is not the sole case. The pixel not in the brightness image but in the sectioning image or the pattern image may be identifiably displayed to notify the user of the pixel in which the light receiving signal is saturated.

For example, a filling process of identifiably filling the saturated pixel of the sectioning image may be carried out. The filling process can be applied to either the normal-displayed sectioning image and the preview-displayed sectioning image. The value of the pixel data to be filled is the maximum value of the pixel data, for example. In the present example, the pixel data has 8 bits, and hence the maximum value of the pixel data is 255.

The value of the pixel data to be filled may be any of the maximum value, the average value, the minimum value, the median value, and the mode value of the pixel data of a pixel group at the periphery of the saturated pixel. In this case, the brightness of the filled pixel (saturated pixel) and the brightness of the pixel group at the periphery of the relevant pixel do not greatly differ. Thus, the filling process not giving the user a sense of strangeness can be carried out on the saturated pixel.

Alternatively, if the pixel in which the light receiving signal is saturated exists, a notification screen indicating that the light receiving signal is saturated may be displayed on the display unit 400. Furthermore, if the pixel in which the light receiving signal is saturated exists, a notification sound indicating that the light receiving signal is saturated may be output from a speaker (not shown).

Moreover, if the pixel in which the light receiving signal is saturated exists, the following HDR (High Dynamic Range) process may be automatically carried out by the CPU 210. If the pixel in which the light receiving signal is saturated exists, a screen recommending the HDR process be carried out may be displayed on the display unit 400. Furthermore, if the pixel in which the light receiving signal is saturated exists, a sound recommending the HDR process be carried out may be output from the speaker (not shown).

In the HDR process, a plurality of pieces of 1st pattern image data is generated with the light receiving level adjustment carried out so that the plurality of pattern images of the measuring object S do not include the halation portion. A plurality of pieces of 2nd pattern image data is generated with the light receiving level adjustment carried out so that the plurality of pattern images of the measuring object S do not include the black defect portion.

The generated plurality of pieces of 1st pattern image data and the plurality of pieces of 2nd pattern image data are then synthesized. A plurality of pieces of 3rd pattern image data in which the dynamic range is enlarged is thereby generated.

The plurality of pieces of 3rd pattern image data is synthesized to generate the sectioning image data in which the dynamic range is enlarged.

In the HDR process according to the present embodiment, the measuring object S is sequentially irradiated with the measurement light with the first light receiving level adjustment carried out, and thereafter, the measuring object S is sequentially irradiated with the measurement light with the second light receiving level adjustment carried out. According to such a procedure, the measurement light is not continuously applied on the specific portion of the measuring object S, as opposed to the procedure of alternately carrying out the light receiving level adjustment and the irradiation with the measurement light on the measuring object S. Thus, a case in which only the fluorescence reagent at the specific portion of the measuring object S loses color is prevented.

(b) Setting Display Region

As shown in FIG. 17 and FIG. 18, in the setting display region 420, a filter selecting field 430, a measurement condition setting field 440, a sub-window display checkbox 450, and an associated function setting field 460 are displayed. A plurality of tabs is displayed in the setting display region 420. The plurality of tabs includes a focus position adjustment tab 470 and a contrast correction setting tab 480. The user uses the operation section 250 of the PC 200 of FIG. 1 and operates the GUI (Graphical User Interface) displayed on the display unit 400 to give various instructions to the CPU 210.

In the filter selecting field 430, a plurality of (4 in the present example) filter selecting buttons 431, 432, 433, 434 are displayed. The 3 filter selecting buttons 431 to 433 correspond to the 3 filter cubes 151, and the filter selecting button 434 corresponds to the opening of the filter turret 152.

Any one of the filter selecting buttons 431 to 434 is selected by the user. The CPU 210 drives the filter turret drive unit so that the filter cube 151 or the opening corresponding to the selected filter selecting button is positioned on the optical axis of the light receiving section 120.

In the measurement condition setting field 440, a pattern selecting field 441, a pattern setting bar 442, an exposure time setting bar 443, an exposure time setting button 444, an auto button 445, and a detail setting button 446 are displayed. The user selects any of the rectangular wave measurement light, the one-dimensional sine wave measurement light, the dot measurement light, the two-dimensional sine wave measurement light, and the uniform measurement light from the pattern selecting field 441. The CPU 210 controls the light modulation element 112 so that the selected measurement light is emitted from the pattern applying section 110.

The pattern setting bar 442 includes a slider that is movable in the horizontal direction. When the rectangular wave measurement light or the dot measurement light is selected, the space period Ts of the pattern, the width W1 of the bright portion, and the movement amount of the phase of the pattern are set by moving the slider of the pattern setting bar 442.

When the one-dimensional sine wave measurement light or the two-dimensional sine wave measurement light is selected, the space period Ts of the pattern and the movement amount of the phase are set by moving the slider of the pattern setting bar 442. The CPU 210 controls the light modulation element 112 so that the measurement light has the set space period Ts of the pattern and the width W1 of the bright portion. The CPU 210 controls the light modulation element 112 so that the phase of the pattern is moved at the set movement amount.

The exposure time setting bar 443 includes a slider that is movable in the horizontal direction. The exposure time of the light receiving section 120 is set by moving the slider of the exposure time setting bar 443 or operating the exposure time setting button 444. The exposure time of the light receiving section 120 is appropriately set automatically by operating the auto button 445. The CPU 210 controls the light receiving section 120 so that the exposure time of the light receiving section 120 becomes the set exposure time.

The user can set the measurement condition in more detail by operating the detail setting button 446. The details will be described later.

In the associated function setting field 460, an automatic contrast correction checkbox 461, a contrast correction amount display field 462, and an omnifocus button 463 are displayed. If the automatic contrast correction checkbox 461 is specified, the CPU 210 multiplies a predetermined contrast correction amount to the value of each pixel data of all the sectioning image data or the epi-normal image data. The contrast of the sectioning image or the epi-normal image is thereby corrected.

The CPU 210 displays the contrast correction amount in the contrast correction amount display field 462. The user can recognize the brightness of the sectioning image before the contrast is corrected by looking at the contrast correction amount displayed in the contrast correction amount display field 462. The saturation of the light receiving signal and the extent of the saturation thus can be recognized. The omnifocus button 463 is operated when generating the omnifocus image data, and the like. The details will be hereinafter described.

Any of the plurality of tabs is selected. As shown in FIG. 17, if the focus position adjustment tab 470 is selected, an objective lens selecting field 471, a focus position adjustment field 472, and a stage position adjustment field 473 are displayed in the setting display region 420.

In the objective lens selecting field 471, a plurality of (6 in the present example) objective lens selecting buttons 471a, 471b, 471c, 471d, 471e, and 471f are displayed. The 6 objective lens selecting buttons 471a to 471f correspond to the 6 objective lenses 161.

One of the objective lens selecting buttons 471a to 471f is selected. The CPU 210 drives the lens turret drive unit so that the objective lens 161 corresponding to the selected objective lens selecting button 471a to 471f is positioned on the optical axis of the light receiving section 120.

A focus position adjustment bar 472a, an initial distance button 472b, and an auto focus button 472c are displayed in the focus position adjustment field 472. The focus position adjustment bar 472a includes a slider that is movable in a vertical direction. The position of the slider of the focus position adjustment bar 472a corresponds to the distance between the measuring object S and the objective lens 161.

The distance between the measuring object S and the objective lens 161 is adjusted by moving the slider of the focus position adjustment bar 472a. The CPU 210 controls the focus position adjustment mechanism 163 so that the distance between the measuring object S and the objective lens 161 becomes the distance adjusted by the slider.

When the initial distance button 472b is operated, the CPU 210 controls the focus position adjustment mechanism 163 so that the distance between the measuring object S and the objective lens 161 becomes the distance set in advance as an initial condition. When the auto focus button 472c is operated, the CPU 210 controls the focus position adjustment mechanism 163 so that the objective lens 161 is focused on the measuring object S.

In the stage position adjustment field 473, stage movement buttons 473a, 473b, 473c, 473d, and an initial position button 473e are displayed. When the stage movement button 473a, 473b is operated, the CPU 210 controls the stage drive unit so that the stage 140 is moved in one direction and the opposite direction in the X direction.

When the stage movement button 473c, 473d is operated, the CPU 210 controls the stage drive unit so that the stage 140 is moved in one direction and the opposite direction in the Y direction. When the initial position button 473e is operated, the CPU 210 controls the stage drive unit so that the position of the measuring object S is moved to the position set in advance as the initial condition.

As shown in FIG. 18, when the contrast correction setting tab 480 is selected, a histogram display field 481 is displayed in the setting display region 420. The CPU 210 displays, in the histogram display field 481, a histogram image, which indicates a relationship between the values of a plurality of pieces of pixel data of the sectioning image data before the correction of the contrast is carried out, and the number of pixels having each value. In other words, the histogram image displayed in the histogram display field 481 show the relationship between the value (luminance value) of the pixel data in the brightness image and the number of pixels.

The user can recognize the relationship between the values of a plurality of pieces of pixel data of the sectioning image data and the number of pixels having each value by looking at the histogram displayed in the histogram display field 481. The user is thus able to recognize the saturation of the light receiving signal and the extent of the saturation.

If the contrast correction setting tab 480 is selected, a plurality of contrast correction amount setting bars, a contrast correction amount input field, and a gamma correction value input field (not shown) are displayed in the setting display region 420. Each contrast correction amount setting bar includes a slider that is movable in the horizontal direction.

When the automatic contrast correction checkbox 461 is not specified, the contrast correction amount is arbitrarily set by moving the slider of each contrast correction amount setting bar or inputting a numerical value to the contrast correction amount input field. If a numerical value is input to the gamma correction value input field, the CPU 210 carries out the gamma correction on the contrast correction amount based on the input numerical value. The CPU 210 corrects the contrast of the sectioning image by multiplying the set or gamma corrected contrast correction amount to the contrasts of all the pixels.

Figure 25:
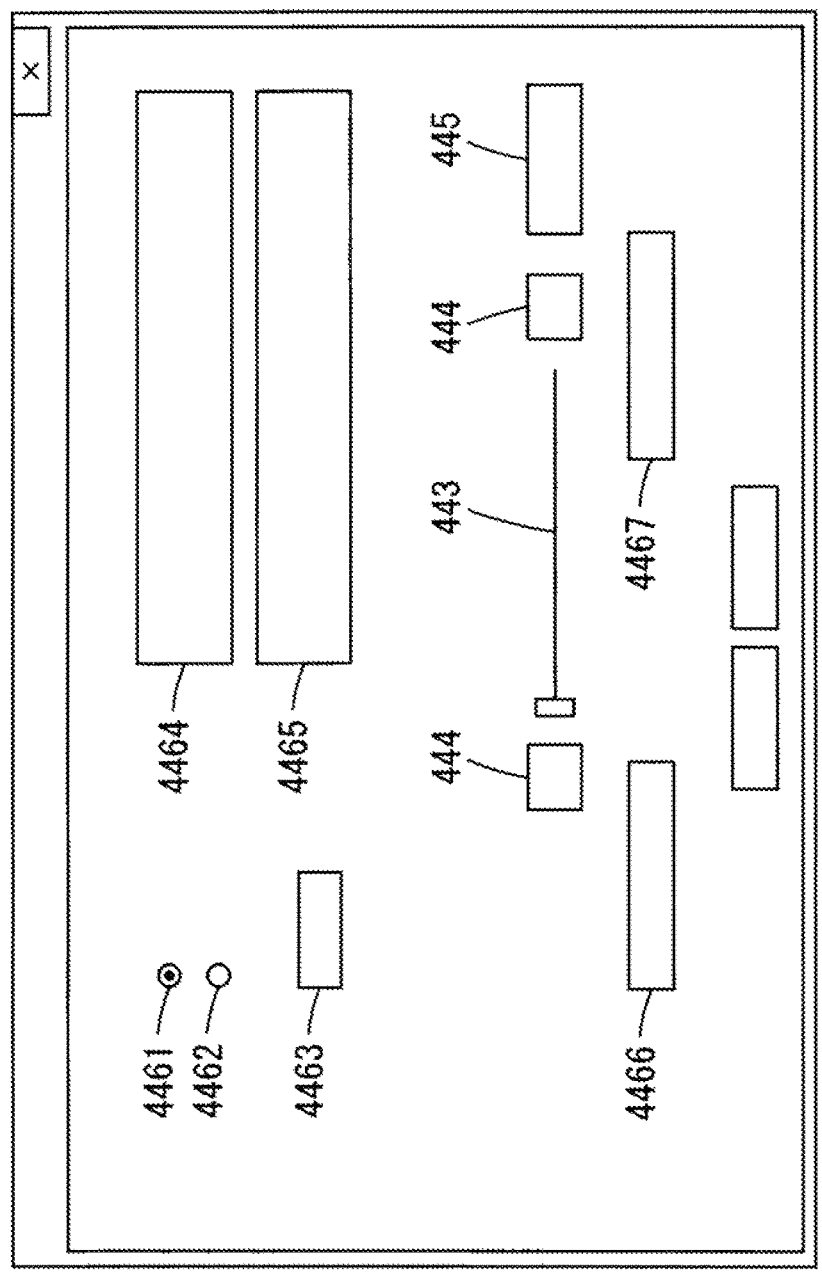
FIG. 25 is a view showing one example of a measurement condition detail setting window.

When the detail setting button 446 is operated, a measurement condition detail setting window is displayed in the setting display region 420. FIG. 25 is a view showing one example of the measurement condition detail setting window. As shown in FIG. 25, a rectangular wave measurement light checkbox 4461, a dot measurement light checkbox 4462, and a space period setting field 4463 are displayed in the measurement condition detail setting window 4460. A bright portion width setting field 4464, a phase movement amount setting field 4465, a number of binning selecting field 4466, and a gain selecting field 4467 are displayed in the measurement condition detail setting window 4460.

In the example of FIG. 25, the exposure time setting bar 443, the exposure time setting button 444, and the auto button 445 are also displayed, similar to those in the example of FIG. 17, in the measurement condition detail setting window 4460. The functions of the exposure time setting bar 443, the exposure time setting button 444, and the auto button 445 of FIG. 25 are similar to the functions of the exposure time setting bar 443, the exposure time setting button 444, and the auto button 445 of FIG. 17.

Either one of the rectangular wave measurement light checkbox 4461 or the dot measurement light checkbox 4462 is specified. If the rectangular wave measurement light checkbox 4461 is specified, the rectangular wave measurement light is emitted from the pattern applying section 110. If the dot measurement light checkbox 4462 is specified, the dot measurement light is emitted from the pattern applying section 110. The space period Ts is set by inputting a numerical value in the space period setting field 4463.

The width W1 of the bright portion of the pattern is set by operating the bright portion width setting field 4464. Either one of an auto mode in which the width W1 of the bright portion of the pattern is appropriately set automatically or a manual mode in which the width W1 of the bright portion of the pattern is arbitrarily set is selected by the user. If the manual mode is selected, the numerical value corresponding to the width W1 of the bright portion of the pattern is input to the bright portion width setting field 4464.

The movement amount of the phase of the pattern is set by operating the phase movement amount setting field 4465. Either one of an auto mode in which the movement amount of the phase of the pattern is appropriately set automatically or a manual mode in which the movement amount of the phase of the pattern is arbitrarily set is selected by the user. If the manual mode is selected, the numerical value corresponding to the movement amount of the phase of the pattern is input to the phase movement amount setting field 4465.

The number of binning in the pattern image data or the epi-normal image data is selected by the user from the number of binning selecting field 4466. The CPU 210 generates the pattern image data or the epi-normal image data with the selected number of binning. The value of the gain of the light receiving section 120 is selected by the user from the gain selecting field 4467. The CPU 210 controls the light receiving section 120 so that the gain of the light receiving section 120 becomes the selected value of the gain.

The measurement condition detail setting window 4460 may include an intensity setting field for setting the maximum intensity Imax and the minimum intensity Imin of the measurement light. In this case, the user can set the maximum intensity Imax and the minimum intensity Imin of the measurement light.

The measurement condition detail setting window 4460 may include an ROI setting field for setting the ROI. In this case, the user can set the ROI by operating the operation section 250 on the main window 411 and specifying the ROI with the ROI setting field operated, for example.

(6) Determination of Focused Point Pixel Data (a) Determination Method

A plurality of pieces of sectioning image data or normal image data at a plurality of focus positions is generated by irradiating the measuring object S with the measurement light while changing the relative distance between the measuring object S and the objective lens 161. The focused point pixel data of the pixel data of the generated plurality of pieces of sectioning image data or normal image data is determined for each pixel by the focusing detection portion 214 of the CPU 210.

The omnifocus image data or data (hereinafter referred to as three-dimensional shape data) indicating the three-dimensional shape of the measuring object S can be generated based on the determination result of the focused point pixel data. The auto focus can be executed based on the determination result of the focused point pixel data. In the present embodiment, different determination methods of the focused point pixel data are adopted for the sectioning observation and for the normal observation.

Figure 26:
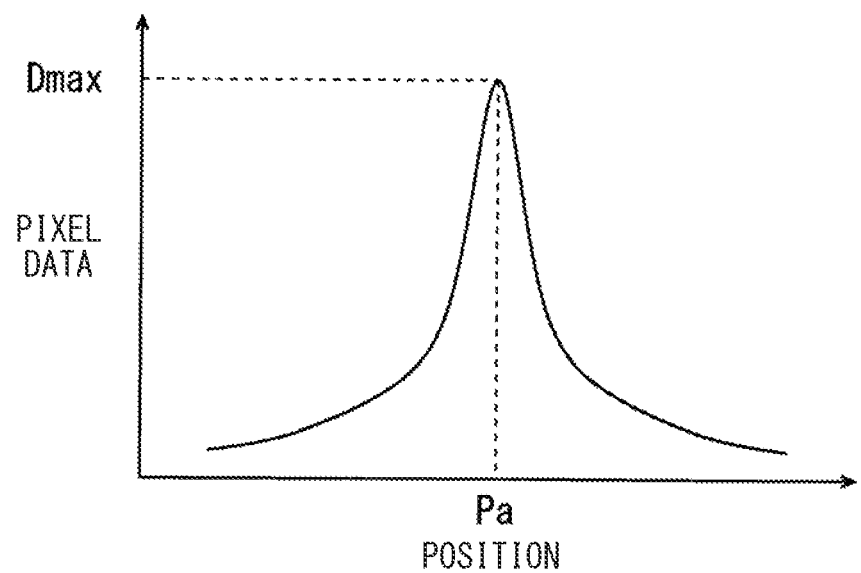
FIG. 26 is a view describing a determination method of focused point pixel data in sectioning observation.

FIG. 26 is a view describing the determination method of the focused point pixel data in the sectioning observation. The horizontal axis of FIG. 26 indicates the focus position (position in the Z direction) of the pattern measurement light, and the vertical axis indicates the pixel data.

In the sectioning observation, the pixel data having the maximum value of the plurality of pieces of pixel data for the same pixel in the plurality of pieces of sectioning image data is determined as the focused point pixel data. In the example of the pixel of FIG. 26, the pixel data generated at the position Pa has the maximum value Dmax. Therefore, the pixel data generated at the position Pa is determined as the focused point pixel data.

In particular, when using the rectangular wave measurement light or the dot measurement light, the pixel data having the maximum value can be easily determined compared to when using the one-dimensional sine wave measurement light or the two-dimensional sine wave measurement light. Thus, the determination of the focused point pixel data can be easily carried out even with respect to the pixel data of the measuring object S such as a glass substrate, and the like that is transparent and that does not have patterns.

Figure 27:
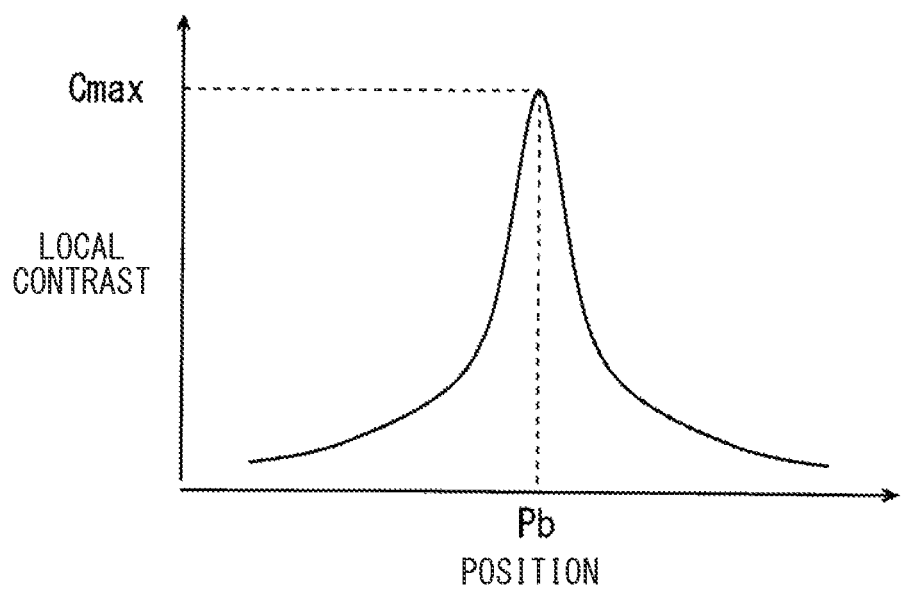
FIG. 27 is a view describing the determination method of the focused point pixel data in normal observation.

FIG. 27 is a view describing the determination method of the focused point pixel data in the normal observation. The horizontal axis of FIG. 27 indicates the focus position (position in the Z direction) of the pattern measurement light, and the vertical axis indicates a local contrast. The local contrast is, for example, a difference between the value of the arbitrary pixel data and a value of another pixel data adjacent to the relevant pixel data. The local contrast may be a variance of the value of the arbitrary pixel data and the value of another pixel data adjacent to the relevant pixel data.

In the normal observation, the pixel data having the maximum local contrast of the plurality of pieces of pixel data for the same pixel data in the plurality of pieces of normal image data is determined as the focused point pixel data. In the example of the pixel of FIG. 27, the pixel data generated at the position Pb has the maximum local contrast Cmax. Therefore, the pixel data generated at the position Pb is determined as the focused point pixel data. In the normal observation, the focused point pixel data may be determined based on the change in the local contrast at the edge portion.

In the present embodiment, the CPU 210 automatically sets the appropriate determination method of the focused point pixel data according to the observation method, but this is not the sole case. The CPU 210 may display a setting screen for setting the determination method of the focused point pixel data on the display unit 400.

(b) Synthesis of Image Data

Figure 28:
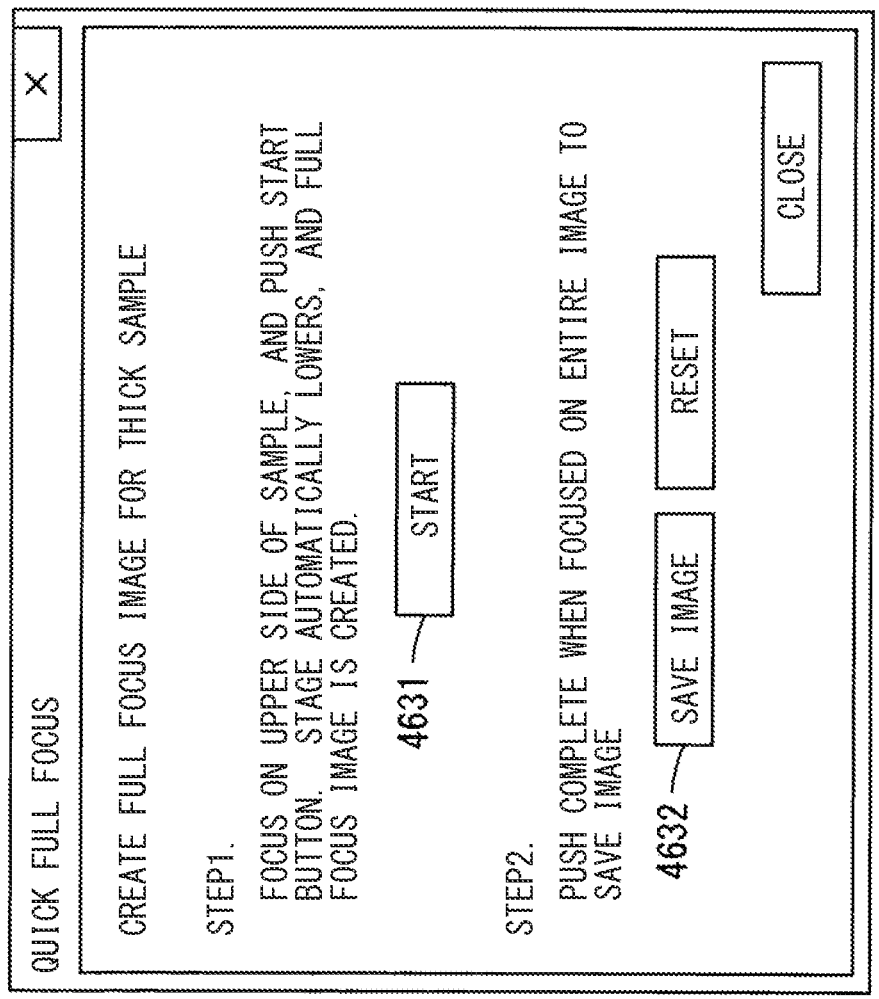
FIG. 28 is a view showing one example of an omnifocus image creating window.

When generating the omnifocus image data, the user operates the omnifocus button 463 of FIG. 17 and FIG. 18 using the operation section 250 of FIG. 1. An omnifocus image creating window is thereby displayed in the setting display region 420. FIG. 28 is a view showing one example of the omnifocus image creating window. As shown in FIG. 28, a start button 4631 and a save image button 4632 are displayed in the omnifocus image creating window 4630.

Figure 29:
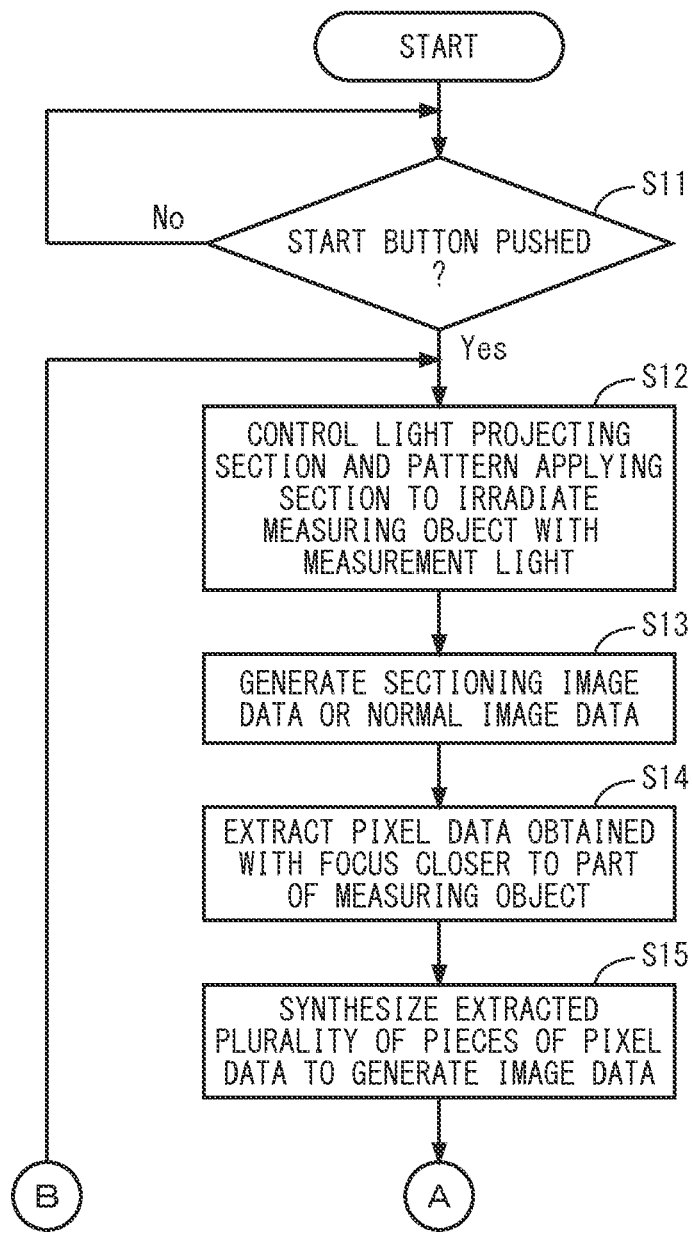
FIG. 29 is a flowchart showing an omnifocus image data generating process.
Figure 30:
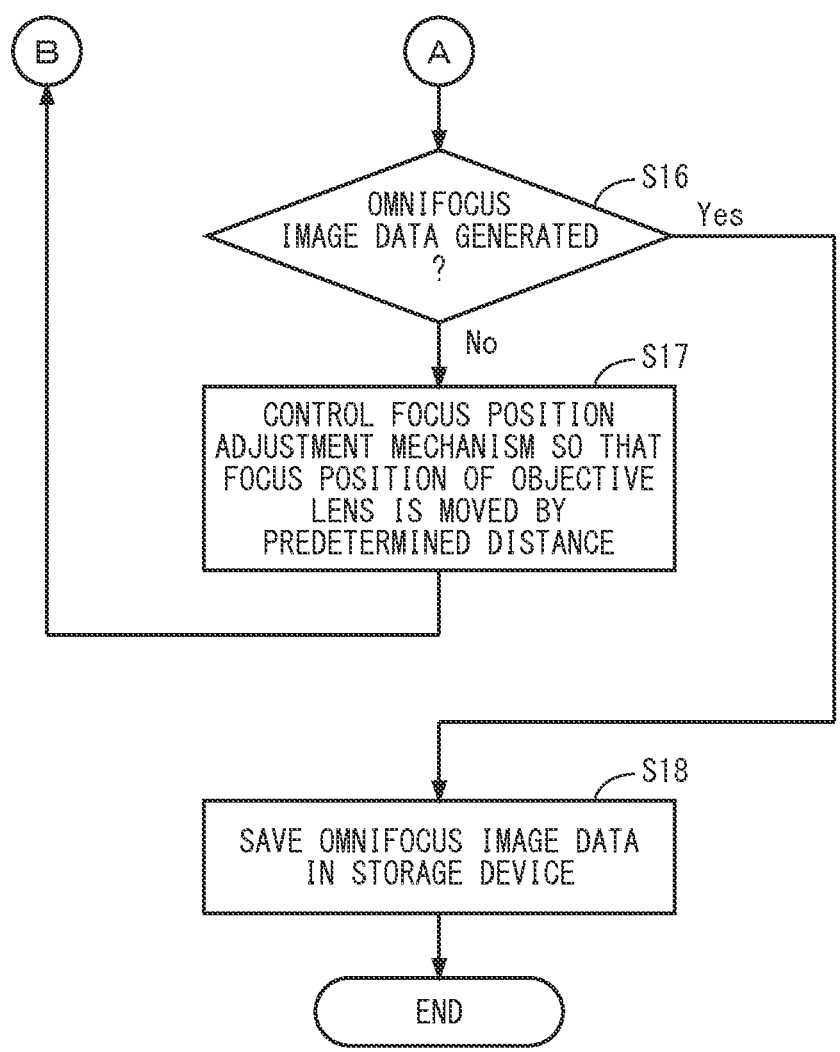
FIG. 30 is a flowchart showing the omnifocus image data generating process.

The user can operate the start button 4631 to instruct the omnifocus image data generating process for generating the omnifocus image data to the CPU 210. FIG. 29 and FIG. 30 are flowcharts showing the omnifocus image data generating process. Hereinafter, the omnifocus image data generating process will be described with reference to FIG. 2 and FIGS. 28 to 30.

The CPU 210 determines whether or not the start button 4631 is operated (step S11). If the start button 4631 is not operated in step S1, the CPU 210 waits until the start button 4631 is operated.

If the start button 4631 is operated in step S1, the CPU 210 controls the light projecting section 320 and the pattern applying section 110 of FIG. 1 so that the measuring object S is irradiated with the measurement light (step S12). The CPU 210 generates the sectioning image data or the normal image data based on the pixel data provided from the control board 170 of FIG. 1 (step S13). The generated sectioning image data or the normal image data is stored in the RAM 230 of FIG. 1.

The CPU 210 extracts the pixel data obtained in a state the focus is closer to a part of the measuring object S of the pixel data of the one or the plurality of pieces of sectioning image data or the normal image data generated at the present time point (step S14).

In the sectioning observation, the pixel data to be extracted is the pixel data having the maximum value of the plurality of pieces of pixel data for the same pixel in the one or the plurality of pieces of sectioning image data generated at the present time point. In the normal observation, the pixel data to be extracted is the pixel data having the maximum local contrast of the plurality of pieces of pixel data for the same pixel in the one or the plurality of pieces of normal image data generated at the present time point.

The CPU 210 synthesizes the extracted plurality of pieces of pixel data to generate the image data (step S15). The generated image data is stored in the RAM 230. At the time point the sectioning image data or the normal image data is generated first, all pieces of the pixel data of the sectioning image data or the normal image data are determined and extracted as the pixel data obtained in a state the focus is closer to one part of the measuring object S. Thus, the image data generated by synthesizing the plurality of pieces of pixel data is the same as the sectioning image data or the normal image data.

The CPU 210 then determines whether or not the omnifocus image data is generated (step S16). The CPU 210 determines that the omnifocus image data is generated when the movement of the focus position is terminated within a range defined in advance.

In the sectioning observation, the CPU 210 may determine that the omnifocus image data is generated when determined that all pieces of the pixel data having the maximum value are extracted before the termination of the movement of the focus position within the range defined in advance. In the normal observation, the CPU 210 may determine that the omnifocus image data is generated when determined that all pieces of the pixel data having the maximum local contrast are extracted before the termination of the movement of the focus position within the range defined in advance.

If the omnifocus image data is not generated in step S16, the CPU 210 controls the focus position adjustment mechanism 163 so that the focus position of the objective lens 161 is moved by a predetermined distance (step S17). Thereafter, the CPU 210 returns to the process of step S12. Subsequently, the CPU 210 repeats the procedures of steps S12 to S17. Thus, each time the focus position of the objective lens 161 is moved and the sectioning image data or the normal image data at the new focus position is generated, the image data stored in the RAM 230 is updated.

The pixel data, that is, the focused point pixel data obtained while focused on a part of the measuring object S is extracted by repeating the above procedure. If all of the focused point pixel data is extracted, the image data stored in the RAM 230 serves as the image data obtained while focused on the entire measuring object S, that is, the omnifocus image data.

If the omnifocus image data is generated in step S16, the CPU 210 saves the omnifocus image data stored in the RAM 230 in the storage device 240 of FIG. 1 (step S18). The CPU 210 thereby terminates the omnifocus image data generating process. Even when the save image button 4632 is operated, the CPU 210 saves the image data stored in the RAM 230 in the storage device 240, and terminates the omnifocus image data generating process.

The CPU 210 can generate a plurality of pieces of sectioning image data or normal image data while moving the stage 140 of FIG. 2 in the X direction or the Y direction. The plurality of pieces of sectioning image data or normal image data generated in such a manner are synthesized, so that the user can observe the sectioning image or the normal image of the entire measuring object S having a greater dimension.

Furthermore, the CPU 210 can generate the sectioning image data or the normal image data of the measuring object S for every constant time (time lapse photography). The plurality of pieces of sectioning image data or normal image data generated at different time points are synthesized, so that the user can observe the temporally changing sectioning image or the normal image of the measuring object S as a moving image.

Thus, when the measurement condition is changed in the generating process of the plurality of pieces of sectioning image data or normal image data to be synthesized later, the brightness of a part of the synthesized sectioning image or the normal image unnaturally changes or the uniformity of the brightness lowers. Furthermore, flickering may occur in the brightness of the moving image of the measuring object S. Therefore, when generating the plurality of pieces of sectioning image data or normal image data to be synthesized later, it is preferable that the measurement condition not be changed.

Similarly, even if the contrast correction amount differs among the plurality of pieces of sectioning image data to be synthesized later, the brightness of a part of the synthesized sectioning image unnaturally changes or the uniformity of the brightness lowers. Furthermore, flickering may occur in the brightness of the moving image of the measuring object S.

In the present embodiment, the sectioning image data before the contrast is corrected and the metadata indicating the contrast correction amount are independently saved as described above. Thus, the contrast correction amount can be made uniform among the plurality of pieces of sectioning image data. The unnatural change in the brightness of the synthesized sectioning image, the non-uniformity of the brightness, or the flickering of the brightness can be prevented.

The contrast correction amount may be set to a value the halation portion and the black defect portion of the sectioning image are the least. In this case, the dynamic range of the sectioning image is enlarged. Alternatively, the contrast correction amount may be an average value of the contrast correction amounts of the plurality of pieces of sectioning image data. In this case, the overall brightness of the sectioning image is optimized. Such contrast correction amounts may be switchable in accordance with the properties of the sectioning image data.

(c) Three-Dimensional Shape Data and Auto Focus

In the generation procedure of the omnifocus image data, the relative distance between the measuring object S and the objective lens 161 is stored in the RAM 230 when the focus position is moved. On the basis of the relative distance between the portion of the measuring object S corresponding to the extracted pixel data and the objective les 161 stored in the RAM 230, the CPU 210 calculates the height of the relevant portion of the measuring object S.

The CPU 210 synthesizes the heights calculated for all the portions of the measuring object S to generate the three-dimensional shape data. The three-dimensional shape data is stored in the RAM 230. When the save image button 4632 is operated, the CPU 210 saves the three-dimensional shape data in the storage device 240 along with the image data stored in the RAM 230.

When the auto focus button 472c of FIG. 17 and FIG. 18 is operated, the auto focus is carried out. Specifically, the CPU 210 calculates the pixel data of the central portion of the plurality of pattern images at a plurality of different focus positions. Alternatively, the CPU 210 calculates the local contrast of the pixel of the central portion of a plurality of normal images at a plurality of different focus positions.

The focused point pixel data of the central portion of the pattern image or the normal image is thereby determined. The relative distance between the measuring object S and the objective lens 161 of when focused on the portion of the measuring object S corresponding to the central portion of the pattern image or the normal image is calculated. The CPU 210 controls the focus position adjustment mechanism 163 so that the relative distance between the measuring object S and the objective lens 161 becomes the calculated distance.

If the ROI is set, the CPU 210 may determine the focused point pixel data not in the central portion but in the ROI of the pattern image or the normal image. In this case, the auto focus can be carried out on the portion of the measuring object S corresponding to the ROI.

The determination method of the focused point pixel data differs between the sectioning observation and the normal observation. Thus, the focus position of when the auto focus is carried out differs between the sectioning observation and the normal observation. The user can determine the optimum focus position by switching the auto focus at the time of the sectioning observation and the auto focus at the time of the normal observation.

When the space period Ts of the rectangular wave measurement light or the dot measurement light is long, the determination of the focused point pixel data is terminated in a short period of time. Thus, the auto focus can be carried out at high speed by setting the space period Ts long. If the space period Ts of the rectangular wave measurement light or the dot measurement light is short, the pixel data having the maximum value is determined at high accuracy. Thus, the accuracy of the auto focus can be enhanced by setting the space period Ts short.

When carrying out the auto focus, the irradiation position of the measurement light on the measuring object S is switched each time the measurement light is emitted. Thus, a case in which only the fluorescence reagent at the specific portion of the measuring object S loses color is prevented. When the irradiation position of the measurement light on the measuring object S is switched within the exposure time of the light receiving section 120, the level of the light receiving signal output from the light receiving section 120 becomes inaccurate, and the accuracy of the auto focus lowers. Thus, the switching of the irradiation position of the measurement light on the measuring object S is preferably carried out after elapse of the exposure time of the light receiving section 120.

(7) Effect

In the microscopic imaging device 500 according to the present embodiment, the user can instruct the pattern of the measurement light using the operation section 250. The measurement light having the instructed pattern is generated by the light modulation element 112, and is applied on the measuring object S. Furthermore, the spatial phase of the generated pattern is sequentially moved on the measuring object S by a predetermined amount by the light modulation element 112. A plurality of pieces of pattern image data corresponding to the plurality of phases of the pattern are thereby generated. Furthermore, the plurality of pieces of pattern image data are synthesized to generate the sectioning image data.

In this case, the replacing task and the replacing time of the component are unnecessary. Furthermore, the measuring object S is selectively irradiated with a plurality of pieces of measurement light having an arbitrary pattern through a single light path configured by the filter unit 150 and the lens unit 160. The sectioning observation using the measurement light having an arbitrary pattern is thereby enabled while miniaturizing the microscopic imaging device 500. Therefore, the pattern of the measurement light can be changed and the phase of the pattern can be moved without arranging a mechanical switching mechanism and the measuring object S can be easily imaged using the measurement light having a desired pattern. Furthermore, the microscopic imaging device 500 can be miniaturized.

(8) Correspondence Relationship Between Each Configuring Element of the Claims and Each Unit of the Embodiment An example of correspondence of each configuring element of the claims and each unit of the embodiment will be hereinafter described, but the present invention is not limited to the following example.

In the embodiment described above, the light projecting section 320 serves as an example of a first light projecting section or a light projecting section; the transmitted light supplying section 130 serves as an example of a second light projecting section; the light modulation element 112 serves as an example of a light modulation element; and the measuring object S serves as an example of a measuring object. The filter unit 150 serves as an example of an optical system; the light receiving section 120 serves as an example of a light receiving section; the image data generating portion 211 serves as an example of an image data generating portion; and the pattern generating portion 212 serves as an example of a pattern generating portion. The controller 213 serves as an example of a controller and a processing device; the operation section 250 serves as an example of an instructing section; the display unit 400 serves as an example of a display unit; and the microscopic imaging device 500 serves as an example of a microscopic imaging device.

Various other elements having the configuration or the function described in the claims can be used for each configuring element of the claims.

The present invention can be effectively used in various microscopic imaging devices, microscopic imaging methods, and microscopic imaging programs.

What is claimed is:

1. A fluorescence microscopic imaging device comprising:
   a first light projecting section that emits light;
   a light modulation element configured to generate measurement light having an arbitrary pattern from the light emitted by the first light projecting section;
   a filter unit configured to receive the measurement light from the light modulation element, wherein the filter unit includes an excitation filter that allows measurement light having a first wavelength band to pass, a dichroic mirror that reflects the measurement light having the first wavelength and allows light having a second wavelength band to pass, and an absorption filter that allows light having a second wavelength band;
   an optical system that irradiates a measuring object with the measurement light having the first wavelength band generated by the filter unit;
   a light receiving section that receives light having the second wavelength band from the measuring object and outputs a light receiving signal indicating a light receiving amount;
   an image data generating portion that generates image data based on the light receiving signal output from the light receiving section;
   an instructing section that instructs a measurement condition for generating a first pattern and a second pattern of the measurement light including a rectangular wave pattern having an intensity distribution that changes in a rectangular wave form and having a plurality of bright portions and dark portions lined at a substantially equal interval to be generated by the light modulation element, wherein a spatial period of the first pattern or a width of the bright portions of the first pattern are different from a spatial period of the second pattern or a width of the bright portions of the second pattern;
   a pattern generating portion that generates the first pattern to be irradiated on the measuring object while sequentially moving a spatial phase of the first pattern by a predetermined amount when the first pattern is instructed by the instructing section and generates the second pattern to be irradiated on the measuring object while sequentially moving a spatial phase of the second pattern by a predetermined amount when the second pattern is instructed by the instructing section, wherein movement amount of the spatial phase of the first and second pattern is set such that the width of bright portions is smaller than the width of dark portions and the bright portion of the measurement light is applied once on an entire irradiation range of the measurement light;
   a controller that controls the light modulation element based on the pattern generated by the pattern generating portion, and controls the image data generating portion to generate sectioning image data indicating an image of the measuring object based on a plurality of pieces of image data generated at a plurality of phases of the pattern; and
   wherein the first pattern and the second pattern are generated by the single light modulation element and irradiated selectively through a single light path; and
   wherein the first pattern has a one-dimensional form having an intensity distribution that periodically changes in a first direction, and the second pattern has a two-dimensional form having an intensity distribution that periodically changes in the first direction and periodically changes in a second direction intersecting the first direction, and the controller controls the light modulation element to sequentially move a phase of the first pattern in the first direction when the first pattern is instructed by the instructing section, and controls the light modulation element to sequentially move a phase of the second pattern in the first direction and the second direction when the second pattern is instructed by the instructing section, and wherein number of imaging and the sectioning image data is higher for the second pattern compared to the first pattern.

2. The microscopic imaging device according to claim 1, wherein the measurement condition includes a movement amount of the phase of the pattern as a measurement parameter, and the pattern generating portion calculates the movement amount of the phase of the pattern based on the pattern class instructed by the instructing section, and generates a plurality of patterns so that a first portion having an intensity higher than a predetermined intensity of the pattern of the measurement light is applied at least once on an entire irradiation range of the measurement light based on the movement amount of the phase of the pattern.

3. The microscopic imaging device according to claim 2, wherein the controller automatically adjusts a brightness parameter for adjusting brightness of an image according to the pattern class and the measurement parameter, and controls at least one of the first light projecting section, the light receiving section, and the data generating portion based on the adjusted brightness parameter.

4. The microscopic imaging device according to claim 3, further comprising:

a display unit that displays an image based on image data or sectioning image data generated by the image data generating portion, wherein the controller displays on the display unit a first image based on the image data or the sectioning image data generated by the image data generating portion in correspondence with the irradiation with the measurement light, and displays on the first image, in a superimposed manner, a second image based on image data generated by the image data generating portion in correspondence with the irradiation with the light for transmissive observation.

5. The microscopic imaging device according to claim 4, wherein the display unit is configured to selectively or simultaneously execute a normal display of displaying an image based on the already generated image data or sectioning image data, and a preview display of displaying an image based on sectioning image data generated when the measurement condition is changed, the first and second images being displayable in a superimposed manner in the normal display.

6. The microscopic imaging device according to claim 1, wherein the pattern generating portion calculates the movement amount of the phase of the pattern based on the spatial periods of the first and second portions and the widths of the first and second portions of the measurement light instructed by the instructing section.

7. The microscopic imaging device according to claim 1, wherein the instructing section is configured to be capable of instructing measurement light that does not have a pattern as the pattern class, and when the measurement light that does not have a pattern is instructed by the instructing section, the controller controls the light modulation element to generate the measurement light that does not have a pattern, and controls the image data generating portion to generate image data indicating an image of the measuring object based on the light receiving signal output from the light receiving section.

8. The microscopic imaging device according to claim 1, wherein the first pattern includes a rectangular wave pattern having an intensity distribution that changes in a rectangular wave form and a sine wave pattern having an intensity distribution that changes in a sine wave form, and the instructing section is configured to selectively instruct the rectangular wave pattern or the sine wave pattern as the first pattern.

9. The microscopic imaging device according to claim 1, wherein the controller controls the light modulation element so that the intensity distribution of the pattern changes in a period set according to the instructed pattern.

10. The microscopic imaging device according to claim 1, wherein the optical system is configured to irradiate the measuring object with the measurement light having a wavelength defined in advance so that fluorescence is emitted from the measuring object.

11. The microscopic imaging device according to claim 1, further comprising:

a second light projecting section that emits light for transmissive observation, wherein the light receiving section is arranged to receive the light for transmissive observation transmitted through the measuring object.

12. The microscopic imaging device according to claim 1, wherein the light modulation element includes a digital micro-mirror device, a reflective liquid crystal element, or a liquid crystal display.

13. A fluorescence microscopic imaging method comprising the steps of:

emitting light from a light projecting section;

accepting a measurement condition for generating a first pattern of measurement light including a rectangular wave pattern having an intensity distribution that changes in a rectangular wave form and having a plurality of bright portions and dark portions lined at a substantially equal interval to be generated by a light modulation element of a plurality of patterns of the measurement light and a second pattern of the measurement light including a rectangular wave pattern having an intensity distribution that changes in a rectangular wave form and having a plurality of bright portions and dark portions lined at a substantially equal interval to be generated by the light modulation element of a plurality of patterns of the measurement light, wherein a spatial period of the first pattern or a width of the bright portions of the first pattern are different from a spatial period of the second pattern or a width of the bright portions of the second pattern;

generating the first pattern to be irradiated on a measuring object while sequentially moving a spatial phase of the first pattern by a predetermined amount when the first pattern is instructed and generates the second pattern to be irradiated on the measuring object while sequentially moving a spatial phase of the second pattern by a predetermined amount when the second pattern is instructed wherein amount of the moving of the spatial phase of the first pattern and second pattern is set such that the width of bright portions is smaller than the width of dark portions and the bright portion of the measurement light is applied once on an entire irradiation range of the measurement light;

generating measurement light having a pattern by the light modulation element from the light emitted from the light projecting section based on the generated pattern;

receiving the measurement light having the pattern through a filter unit, wherein the filter unit includes an excitation filter that allows measurement light having a first wavelength band to pass, a dichroic mirror that reflects the measurement light having the first wavelength and allows light having a second wavelength band to pass, and includes an absorption filter that allows light having a second wavelength band, and thereby generating the first wavelength band and a second wavelength band;

irradiating the measuring object with the measurement light having the first wavelength band generated by the light modulation element by an optical system;

sequentially moving a spatial phase of the generated pattern on the measuring object by a predetermined amount by the light modulation element;

receiving light having the second wavelength band from the measuring object by a light receiving section, and outputting a light receiving signal indicating a light receiving amount; and generating sectioning image data indicating an image of the measuring object based on a plurality of pieces of image data generated at a plurality of phases of the pattern based on the light receiving signal output from the light receiving section; and wherein the first pattern and the second pattern are generated by the single light modulation element and irradiated selectively through a single light path; and wherein the first pattern has a one-dimensional form having an intensity distribution that periodically changes in a first direction, and the second pattern has a two-dimensional form having an intensity distribution that periodically changes in the first direction and periodically changes in a second direction intersecting the first direction, and the controller controls the light modulation element to sequentially move a phase of the first pattern in the first direction when the first pattern is instructed by the instructing section, and controls the light modulation element to sequentially move a phase of the second pattern in the first direction and the second direction when the second pattern is instructed by the instructing section, and wherein number of imaging and the sectioning image data is higher for the second pattern compared to the first pattern.

14. A non-transitory storage medium comprising instructions which when executed causes a computer to perform the steps of:

emitting light from a light projecting section;

accepting a measurement condition for generating a first pattern of measurement light including a rectangular wave pattern having an intensity distribution that changes in a rectangular wave form and having a plurality of bright portions and dark portions lined at a substantially equal interval to be generated by a light modulation element of a plurality of patterns of the measurement light and a second pattern of the measurement light including a rectangular wave pattern having an intensity distribution that changes in a rectangular wave form and having a plurality of bright portions and dark portions lined at a substantially equal interval to be generated by the light modulation element of a plurality of patterns of the measurement light, wherein a spatial period of the first pattern or a width of the bright portions of the first pattern are different from a spatial period of the second pattern or a width of the bright portions of the second pattern;

generating the first pattern to be irradiated on a measuring object while sequentially moving a spatial phase of the first pattern by a predetermined amount when the first pattern is instructed and generates the second pattern to be irradiated on the measuring object while sequentially moving a spatial phase of the second pattern by a predetermined amount when the second pattern is instructed wherein amount of the moving of the spatial phase of the first pattern and second pattern is set such that the width of bright portions is smaller than the width of dark portions and the bright portion of the measurement light is applied once on an entire irradiation range of the measurement light;

generating measurement light having a pattern by the light modulation element from the light emitted from the light projecting section based on the generated pattern;

receiving the measurement light having the pattern through a filter unit, wherein the filter unit includes an excitation filter that allows measurement light having a first wavelength band to pass, a dichroic mirror that reflects the measurement light having the first wavelength and allows light having a second wavelength band to pass, and includes an absorption filter that allows light having a second wavelength band, and thereby generating the first wavelength band and a second wavelength band;

irradiating the measuring object with the measurement light first wavelength band generated by the light modulation element by an optical system;

sequentially moving a spatial phase of the generated pattern on the measuring object by a predetermined amount by the light modulation element;

receiving light having the second wavelength band from the measuring object by a light receiving section, and outputting a light receiving signal indicating a light receiving amount; and generating sectioning image data indicating an image of the measuring object based on a plurality of pieces of image data generated at a plurality of phases of the pattern based on the light receiving signal output from the light receiving section; and wherein the first pattern and the second pattern are generated by the single light modulation element and irradiated selectively through a single light path; and wherein the first pattern has a one-dimensional form having an intensity distribution that periodically changes in a first direction, and the second pattern has a two-dimensional form having an intensity distribution that periodically changes in the first direction and periodically changes in a second direction intersecting the first direction, and the controller controls the light modulation element to sequentially move a phase of the first pattern in the first direction when the first pattern is instructed by the instructing section, and controls the light modulation element to sequentially move a phase of the second pattern in the first direction and the second direction when the second pattern is instructed by the instructing section, and wherein number of imaging and the sectioning image data is higher for the second pattern compared to the first pattern.

* * * * *